(12) United States Patent
Zhang et al.

(10) Patent No.: US 12,348,297 B2
(45) Date of Patent: Jul. 1, 2025

(54) INFORMATION REPORTING METHOD AND APPARATUS

(71) Applicant: HUAWEI TECHNOLOGIES CO., LTD., Guangdong (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 599 days.

(21) Appl. No.: 17/585,148

(22) Filed: Jan. 26, 2022

(65) Prior Publication Data

US 2022/0149924 A1 May 12, 2022

Related U.S. Application Data

(63) Continuation of application No. PCT/CN2020/104680, filed on Jul. 25, 2020.

(30) Foreign Application Priority Data

Jul. 26, 2019 (CN) .......................... 201910684639.9

(51) Int. Cl.
*H04B 7/06* (2006.01)
*H04L 1/1812* (2023.01)
(Continued)

(52) U.S. Cl.
CPC ......... *H04B 7/0695* (2013.01); *H04L 1/1812* (2013.01); *H04W 72/0446* (2013.01);
(Continued)

(58) Field of Classification Search
CPC ................ H04B 7/0695; H04W 76/19; H04W 72/542; H04W 72/569; H04W 72/21;
(Continued)

(56) References Cited

U.S. PATENT DOCUMENTS 10,798,622 B2 * 10/2020 Cirik ...................... H04B 7/088
11,419,066 B2 * 8/2022 Jeon ................... H04W 72/0466
(Continued)

FOREIGN PATENT DOCUMENTS

| CN | 102013954 A | 4/2011 |
|---|---|---|
| CN | 102332962 A | 1/2012 |

(Continued)

OTHER PUBLICATIONS

Huawei, "Access Network Charging Identifier request and report," 3GPP TSG-CT WG3 Meeting #98, C3-185060, West Palm Beach, USA., Aug. 20-24, 2018, 19 pages.
(Continued)

*Primary Examiner* — Duc C Ho
(74) *Attorney, Agent, or Firm* — Fish & Richardson P.C.

(57) ABSTRACT

The present disclosure provides example information reporting method and apparatuses. One example method includes determining reporting content based on a priority rule, when there is a reporting conflict between a beam failure recovery request (BFRQ) and at least one piece of information, where the at least one piece of information includes a scheduling request (SR), and the priority rule includes that a priority of the BFRQ is higher than a priority of the SR. The reporting content is sent on a first time-frequency resource, where the reporting content includes the BFRQ but not the SR.

20 Claims, 9 Drawing Sheets

(51) Int. Cl.
*H04W 72/0446* (2023.01)
*H04W 72/0453* (2023.01)
*H04W 72/1263* (2023.01)
*H04W 72/21* (2023.01)
*H04W 72/542* (2023.01)
*H04W 72/566* (2023.01)
*H04W 76/19* (2018.01)

(52) U.S. Cl.
CPC ............... *H04W 72/0453* (2013.01); *H04W 72/1263* (2013.01); *H04W 72/21* (2023.01); *H04W 72/542* (2023.01); *H04W 72/569* (2023.01); *H04W 76/19* (2018.02)

(58) Field of Classification Search
CPC ......... H04W 72/0446; H04W 72/0453; H04W 72/1263; H04L 1/1812
USPC ........................................................ 370/329
See application file for complete search history.

(56) References Cited

U.S. PATENT DOCUMENTS

| | | | |
|---|---|---|---|
| 2013/0114455 A1 | 5/2013 | Yoo et al. | |
| 2018/0167914 A1 | 6/2018 | Zhang | |
| 2019/0058519 A1* | 2/2019 | Davydov | .............. H04W 72/21 |
| 2020/0177424 A1 | 6/2020 | Noh et al. | |

FOREIGN PATENT DOCUMENTS

| | | | |
|---|---|---|---|
| CN | 109391344 A | 2/2019 | |
| WO | WO-2018232259 A1 * | 12/2018 | ........... H04B 7/0617 |
| WO | 2019031954 A1 | 2/2019 | |

OTHER PUBLICATIONS

Office Action issued in Chinese Application No. 201910684639.9 on Jun. 6, 2022, 6 pages (with English translation).

3GPP TS 38.214 V15.6.0 (Jun. 2019), "3rd Generation Partnership Project; Technical Specification Group Radio Access Network; NR; Physical layer procedures for data(Release 15)," Jun. 2019, 105 pages.

Office Action issued in Chinese Application No. 201910684639.9 on Sep. 1, 2021, 13 pages (with English translation).

PCT International Search Report and Written Opinion issued in International Application No. PCT/CN2020/104680 on Aug. 28, 2020, 17 pages (with English translation).

EP Communication Pursuant to Article 94(3) EPC in European Appln No. 20846358.8, dated Apr. 11, 2024, 6 pages.

* cited by examiner

INFORMATION REPORTING METHOD AND APPARATUS

CROSS-REFERENCE TO RELATED APPLICATIONS

This application is a continuation of International Application No. PCT/CN2020/104680, filed on Jul. 25, 2020, which claims priority to Chinese Patent Application No. 201910684639.9, filed on Jul. 26, 2019. The disclosures of the aforementioned applications are hereby incorporated by reference in their entireties.

TECHNICAL FIELD

The present invention relates to communications technologies, and in particular, to an information reporting method and apparatus.

BACKGROUND

With development of communications technologies, terminal devices become more popular. A fifth generation mobile communications (5G) or new radio (NR) access technology can support higher system performance, different services, different deployment scenarios, and different spectrums. To meet a service requirement corresponding to each service, each deployment scenario, each spectrum, or the like in 5G NR, types of uplink control information need to be increased in 5G NR. Currently, types of uplink control information in 5G NR standards include channel state information (CSI), a hybrid automatic repeat request (HARQ), and a scheduling request (SR).

As the 5G NR standards gradually evolve, more reporting rules and information are to be introduced into new standards.

For example, in the new standards, reporting of a link failure recovery request (beam failure recovery request, BFRQ) may be introduced into a component carrier (CC) scenario or carrier aggregation (CA). After a terminal device detects that a link between a network device and the terminal device is faulty, the terminal device sends a link failure recovery request (beam failure recovery request, BFRQ) to the network device.

For another example, in the new standards, reporting of a signal to interference plus noise ratio (SINR) may be introduced into a beam management (BM) process. The SINR may also be referred to as a layer 1-SINR (L1-SINR). The SINR is a measure of a signal quantity and interference and a noise quantity, and indicates required signal strength compared to noise and interference. The SINR can objectively reflect network signal purity and link quality of a current channel, and is an important indicator for measuring a performance parameter of the terminal device.

In this way, during specific application, when sending the BFRQ and/or the SINR to the network device, the terminal device may further need to report CSI, an SR, a HARQ, or the like to the network device at the same time, leading to a reporting conflict (or referred to as a collision) between the BFRQ and/or the SINR and the HARQ, the SR, the CSI, or the like. Consequently, data transmission performance is affected, and it is difficult to ensure normal service running.

SUMMARY

Embodiments of the present invention provide an information reporting method and apparatus, to partially or completely resolve the foregoing problem of a reporting conflict, thereby ensuring data transmission performance and ensuring normal service running.

According to a first aspect, an embodiment of the present invention provides an information reporting method. The method may be described from a terminal device side and include: when there is a reporting conflict between a beam failure recovery request (BFRQ) and at least one piece of information, determining reporting content based on at least one of a priority rule and a multiplexing rule, where the at least one piece of information includes first information, the first information includes any one of a signal to interference plus noise ratio (SINR), channel state information (CSI), hybrid automatic repeat request (HARQ) information, a scheduling request (SR), or second information, the CSI includes at least one of a channel state information reference signal resource identifier (CRI), a synchronization signal and physical broadcast channel block index (SSB-index), a rank indicator (RI), a precoding matrix indicator (PMI), a channel quality indicator (CQI), or reference signal received power (RSRP), the second information is configured to be carried on a physical uplink shared channel (PUSCH) resource, and the priority rule includes: a priority of the BFRQ is higher than a priority of at least one of the SINR, the CSI, the HARQ, the SR, or the second information; and sending the reporting content, where the reporting content includes one item with a highest priority in at least two items including the BFRQ and the at least one piece of information.

It may be understood that the BFRQ is reported by a terminal device to a network device after the terminal device detects that a link between the network device and the terminal device is faulty.

It can be learned that, when the link between the terminal device and the network device is faulty, on a reporting occasion on which the terminal device reports the BFRQ, if there is a reporting conflict between a resource for carrying the BFRQ and a resource for carrying other information (for example, other UCI information such as the SINR, the CSI, the HARQ information, the SR, or the second information), the terminal device may determine, based on a priority relationship between BFRQ information and other UCI information or a multiplexing relationship between BFRQ information and other UCI information in a link failure recovery process that is designed in this embodiment of the present invention, reporting content to be sent to the network device. The reporting content includes one item with a highest priority in at least two items including the BFRQ and the other UCI information. Information with a higher priority is usually more important information or information that needs to be reported more urgently. Therefore, according to the method, important, urgent, and consequence-prone content can be normally reported, thereby effectively avoiding impact caused by the reporting conflict, ensuring normal running of a related service, and ensuring stability of a communications system.

In a solution in which the terminal device determines the reporting content from the BFRQ and the at least one piece of information based on the priority rule, the terminal device determines the priority of each piece of information based on the priority rule, and determines the reporting content based on the priority of each piece of information, that is, uses information with a highest priority as the reporting content; in this case, other information may not be reported. Because the priority of the BFRQ is higher than the priority of the at least one of the CSI, the SR, the HARQ, the SINR, or the second information, the priority of the BFRQ is highest in all these reporting conflict scenarios, and the reporting content includes the BFRQ in this case.

In a design scenario of this solution, the BFRQ is used to request link fault recovery for one cell, the CSI is a feedback of a channel state, and a link fault of the cell has greater impact on performance of the entire system than the feedback of the channel state. Therefore, sending of the BFRQ information is more urgent than that of the CSI information.

The SR is used to request an uplink scheduling resource, and the link fault of the cell has greater impact on the performance of the entire system than data scheduling. Therefore, sending of the BFRQ information is more urgent than that of the SR information.

The HARQ is a feedback on whether a piece of data is correctly transmitted, and the link fault of the cell has greater impact on the performance of the entire system than the feedback of the piece of data. Therefore, sending of the BFRQ information is more urgent than that of the HARQ information.

A SINR (or referred to as an L1-SINR) is used to indicate network signal purity and link quality of a current channel, and the link fault of the cell has greater impact on the performance of the entire system than a feedback of the channel quality. Therefore, sending of the BFRQ information is more urgent than that of the SINR information.

In addition, when there is a reporting conflict between a PUCCH resource for carrying the BFRQ information and the PUSCH resource for carrying the second information, reporting of the BFRQ information is more important than reporting of information in the PUSCH resource. Therefore, sending of the BFRQ information is more urgent than that of the second information.

Therefore, in this embodiment of the present invention, the priority of the BFRQ is designed to be greater than the priority of the SINR, the CSI, the HARQ information, the SR, the second information, or the like. This helps ensure that the important, urgent, and consequence-prone BFRQ information is preferentially reported, thereby facilitating timely link fault recovery for the cell, ensuring stable running of the communications system, and saving communication resources.

Based on the first aspect, in this embodiment of the present invention, the reporting conflict (or a collision) between the BFRQ and the at least one piece of information means that when the terminal device reports the BFRQ and the at least one piece of information to the network device, if at least two resources for carrying the BFRQ and the at least one piece of information overlap in at least one time unit and are on one carrier, it is considered that there is a reporting conflict (or a collision) between the at least two pieces of information. It should be understood that, each of the at least two pieces of information including the BFRQ and the at least one piece of information corresponds to one resource. The carrier may be a single carrier, or may be a same component carrier in a carrier aggregation (CA) scenario or a dual connectivity (DC) scenario, or may be a same bandwidth part (BWP).

In an embodiment, if time domain resources preconfigured to carry the at least two pieces of information overlap in at least one time unit and are sent on a same carrier, it may be considered as that there is a reporting conflict between the at least two pieces of information. Each of the at least two pieces of information is preconfigured to be carried on one resource (for example, a resource occupied by a physical channel), and different information may be carried on different resources.

In another embodiment, if resources preconfigured to carry the at least two pieces of information overlap in at least one time unit, it may be referred to as that there is a reporting conflict between the at least two pieces of information. Each of the at least two pieces of information is preconfigured to be carried on one resource (for example, a resource occupied by a physical channel), and different information may be carried on different resources.

The time unit may be one or more radio frames, one or more subframes, one or more slots, one or more mini-slots, or one or more symbols such as an orthogonal frequency division multiplexing (OFDM) symbol defined in a long term evolution (LTE) system, a fifth generation (5G) mobile communications system, or a new radio (NR) access technology communications system. Alternatively, the time unit may be a time window including a plurality of frames or subframes, for example, a system information (SI) window.

Based on the first aspect, in a possible embodiment, the BFRQ information may include one or more of link failure indication information, identification information of a cell in which a link failure occurs, and reference signal information (a new beam) for link recovery. In a specific embodiment, the BFRQ information may include the identification information of the cell in which the link failure occurs, and/or the reference signal information (the new beam) for link recovery.

Based on the first aspect, in a possible embodiment, the at least one piece of information includes the first information (for example, the SINR, the CSI, the HARQ information, the SR, or the second information), and the multiplexing rule includes: multiplexing the BFRQ and the first information on a first time-frequency resource.

When the first information includes the SINR, the first time-frequency resource is a physical uplink control channel (PUCCH) resource configured for multi-CSI reporting, or the first time-frequency resource is a resource configured to carry the SINR. For example, the BFRQ is a BFRQ 1, the BFRQ 1 is used to indicate that a link failure occurs in at least one cell, the BFRQ 1 may be transmitted by using 1 bit, and the L1-SINR requires more than 1 bit for transmission. Therefore, the PUCCH resource preconfigured to carry the L1-SINR is larger, and the BFRQ 1 may be multiplexed on the PUCCH resource for the L1-SINR for transmission, to ensure correct transmission of the two pieces of information and normal running of a link recovery service and a signal-to-interference ratio reporting service, thereby minimizing impact on the communications system.

Alternatively, when the first information includes the CSI (for example, at least one of the CRI, the SSB-index, the RI, the PMI, the CQI, or the RSRP), the first time-frequency resource is a PUCCH resource configured for multi-CSI reporting. The BFRQ and the CSI are simultaneously reported by using the PUCCH resource for multi-CSI reporting, so that not only a problem of a reporting conflict can be overcome, but also successful reporting of each piece of information and normal running of various reporting services can be ensured, thereby minimizing impact on the communications system.

Alternatively, when the first information includes the HARQ, the first time-frequency resource is a resource configured to carry the HARQ. For example, the BFRQ is a BFRQ 1, and the BFRQ 1 is used to indicate that a link failure occurs in at least one cell. In this case, the BFRQ 1 may require only 1 bit for transmission. A quantity of bits for the HARQ is usually greater than 1, and the resource for the HARQ may carry more information. Therefore, the BFRQ 1 is multiplexed on the resource for the HARQ. For another example, the BFRQ is a BFRQ 2, and the BFRQ 2 is used to indicate an identifier of a cell in which a link failure occurs and/or a resource index of a reference signal used to recover the cell in which the link failure occurs. A quantity of bits for the BFRQ 2 is usually greater than that for the HARQ, and a resource for the BFRQ 2 may carry more information. Therefore, the HARQ is multiplexed on the resource for the BFRQ 2. The foregoing example can ensure correct transmission of the two pieces of information and normal running of a link recovery service and a data feedback service, thereby minimizing impact on the communications system.

Alternatively, when the first information includes the SR, the first time-frequency resource is a resource configured to carry the BFRQ. For example, the BFRQ is a BFRQ 1, and the BFRQ 1 is used to indicate that a link failure occurs in at least one cell. Alternatively, the BFRQ 1 may be request information that has a same format as the SR, and the SR and the BFRQ 1 may be sent after a logical "OR" operation is performed on the SR and the BFRQ 1. In this case, the two pieces of information are both used to request uplink resources, and may be combined into one piece of information for sending, that is, the BFRQ 1 is multiplexed on a resource for the BFRQ 1. For another example, the BFRQ is a BFRQ 2, and the BFRQ 2 is used to indicate an identifier of a cell in which a link failure occurs and/or a resource index of a reference signal used to recover the cell in which the link failure occurs. The BFRQ 2 requires more than 1 bit for transmission, the SR usually requires only 1 bit for transmission, and a resource for the BFRQ 2 may carry more information. Therefore, the SR may be multiplexed on the resource for the BFRQ 2. The foregoing example can ensure correct transmission of the two pieces of information and normal running of a link recovery service and a data feedback service, thereby minimizing impact on the communications system.

Alternatively, when the first information includes the second information, the first time-frequency resource is the PUSCH resource, and the BFRQ and the second information are independently encoded. Optionally, if the second information includes UCI information, the BFRQ and the UCI information are independently encoded. For example, a bit rate of the BFRQ is less than or equal to a bit rate of the UCI information. The BFRQ and the second information are simultaneously reported by using the PUSCH resource, so that not only a problem of a reporting conflict can be overcome, but also successful reporting of each piece of information and normal running of various reporting services can be ensured, thereby minimizing impact on the communications system.

Correspondingly, in the foregoing example, the network device may receive the reporting content on the first time-frequency resource.

Based on the first aspect, in a possible embodiment, the determining reporting content based on at least one of a priority rule and a multiplexing rule includes: when the BFRQ and the at least one piece of information are both applicable to the priority rule and the multiplexing rule, determining the reporting content by preferentially using the multiplexing rule. In this way, if existing resources are sufficient, according to the method, as much information as possible can be transmitted while correct transmission is ensured, and transmission efficiency can be improved.

Based on the first aspect, in a possible embodiment, the at least one piece of information specifically includes at least two pieces of information, and the at least two pieces of information include the first information. When there is a reporting conflict between the BFRQ and the at least two pieces of information, the determining reporting content based on at least one of a priority rule and a multiplexing rule includes: determining the priority of the BFRQ and a priority of each of the at least two pieces of information based on the priority rule; selecting at least two items with highest priorities from at least three items including the BFRQ and the at least two pieces of information; and multiplexing the at least two items with the highest priorities on the first time-frequency resource based on the multiplexing rule, where the reporting content includes the at least two items with the highest priorities; and the sending the reporting content includes: sending the at least two items with the highest priorities on the first time-frequency resource.

It can be learned that, according to the foregoing method, when there is a reporting conflict among at least three resources for carrying information, final reporting content may be determined with reference to the priority rule and the multiplexing rule. On the first time-frequency resource, on the one hand, information with a higher priority is preferentially transmitted, and on the other hand, as much information as possible is transmitted. This solution can make full use of advantages of the priority rule and the multiplexing rule, so that not only a problem of a reporting conflict among three or more pieces of information can be overcome, but also more important, urgent, and consequence-prone information can be transmitted while correct transmission is ensured, thereby improving stability of the communications system and saving some communication resources.

Based on the first aspect, in a possible embodiment, the at least one piece of information specifically includes at least two pieces of information, and the at least two pieces of information include the first information. When there is a reporting conflict between the BFRQ and the at least two pieces of information, the determining reporting content based on at least one of a priority rule and a multiplexing rule includes: determining the priority of the BFRQ and a priority of each of the at least two pieces of information based on the priority rule; selecting a maximum of two items with higher priorities from at least three items including the BFRQ and the at least two pieces of information; and separately including the maximum of two items with the higher priorities on a maximum of two PUCCH resources based on the multiplexing rule, where at least one of the maximum of two PUCCH resources is in a PUCCH format 2, the maximum of two PUCCH resources are time division multiplexed in a same slot, and the reporting content includes the maximum of two items with the higher priorities; and the sending the reporting content includes: separately sending the maximum of two items with the higher priorities on the maximum of two PUCCH resources.

It can be learned that, according to the foregoing method, when there is a reporting conflict among at least three resources for carrying information, on the one hand, two pieces of information with higher priorities are determined by using the priority rule, and on the other hand, PUCCH resources corresponding to the two pieces of information are multiplexed, by using the multiplexing rule, in a same slot in a time division multiplexing manner for reporting. According to this solution, not only a problem of a reporting conflict among three or more pieces of information can be overcome, but also important, urgent, and consequence-prone information can be transmitted while correct transmission is ensured, thereby improving stability of the communications system and saving some communication resources.

Based on the first aspect, in a possible embodiment, the BFRQ is configured to be carried on a PUCCH resource, a PUSCH resource, or a PRACH) resource.

In an implementation of reporting the BFRQ information in one step, the BFRQ information may include one or more of link failure indication information, identification information of a cell in which a link failure occurs, and reference signal information (a new beam) for link recovery.

Based on the first aspect, in a possible embodiment, in an implementation of reporting the BFRQ information in two steps, after the terminal device detects a link fault, the terminal device sends first beam failure recovery request (or referred to as BFRQ 1 for short) information, where the BFRQ 1 may include link failure indication information and/or identification information of a cell in which a link failure occurs; and the terminal device sends second beam failure recovery request (or referred to as BFRQ 2 for short) information, where the BFRQ 2 may include reference signal information (a new beam) for link recovery. Optionally, the BFRQ 1 may further indicate whether there is a new beam. For example, the terminal device may send the BFRQ 1 in a primary cell (PCell), and send the BFRQ 2 in a secondary cell (SCell).

A resource for carrying the BFRQ 1 information may be a PUCCH resource, and a resource for carrying the BFRQ 2 information may be a PUSCH resource.

Alternatively, a resource for carrying the BFRQ 1 information may be a PRACH resource, and a resource for carrying the BFRQ 2 information may be a PUSCH resource.

Alternatively, a resource for carrying the BFRQ 1 information may be a PUCCH resource, and a resource for carrying the BFRQ 2 information may be a PRACH resource.

Alternatively, a resource for carrying the BFRQ 1 information may be a PUCCH resource, and a resource for carrying the BFRQ 2 information may be a PUSCH resource.

Based on the first aspect, in a possible embodiment, in another implementation of reporting the BFRQ information in two steps, after the terminal device detects a link fault, the terminal device sends BFRQ 1 information, where the BFRQ 1 may include link failure indication information; and the terminal device sends BFRQ 2 information, where the BFRQ 2 may include identification information of a cell in which a link failure occurs and/or reference signal information for link recovery. For example, the terminal device may send the BFRQ 1 in a primary cell (PCell), and send the BFRQ 2 in a secondary cell (SCell).

A resource for carrying the BFRQ 1 information may be a PUCCH resource, and a resource for carrying the BFRQ 2 information may be a PUSCH resource.

Alternatively, a resource for carrying the BFRQ 1 information may be a PRACH resource, and a resource for carrying the BFRQ 2 information may be a PUSCH resource.

Alternatively, a resource for carrying the BFRQ 1 information may be a PUCCH resource, and a resource for carrying the BFRQ 2 information may be a PRACH resource.

According to a second aspect, an embodiment of the present invention provides an information reporting method. The method may be described from a terminal device side and include: when there is a reporting conflict between a first SINR (or referred to as an L1-SINR) and at least one piece of information, determining reporting content based on at least one of a priority rule and a multiplexing rule, where the at least one piece of information includes first information, the first information includes any one of CSI, a HARQ, an SR, or third information, the CSI includes at least one of a CRI, an SSB-index, an RI, a PMI, a CQI, or RSRP, the third information includes a second SINR and RSRP (or referred to as an L1-SINR and L1-RSRP, where the L1-SINR may be different from the first SINR), and the priority rule includes at least one of the following: a priority of the first SINR is higher than a priority of the CSI, a priority of the first SINR is lower than a priority of the HARQ, a priority of the first SINR is lower than a priority of the SR, or a priority of the first SINR is lower than a priority of the third information; and sending the reporting content, where the reporting content includes one item with a highest priority in at least two items including the first SINR and the at least one piece of information.

It may be understood that the first SINR (the L1-SINR) may be determined by a terminal device based on a downlink reference signal. The L1-SINR indicates a ratio of a signal to interference, where both a signal factor (a non-interference factor) and an interference factor are considered.

It can be learned that, when the terminal device determines, based on the downlink reference signal, that the L1-SINR needs to be reported to a network device, if there is a reporting conflict between a resource for carrying the L1-SINR and a resource for carrying other information (for example, other UCI information such as the CSI, the HARQ, the SR, or the third information), reporting content to be sent to the network device may be determined based on a priority relationship between L1-SINR information and other UCI information or a multiplexing relationship between L1-SINR information and other UCI information in an L1-SINR reporting process that is designed in this embodiment of the present invention. The reporting content includes one item with a highest priority in at least two items including the L1-SINR and the at least one piece of information, so that important, urgent, and consequence-prone content can be normally reported, thereby effectively avoiding impact caused by the reporting conflict, ensuring normal running of a related service, and ensuring stability of a communications system.

In a solution in which the terminal device determines the reporting content from the L1-SINR and the at least one piece of information based on the priority rule, the terminal device determines the priority of each piece of information based on the priority rule, and determines the reporting content based on the priority of each piece of information, that is, uses information with a highest priority as the reporting content; in this case, other information may not be reported. In the priority rule, at least one of the following may be designed to be true: the priority of the first SINR is higher than the priority of the CSI, the priority of the first SINR is lower than the priority of the HARQ, the priority of the first SINR is lower than the priority of the SR, or the priority of the first SINR is lower than the priority of the third information.

In a design scenario of this solution, when there is a reporting conflict between the L1-SINR and the CSI, for the CSI, for example, the L1-RSRP, only a signal factor (a non-interference factor) is considered in the L1-RSRP, and the L1-RSRP may be obtained by using only a channel measurement resource. On the one hand, the L1-SINR includes more information than the L1-RSRP. On the other hand, if the L1-SINR is not sent first, and the L1-SINR is measured and reported at other time, more resources are wasted (for example, an interference measurement resource is used for the L1-SINR but is not used for the L1-RSRP). Therefore, reporting of the L1-SINR is more urgent and important than that of other CSI. Therefore, in this embodiment of the present invention, the priority of the L1-SINR is designed to be greater than a priority of the other CSI (for example, the L1-RSRP). This helps ensure that the urgent and consequence-prone L1-SINR is preferentially reported, thereby ensuring stable running of the communications system, and saving communication resources.

When there is a reporting conflict between the L1-SINR and the HARQ, where the HARQ is a feedback on whether a piece of data is correctly transmitted, because the HARQ has greater impact on a communication procedure than the L1-SINR, in this embodiment of the present invention, the priority of the L1-SINR is designed to be lower than the priority of the HARQ. In this way, the reporting content may include the HARQ. This helps ensure that the HARQ information is preferentially reported, thereby ensuring normal execution of a related communication procedure, and helping save communication resources.

When there is a reporting conflict between the L1-SINR and the SR, where the SR is used to request an uplink scheduling resource, because the SR has greater impact on the communications system than the L1-SINR, and reporting of the SR is more urgent, in this embodiment of the present invention, the priority of the L1-SINR is designed to be lower than the priority of the SR. In this way, the reporting content may include the SR. This helps ensure that the SR information is preferentially reported, thereby ensuring normal execution of a related resource scheduling procedure, and helping save communication resources.

When there is a reporting conflict between a separate L1-SINR (the first SINR) and the third information (including the second SINR and the L1-RSRP), because an information quantity of the third information is greater than an information quantity of the separate L1-SINR, especially when the L1-SINR is relatively small, the network device cannot determine whether the L1-SINR is relatively small because of a small signal or excessively high interference. The L1-RSRP is additionally reported by using the third information, so that the network device considers interference avoidance or updates, in time, a beam direction for sending a signal, to avoid impact on normal communication of the communications system. Therefore, in this embodiment of the present invention, the priority of the third information is designed to be greater than the priority of the first SINR. This helps ensure that the important and consequence-prone third information is preferentially reported, thereby ensuring stable running of the communications system, and helping saving communication resources.

Based on the second aspect, in a possible embodiment, the at least one piece of information includes the first information (for example, the CSI, the HARQ information, the SR, or the third information), and the multiplexing rule includes: multiplexing the first SINR and the first information on a first time-frequency resource.

When the first information includes the CSI (for example, at least one of the CRI, the SSB-index, the RI, the PMI, the CQI, or the RSRP), the first time-frequency resource is a PUCCH resource configured for multi-CSI reporting, or the first time-frequency resource is a resource configured to carry the L1-SINR. The L1-SINR and the CSI are simultaneously reported by using the PUCCH resource for multi-CSI reporting or the resource for the L1-SINR, so that not only a problem of a reporting conflict can be overcome, but also successful reporting of each piece of information and normal running of various reporting services can be ensured, thereby minimizing impact on the communications system.

Alternatively, when the first information includes the HARQ, the first time-frequency resource is a resource configured to carry the L1-SINR. The HARQ is multiplexed on the resource for the L1-SINR, so that correct transmission of the two pieces of information and normal running of a channel quality and noise feedback service and a data feedback service are ensured, thereby minimizing impact on the communications system.

Alternatively, when the first information includes the SR, the first time-frequency resource is a resource configured to carry the SINR. The SR may be multiplexed on the resource for the L1-SINR, so that correct transmission of the two pieces of information and normal running of a channel quality and noise feedback service and a data feedback service are ensured, thereby minimizing impact on the communications system.

Based on the second aspect, in a possible embodiment, the at least one piece of information specifically includes at least two pieces of information, and the at least two pieces of information include the first information. When there is a reporting conflict between the L1-SINR and the at least two pieces of information, the determining reporting content based on at least one of a priority rule and a multiplexing rule includes: determining the priority of the L1-SINR and a priority of each of the at least two pieces of information based on the priority rule; selecting at least two items with highest priorities from at least three items including the L1-SINR and the at least two pieces of information; and multiplexing the at least two items with the highest priorities on the first time-frequency resource based on the multiplexing rule, where the reporting content includes the at least two items with the highest priorities; and the sending the reporting content includes: sending the at least two items with the highest priorities on the first time-frequency resource.

Based on the second aspect, in a possible embodiment, the at least one piece of information specifically includes at least two pieces of information, and the at least two pieces of information include the first information. When there is a reporting conflict between the L1-SINR and the at least two pieces of information, the determining reporting content based on at least one of a priority rule and a multiplexing rule includes: determining the priority of the L1-SINR and a priority of each of the at least two pieces of information based on the priority rule; selecting a maximum of two items with higher priorities from at least three items including the L1-SINR and the at least two pieces of information; and separately including the maximum of two items with the higher priorities on a maximum of two PUCCH resources based on the multiplexing rule, where at least one of the maximum of two PUCCH resources is in a PUCCH format 2, the maximum of two PUCCH resources are time division multiplexed in a same slot, and the reporting content includes the maximum of two items with the higher priorities; and the sending the reporting content includes: separately sending the maximum of two items with the higher priorities on the maximum of two PUCCH resources.

According to a third aspect, an embodiment of the present invention provides an information reporting method. The method may be described from a network device side and include: receiving reporting content, where the reporting content is determined based on at least one of a priority rule and a multiplexing rule when there is a reporting conflict between a BFRQ and at least one piece of information, the reporting content includes the BFRQ, the at least one piece of information includes first information, the first information includes any one of a signal to interference plus noise ratio (SINR), channel state information (CSI), a hybrid automatic repeat request (HARQ), a scheduling request (SR), or second information, the CSI includes at least one of a CRI, an SSB-index, an RI, a PMI, a CQI, or RSRP, the second information is configured to be carried on a PUSCH resource, and the priority rule includes: a priority of the BFRQ is higher than a priority of at least one of the SINR, the CSI, the HARQ, the SR, or the second information; and parsing the reporting content, to obtain the BFRQ.

It may be understood that the BFRQ is reported by a terminal device to a network device after the terminal device detects that a link between the network device and the terminal device is faulty.

It can be learned that, after the link between the terminal device and the network device is faulty, the terminal device needs to report information to the network device, and the network device may parse the reporting content based on a priority relationship between BFRQ information and other UCI information or a multiplexing relationship between BFRQ information and other UCI information in a link failure recovery process that is designed in this embodiment of the present invention, to obtain the BFRQ. The reporting content may include one item with a highest priority in at least two items including the BFRQ and the other information. Information with a higher priority is usually more important information or information that needs to be reported more urgently. Therefore, according to the method, the network device can normally obtain important, urgent, and consequence-prone content (for example, the BFRQ), thereby effectively avoiding impact caused by the reporting conflict, ensuring normal running of a related service, and ensuring stability of a communications system.

Based on the third aspect, in this embodiment of the present invention, the reporting conflict (or a collision) between the BFRQ and the at least one piece of information means that when the terminal device reports the BFRQ and the at least one piece of information to the network device, if at least two resources for carrying the BFRQ and the at least one piece of information overlap in at least one time unit and are on one carrier, it is considered that there is a reporting conflict (or a collision) between the at least two pieces of information. It should be understood that, each of the at least two pieces of information including the BFRQ and the at least one piece of information corresponds to one resource. The carrier may be a single carrier, or may be a same component carrier in a carrier aggregation (CA) scenario or a dual connectivity (DC) scenario, or may be a same bandwidth part (BWP).

Based on the third aspect, in a possible embodiment, the multiplexing rule includes: multiplexing the BFRQ and the first information (for example, the SINR, the CSI, the HARQ information, the SR, or the second information) on a first time-frequency resource.

When the first information includes the SINR, the first time-frequency resource is a physical uplink control channel (PUCCH) resource configured for multi-CSI reporting, or the first time-frequency resource is a resource configured to carry the SINR. For example, the BFRQ is a BFRQ 1, the BFRQ 1 is used to indicate that a link failure occurs in at least one cell, the BFRQ 1 may be transmitted by using 1 bit, and the L1-SINR requires more than 1 bit for transmission. Therefore, the PUCCH resource preconfigured to carry the L1-SINR is larger, and the BFRQ 1 may be multiplexed on the PUCCH resource for the L1-SINR for transmission, to ensure correct transmission of the two pieces of information, parsing of the two pieces of information by the network device, and normal running of a link recovery service and a signal-to-interference ratio reporting service, thereby minimizing impact on the communications system.

Alternatively, when the first information includes the CSI (for example, at least one of the CRI, the SSB-index, the RI, the PMI, the CQI, or the RSRP), the first time-frequency resource is a PUCCH resource configured for multi-CSI reporting. The BFRQ and the CSI are simultaneously reported by using the PUCCH resource for multi-CSI reporting, so that not only a problem of a reporting conflict can be overcome, but also correct transmission of each piece of information, parsing of each piece of information by the network device, and normal running of various reporting services can be ensured, thereby minimizing impact on the communications system.

Alternatively, when the first information includes the HARQ, the first time-frequency resource is a resource configured to carry the HARQ. For example, the BFRQ is a BFRQ 1, and the BFRQ 1 is used to indicate that a link failure occurs in at least one cell. In this case, the BFRQ 1 may require only 1 bit for transmission. A quantity of bits for the HARQ is usually greater than 1, and the resource for the HARQ may carry more information. Therefore, the BFRQ 1 is multiplexed on the resource for the HARQ. For another example, the BFRQ is a BFRQ 2, and the BFRQ 2 is used to indicate an identifier of a cell in which a link failure occurs and/or a resource index of a reference signal used to recover the cell in which the link failure occurs. A quantity of bits for the BFRQ 2 is usually greater than that for the HARQ, and a resource for the BFRQ 2 may carry more information. Therefore, the HARQ is multiplexed on the resource for the BFRQ 2. The foregoing example can ensure correct transmission of the two pieces of information, parsing of the two pieces of information by the network device, and normal running of a link recovery service and a data feedback service, thereby minimizing impact on the communications system.

Alternatively, when the first information includes the SR, the first time-frequency resource is a resource configured to carry the BFRQ. For example, the BFRQ is a BFRQ 1, and the BFRQ 1 is used to indicate that a link failure occurs in at least one cell. Alternatively, the BFRQ 1 may be request information that has a same format as the SR, and the SR and the BFRQ 1 may be sent after a logical "OR" operation is performed on the SR and the BFRQ 1. In this case, the two pieces of information are both used to request uplink resources, and may be combined into one piece of information for sending, that is, the BFRQ 1 is multiplexed on a resource for the BFRQ 1. For another example, the BFRQ is a BFRQ 2, and the BFRQ 2 is used to indicate an identifier of a cell in which a link failure occurs and/or a resource index of a reference signal used to recover the cell in which the link failure occurs. The BFRQ 2 requires more than 1 bit for transmission, the SR usually requires only 1 bit for transmission, and a resource for the BFRQ 2 may carry more information. Therefore, the SR may be multiplexed on the resource for the BFRQ 2. The foregoing example can ensure correct transmission of the two pieces of information, parsing of the two pieces of information by the network device, and normal running of a link recovery service and a data feedback service, thereby minimizing impact on the communications system.

Alternatively, when the first information includes the second information, the first time-frequency resource is the PUSCH resource, and the BFRQ and the second information are independently encoded. Optionally, if the second information includes UCI information, the BFRQ and the UCI information are independently encoded. For example, a bit rate of the BFRQ is less than or equal to a bit rate of the UCI information. The BFRQ and the second information are simultaneously reported by using the PUSCH resource, so that not only a problem of a reporting conflict can be overcome, but also successful reporting of each piece of information and normal running of various reporting services can be ensured, thereby minimizing impact on the communications system.

Based on the third aspect, in a possible embodiment, when the BFRQ and the at least one piece of information are both applicable to the priority rule and the multiplexing rule, the reporting content is determined by preferentially using the multiplexing rule. In this embodiment, as much information as possible can be transmitted while correct transmission is ensured, and transmission efficiency can be improved.

Based on the third aspect, in a possible embodiment, the at least one piece of information specifically includes at least two pieces of information, and the at least two pieces of information include the first information. When there is a reporting conflict between the BFRQ and the at least two pieces of information, the reporting content is determined based on both the priority rule and the multiplexing rule.

In an implementation, the reporting content is determined by the terminal device according to the following method: determining the priority of the BFRQ and a priority of each of the at least two pieces of information based on the priority rule; selecting at least two items with highest priorities from at least three items including the BFRQ and the at least two pieces of information; and multiplexing the at least two items with the highest priorities on the first time-frequency resource based on the multiplexing rule, where the reporting content includes the at least two items with the highest priorities In another implementation, the reporting content is determined by the terminal device according to the following method: determining the priority of the BFRQ and a priority of each of the at least two pieces of information based on the priority rule; selecting a maximum of two items with higher priorities from at least three items including the BFRQ and the at least two pieces of information; and separately including the maximum of two items with the higher priorities on a maximum of two PUCCH resources based on the multiplexing rule, where at least one of the maximum of two PUCCH resources is in a PUCCH format 2, the maximum of two PUCCH resources are time division multiplexed in a same slot, and the reporting content includes the maximum of two items with the higher priorities.

The network device may parse the reporting content with reference to the priority rule and the multiplexing rule. This manner can make full use of advantages of the priority rule and the multiplexing rule, so that a problem of a reporting conflict among three or more pieces of information can be overcome, and the network device obtains through parsing more important, urgent, and consequence-prone information while correct transmission is ensured, thereby improving stability of the communications system and saving some communication resources.

Based on the third aspect, in a possible embodiment, the BFRQ is configured to be carried on a PUCCH resource, a PUSCH resource, or a PRACH resource. In an implementation of reporting the BFRQ information in one step, the BFRQ information may include one or more of link failure indication information, identification information of a cell in which a link failure occurs, and reference signal information (a new beam) for link recovery.

Based on the third aspect, in a possible embodiment, in an implementation of reporting the BFRQ information in two steps, the network device receives first beam failure recovery request (or referred to as BFRQ 1 for short) information sent by the terminal device, where the BFRQ 1 may include link failure indication information and/or identification information of a cell in which a link failure occurs; and receives second beam failure recovery request (or referred to as BFRQ 2 for short) information sent by the terminal device, where the BFRQ 2 may include reference signal information (a new beam) for link recovery. Optionally, the BFRQ 1 may further indicate whether there is a new beam. For example, the terminal device may send the BFRQ 1 in a primary cell (PCell) to the network device, and send the BFRQ 2 in a secondary cell (SCell) to the network device.

A resource for carrying the BFRQ 1 information may be a PUCCH resource, and a resource for carrying the BFRQ 2 information may be a PUSCH resource.

Alternatively, a resource for carrying the BFRQ 1 information may be a PRACH resource, and a resource for carrying the BFRQ 2 information may be a PUSCH resource.

Alternatively, a resource for carrying the BFRQ 1 information may be a PUCCH resource, and a resource for carrying the BFRQ 2 information may be a PRACH resource.

Alternatively, a resource for carrying the BFRQ 1 information may be a PUCCH resource, and a resource for carrying the BFRQ 2 information may be a PUSCH resource.

Based on the third aspect, in a possible embodiment, in another implementation of reporting the BFRQ information in two steps, the network device receives BFRQ 1 information sent by the terminal device, where the BFRQ 1 may include link failure indication information; and the network device receives BFRQ 2 information sent by the terminal device, where the BFRQ 2 may include identification information of a cell in which a link failure occurs and/or reference signal information for link recovery. For example, the terminal device may send the BFRQ 1 in a primary cell (PCell) to the network device, and send the BFRQ 2 in a secondary cell (SCell) to the network device.

A resource for carrying the BFRQ 1 information may be a PUCCH resource, and a resource for carrying the BFRQ 2 information may be a PUSCH resource.

Alternatively, a resource for carrying the BFRQ 1 information may be a PRACH resource, and a resource for carrying the BFRQ 2 information may be a PUSCH resource.

Alternatively, a resource for carrying the BFRQ 1 information may be a PUCCH resource, and a resource for carrying the BFRQ 2 information may be a PRACH resource.

According to a fourth aspect, an information reporting method is provided. The method may be described from a network device side and include: receiving reporting content, where the reporting content is determined based on at least one of a priority rule and a multiplexing rule when there is a reporting conflict between a first SINR and at least one piece of information, the at least one piece of information includes first information, the first information includes any one of CSI, a HARQ, an SR, or third information, the CSI includes at least one of a CRI, an SSB-index, an RI, a PMI, a CQI, or RSRP, the third information includes a second SINR and RSRP, and the priority rule includes at least one of the following: a priority of the first SINR is higher than a priority of the CSI, a priority of the first SINR is lower than a priority of the HARQ, a priority of the first SINR is lower than a priority of the SR, or a priority of the first SINR is lower than a priority of the third information; and parsing the reporting content.

It may be understood that the first SINR (the L1-SINR) may be determined by a terminal device based on a downlink reference signal. The L1-SINR indicates a ratio of a signal to interference, where both a signal factor (a non-interference factor) and an interference factor are considered.

It can be learned that, when a network device receives the reporting content of the terminal device, the network device may parse the reporting content based on a priority relationship between BFRQ information and other UCI information or a multiplexing relationship between BFRQ information and other UCI information in a link failure recovery process that is designed in this embodiment of the present invention, where the reporting content includes one item with a highest priority in at least two items including the L1-SINR and the at least one piece of information. Information with a higher priority is usually more important information or information that needs to be reported more urgently. Therefore, according to the method, the network device can normally obtain important, urgent, and consequence-prone content (for example, the BFRQ), thereby effectively avoiding impact caused by the reporting conflict, ensuring normal running of a related service, and ensuring stability of a communications system.

Based on the fourth aspect, in a possible embodiment, the at least one piece of information includes the first information (for example, the CSI, the HARQ information, the SR, or the third information), and the multiplexing rule includes: multiplexing the first SINR and the first information on a first time-frequency resource.

When the first information includes the CSI (for example, at least one of the CRI, the SSB-index, the RI, the PMI, the CQI, or the RSRP), the first time-frequency resource is a PUCCH resource configured for multi-CSI reporting, or the first time-frequency resource is a resource configured to carry the L1-SINR. The L1-SINR and the CSI are simultaneously reported by using the PUCCH resource for multi-CSI reporting or the resource for the L1-SINR, so that not only a problem of a reporting conflict can be overcome, but also successful reporting of each piece of information, normal running of various reporting services, parsing of each piece of information by the network device can be ensured, thereby minimizing impact on the communications system.

Alternatively, when the first information includes the HARQ, the first time-frequency resource is a resource configured to carry the L1-SINR. The HARQ is multiplexed on the resource for the L1-SINR, so that correct transmission of the two pieces of information, parsing of the two pieces of information by the network device, and normal running of a channel quality and noise feedback service and a data feedback service are ensured, thereby minimizing impact on the communications system.

Alternatively, when the first information includes the SR, the first time-frequency resource is a resource configured to carry the SINR. The SR may be multiplexed on the resource for the L1-SINR, so that correct transmission of the two pieces of information, parsing of the two pieces of information by the network device, and normal running of a channel quality and noise feedback service and a data feedback service are ensured, thereby minimizing impact on the communications system.

Correspondingly, in the foregoing example, the network device may receive the reporting content on the first time-frequency resource.

Based on the fourth aspect, in a possible embodiment, the at least one piece of information specifically includes at least two pieces of information, and the at least two pieces of information include the first information. When there is a reporting conflict between the BFRQ and the at least two pieces of information, the reporting content is determined based on both the priority rule and the multiplexing rule.

In an implementation, the reporting content is determined by the terminal device according to the following method: determining the priority of the L1-SINR and a priority of each of the at least two pieces of information based on the priority rule; selecting at least two items with highest priorities from at least three items including the L1-SINR and the at least two pieces of information; and multiplexing the at least two items with the highest priorities on the first time-frequency resource based on the multiplexing rule, where the reporting content includes the at least two items with the highest priorities; and the sending the reporting content includes: sending the at least two items with the highest priorities on the first time-frequency resource.

In another implementation, the reporting content is determined by the terminal device according to the following method: determining the priority of the L1-SINR and a priority of each of the at least two pieces of information based on the priority rule; selecting a maximum of two items with higher priorities from at least three items including the L1-SINR and the at least two pieces of information; and separately including the maximum of two items with the higher priorities on a maximum of two PUCCH resources based on the multiplexing rule, where at least one of the maximum of two PUCCH resources is in a PUCCH format 2, the maximum of two PUCCH resources are time division multiplexed in a same slot, and the reporting content includes the maximum of two items with the higher priorities; and the sending the reporting content includes: separately sending the maximum of two items with the higher priorities on the maximum of two PUCCH resources.

The network device may parse the reporting content with reference to the priority rule and the multiplexing rule. This manner can make full use of advantages of the priority rule and the multiplexing rule, so that a problem of a reporting conflict among three or more pieces of information can be overcome, and the network device obtains through parsing more important, urgent, and consequence-prone information while correct transmission is ensured, thereby improving stability of the communications system and saving some communication resources.

According to a fifth aspect, an embodiment of the present invention provides an information reporting apparatus, including: a memory that stores executable program code; a processor coupled to the memory; and a communications interface for communicating with the outside. The processor invokes the executable program code stored in the memory, to perform the method described in any one of the embodiments of the first aspect.

According to a sixth aspect, an embodiment of the present invention provides an information reporting apparatus, including: a memory that stores executable program code; a processor coupled to the memory; and a communications interface for communicating with the outside. The processor invokes the executable program code stored in the memory, to perform the method described in any one of the embodiments of the second aspect.

According to a seventh aspect, an embodiment of the present invention provides an information reporting apparatus, including: a memory that stores executable program code; a processor coupled to the memory; and a communications interface for communicating with the outside. The processor invokes the executable program code stored in the memory, to perform the method described in any one of the embodiments of the third aspect.

According to an eighth aspect, an embodiment of the present invention provides an information reporting apparatus, including: a memory that stores executable program code; a processor coupled to the memory; and a communications interface for communicating with the outside. The processor invokes the executable program code stored in the memory, to perform the method described in any one of the embodiments of the fourth aspect.

According to a ninth aspect, an embodiment of the present invention provides an apparatus. The apparatus may be used in a terminal device and include a conflict resolution module and a communications module. The apparatus may be configured to implement a function of the terminal device described in any one of the embodiments of the first aspect or the second aspect.

According to a tenth aspect, an embodiment of the present invention provides an apparatus. The apparatus may be used in a network device and include a communications module and a parsing module. The apparatus may be configured to implement a function of the network device described in any one of the embodiments of the third aspect or the fourth aspect.

According to an eleventh aspect, an embodiment of the present invention provides a computer-readable storage medium. The computer-readable storage medium stores a computer program, the computer-readable storage medium stores a computer program, the computer program includes program instructions, and when the program instructions are executed by an execution processor, the processor is enabled to perform the method described in any one of the embodiments of the first aspect, the method described in any one of the embodiments of the second aspect, the method described in any one of the embodiments of the third aspect, or the method described in any one of the embodiments of the fourth aspect.

According to a twelfth aspect, an embodiment of the present invention provides a computer program product. When the computer program product runs on a computer, a program is executed to implement the method described in any one of the embodiments of the first aspect, the method described in any one of the embodiments of the second aspect, the method described in any one of the embodiments of the third aspect, or the method described in any one of the embodiments of the fourth aspect.

It can be learned that, according to the embodiments of the present invention, when the terminal device needs to report the BFRQ or the SINR (denoted as a BFRQ/SINR), if there is a reporting conflict between the resource for carrying the BFRQ/SINR and a resource for carrying other information, reporting content to be sent to the network device may be determined based on a priority relationship between a BFRQ/SINR and other information or a multiplexing relationship between a BFRQ/SINR and other information that is designed in the embodiments of the present invention, so that important, urgent, and consequence-prone content can be normally reported, thereby effectively avoiding impact caused by the reporting conflict, ensuring normal running of a related service, and ensuring stability of the communications system.

BRIEF DESCRIPTION OF DRAWINGS

FIG. 4-1 is a schematic diagram of a scenario in which there is a reporting conflict between at least two pieces of information according to an embodiment of the present invention;

FIG. 4-2 is a schematic diagram of another scenario in which there is a reporting conflict between at least two pieces of information according to an embodiment of the present invention;

DESCRIPTION OF EMBODIMENTS

The following clearly describes the technical solutions in the embodiments of the present invention with reference to the accompanying drawings.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The technical solutions in the embodiment of the present invention may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), and a worldwide interoperability for microwave access (WiMAX) communications system, and are especially applicable to a fifth generation (5G) mobile communications system or a new radio (NR) access technology communications system. The 5G mobile communications system described in the embodiments of the present invention includes a non-standalone (NSA) 5G mobile communications system and/or a standalone (SA) 5G mobile communications system. The technical solutions provided in the embodiments of the present invention may be further applied to a future communications system, for example, a sixth generation mobile communications system. The communications system to which the technical solutions provided in the embodiments of the present invention are applied may alternatively be a public land mobile network (PLMN), a device-to-device (D2D) network, a machine to machine (M2M) network, an internet of things (IoT), or another network.

Figure 1:
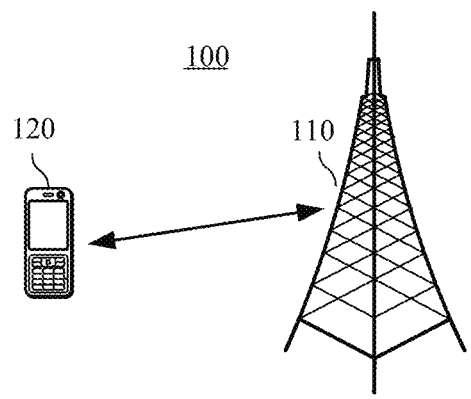
FIG. 1 is a schematic diagram of an example of a communications system according to an embodiment of the present invention.

FIG. 1 is a schematic diagram of an example of a communications system 100 to which the embodiments of the present invention are applicable. The communications system 100 is in a single carrier scenario or a carrier aggregation (CA) scenario. In the CA scenario, the communications system 100 may include a plurality of component carriers (CCs). The communications system 100 includes a network device 110 and a terminal device 120. The network device 110 communicates with the terminal device 120 by using a wireless network.

In some actual applications, a link between the network device 110 and the terminal device 120 may be faulty. For example, the communications system 100 (for example, a 5G or next-generation communications system) may use a high frequency band, especially a millimeter wave band, as an operating frequency band. On the one hand, the high frequency band has a larger available bandwidth to meet ever-increasing requirements of users for a capacity. On the other hand, a modern communications system usually uses a multi-antenna technology to improve a system capacity and coverage or improve user experience, and a size of a multi-antenna configuration can be greatly reduced by using the high frequency band, thereby facilitating site acquisition and deployment of more antennas.

However, a difference between the high frequency band and an operating frequency band of an existing communications system such as an LTE communications system lies in that the high frequency band causes a larger path loss, and especially, a loss in radio propagation further becomes larger due to factors such as atmosphere and vegetation. To overcome the larger propagation loss, a signal transmission mechanism that is based on a beamforming technology is used, to compensate for the loss in a signal propagation process by using a relatively high antenna gain. Beamformed signals may include a broadcast signal, a synchronization signal, a cell-specific reference signal, and the like. When a signal is transmitted based on the beamforming technology, when the terminal device 120 moves, a direction of a beamformed beam corresponding to the transmitted signal may no longer match a position of the terminal device 120 after the movement, leading to a problem of frequent signal interrupts, that is, a link fault.

After the terminal device 120 detects that the link between the network device 110 and the terminal device 120 is faulty, the terminal device 120 sends a link failure recovery request (beam failure recovery request, BFRQ) to the network device 110. Optionally, after receiving the BFRQ, the network device 110 sends a beam failure recovery response (BFRR) to the terminal device 120 or reconfigures a link.

It should be understood that, the network device 110 in FIG. 1 may include one or more cells, for example, a first cell and a second cell. If a link that is between the network device 110 and the terminal device 120 and that is in the second cell is faulty, the first cell may assist in link recovery in the second cell. For example, the terminal device 120 may send the BFRQ to the network device 110 on an uplink resource that belongs to the first cell, and the terminal device may receive, on a downlink resource that belongs to the second cell, the BFRR sent by the network device.

In some other actual applications, a signal is interfered with by some external energy in a transmission process. The energy is noise, and a source of the energy may come from the outside of the terminal device 120 (for example, noise caused by a stray electromagnetic field), or may be generated by the terminal device 120 (for example, noise generated by a component or a circuit), and the noise may cause signal distortion. Noise strength is usually directly proportional to a signal bandwidth. Therefore, a signal to interference plus noise ratio (SINR) may be used to evaluate noise strength or a capability of resisting noise by the terminal device 120. The SINR specifically indicates a ratio of power of a wanted signal to total power of an interference signal plus electromagnetic noise at a specific point on a transmission channel measured under a given condition. The SINR can objectively reflect network signal purity and link quality of a current channel, and is an important indicator for measuring a performance parameter of the terminal device 120. The SINR may also be referred to as a layer 1-SINR (L1-SINR). The terminal device 120 may obtain the SINR by measuring a reference signal that is delivered by the network device 110 on a physical downlink control channel, and report the SINR to the network device 110 based on a predetermined reporting occasion.

In the embodiments of the present invention, the component carrier may also be referred to as a component carrier, or the like. Carrier aggregation may refer to aggregation of a plurality of consecutive or non-consecutive component carriers into a larger bandwidth. Each carrier in multi-carrier aggregation may be referred to as a "CC". Each carrier includes one or more physical resource blocks (PRBs). There may be a corresponding physical downlink control channel (PDCCH) on each carrier, and the PDCCH is used to schedule a physical downlink shared channel (PDSCH) on the respective CC. Alternatively, there may be no PDCCH on some carries. In this case, cross-carrier scheduling may be performed on the carriers, that is, a PDCCH on one CC is used to schedule a PDSCH on another CC. The terminal device may receive data on a plurality of CCs. It may be understood that the terminal device may send data on a plurality of CCs. A specific manner is similar to that of receiving data, and details are not described again.

Figure 2:
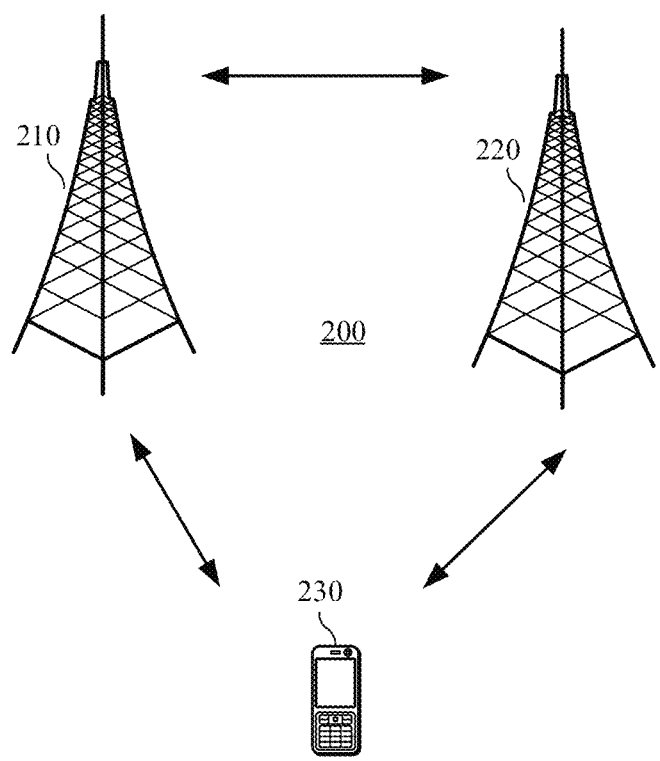
FIG. 2 is a schematic diagram of an example of another communications system according to an embodiment of the present invention.

FIG. 2 is a schematic diagram of an example of another communications system 200 to which the embodiments of the present invention are applicable. The communications system 200 is in a dual connectivity (DC) or coordinated multipoint transmission/reception (CoMP) scenario. The communications system 200 includes a network device 210, a network device 220, and a terminal device 230. The network device 210 is a network device that is initially accessed by the terminal device 230, and is responsible for radio resource control (RRC) protocol communication with the terminal device 230. The network device 220 is added during RRC reconfiguration, and may be configured to provide an additional radio resource for the terminal device 230. The terminal device 230 configured with carrier aggregation (CA) may communicate with the network device 210/network device 220, and the network device 210 may also communicate with the network device 220. A link between the network device 210 and the terminal device 230 may be referred to as a first link, and a link between the network device 220 and the terminal device 230 may be referred to as a second link.

In some actual applications, when both the network device 210 and the network device 220 may configure, for the terminal device 230, uplink resources used to transmit a BFRQ, if the first link or the second link is faulty, the terminal device 230 may send the BFRQ to the network device 210 or the network device 220 on the uplink resource used to transmit the BFRQ. After receiving the BFRQ, the network device 210 or the network device 220 sends a BFRR to the terminal device 230.

Particularly, if the network device 210 configures an uplink resource used to transmit a BFRQ, but the network device 220 does not configure an uplink resource used to transmit a BFRQ, when the second link is faulty, the terminal device 230 may recover the second link by using the network device 210. For example, the terminal device 230 may send a BFRQ for the second link to the network device 210 through the first link, and then the network device 210 sends the BFRQ to the network device 220. The network device 220 sends a BFRR to the terminal device 230.

It should be understood that, the technical solutions in the embodiments of the present invention may be applied to a carrier aggregation (CA) scenario in which one cell assists in link recovery in another cell or a plurality of cells, or a dual connectivity (DC) scenario in which one cell in one cell group assists in link recovery in another cell or a plurality of cells in the same cell group, or one cell in one cell group assists in link recovery in another cell or a plurality of cells in a different cell group.

It should be understood that, the technical solutions in the embodiments of the present invention may be further applied or a component carrier, carrier aggregation (CA), or DC scenario in which in a cell, link failure recovery of the cell is performed on a resource of the cell.

In some other actual applications, when both the network device 210 and the network device 220 may configure, for the terminal device 230, uplink resources used to transmit a SINR, when the terminal device 230 needs to report the SINR on a predetermined reporting occasion, the terminal device 230 may send the SINR to the network device 210 or the network device 220 on the uplink resource used to transmit the SINR.

Particularly, if the network device 210 configures an uplink resource used to transmit a SINR, but the network device 220 does not configure an uplink resource used to transmit a SINR, when the terminal device 230 needs to report a SINR in communication between the network device 220 and the terminal device 230, the terminal device 230 may send the SINR to the network device 210, and then sends the SINR to the network device 220 by using the network device 210.

It should be noted that, the communications system 100 and the communications system 200 to which the embodiments of the present invention are applicable are merely examples for description, and the communications system to which the embodiments of the present invention are applicable is not limited thereto. For example, other quantities of network devices and terminal devices may alternatively be included in the communications system, or a single base station scenario, a multi-carrier aggregation scenario, a dual connectivity scenario, or a device-to-device (D2D) communication scenario may be used.

It should be further noted that the technical solutions in the embodiments of the present invention are applicable to a case in which a primary cell (PCell) uses a high frequency or a low frequency, and a secondary cell (SCell) uses a high frequency or a low frequency. For example, the PCell uses a low frequency, and the SCell uses a high frequency. In a possible implementation, for an SCell for which no uplink resource is configured, an uplink resource of the PCell may be used to assist in link recovery in the SCell. Usually, the low frequency and the high frequency are relative to each other, or may be differentiated based on a specific frequency, for example, 6 GHz.

The primary cell may also be referred to as a primary serving cell. The primary cell/primary serving cell is a cell on which a CA terminal device camps. Usually, only the PCell has a physical uplink control channel (PUCCH). The secondary cell is a cell that is configured for the terminal device by using RRC signaling after the terminal device enters an RRC connected mode. Carrier aggregation is performed on a primary component carrier and a secondary component carrier (SCC), to provide more radio resources for the terminal device. In the SCell, there may be only downlink transmission or both uplink and downlink transmission.

It should be further understood that, in the embodiments of the present invention, the "cell" may be understood as a "serving cell" or a "carrier". Optionally, the cell includes at least one of a downlink carrier, an uplink (UL) carrier, and a supplementary uplink (SUL) carrier. Specifically, the cell may include a downlink carrier and an uplink carrier; or the cell may include a downlink carrier and a supplementary uplink carrier; or the cell includes a downlink carrier, an uplink carrier, and a supplementary uplink carrier. Optionally, a carrier frequency of the supplementary uplink carrier is lower than that of the uplink carrier, to improve uplink coverage. Optionally, usually, in an FDD system, a carrier frequency of an uplink carrier is different from that of a downlink carrier. In a TDD system, a carrier frequency of an uplink carrier is the same as that of a downlink carrier. It should be further understood that, in the embodiments of the present invention, an uplink resource is on the uplink carrier, and a downlink resource is on the downlink carrier. The uplink carrier may be a normal uplink carrier or a supplementary uplink (SUL) carrier.

It should be understood that, in the embodiments of the present invention, "a reporting conflict between two pieces of information" may be understood as that "the two pieces of information are carried on two different resources, and there is a conflict between the two resources corresponding to the two pieces of information". A resource configured to carry a piece of information may be understood as a resource used to carry the piece of information. When there is no conflict between the resource and another resource, the piece of information may be sent on the resource. When there is a conflict between the resource and another resource, the piece of information may be sent on the resource, the piece of information may not be sent on the resource, or the piece of information and other information may be sent on the resource. Information to be sent on the resource or sending of no information on the resource may be specifically determined based on a priority rule and a multiplexing rule in the present invention.

It should be understood that, the technical solutions in the embodiments of the present invention may be further applied to a coordinated multipoint transmission/reception (CoMP) scenario in which one TRP assists another TRP in link recovery. The CoMP scenario may be one or more of a non-coherent joint transmission (NCJT) scenario, a coherent joint transmission (CJT) scenario, a joint transmission (JT) scenario, or the like.

The terminal device (for example, the terminal device 120 or the terminal device 230) described in the embodiments of the present invention may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in an LTE network, a terminal device in a 5G network, a terminal device in a future evolved public land mobile network (PLMN), or the like. This is not limited in the embodiments of the present invention.

By way of example and not limitation, in the embodiments of the present invention, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn by a user or integrated into clothes or an accessory of a user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device in the embodiments of the present invention may alternatively be a terminal device in an internet of things (IoT) system. An IoT is an important part of future development of information technologies. A main technical feature of the IoT is connecting a thing to a network by using a communications technology, to implement an intelligent network for interconnection between a person and a machine or between things. In the embodiments of the present invention, an IoT technology may implement massive connections, deep coverage, and terminal power saving by using, for example, a narrowband (NB) technology.

In addition, in the embodiments of the present invention, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

The network device described in the embodiments of the present invention may be a device configured to communicate with the terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a 5G network, a network device in a future evolved PLMN network, or the like. This is not limited in the embodiments of the present invention.

The network device may be specifically a device in a wireless network. For example, the network device is a radio access network (RAN) node that connects a terminal to the wireless network. Currently, some examples of the RAN node are a base station, a next-generation NodeB gNB, a transmission reception point (TRP), an evolved NodeB (eNB), a home base station, a baseband unit (BBU), and an access point (AP) in a Wi-Fi system. In a network structure, the network device may include a centralized unit (CU) node, a distributed unit (DU) node, or a RAN device including a CU node and a DU node.

When transmission of the communications system is uplink transmission, the terminal device is a transmit end, and the network device is a receive end. When transmission of the communications system is downlink transmission, the network device is a transmit end, and the terminal device is a receive end.

To improve efficiency of blindly detecting a control channel by the terminal device, the concept of control resource set (CORESET) is proposed in an NR standard formulation process. The network device may configure one or more resource sets for the terminal device, to send a physical downlink control channel (PDCCH). The network device may send control information to the terminal device on any control resource set corresponding to the terminal device. In addition, the network device further needs to notify the terminal device of another configuration, for example, a search space set, associated with the control resource set. Configuration information of each control resource set is different. For example, there is a frequency domain width difference or a time domain length difference. It is extensible that the control resource set in the embodiments of the present invention may be a CORESET, a control region, or an enhanced physical downlink control channel (ePDCCH) set that is defined in a 5G mobile communications system. A time-frequency position occupied by the PDCCH may be referred to as a downlink control region. In NR, a downlink control region may be flexibly configured by using RRC signaling based on a control resource set (CORESET) and a search space set. The control resource set may be used to configure information such as a frequency domain position of a PDCCH or a control channel element (CCE) and a quantity of consecutive symbols in time domain. The search space set may be used to configure information such as a PDCCH detection periodicity and offset and a start symbol in a slot.

For example, if it may be configured in the search space set in such a manner that the PDCCH periodicity is one slot and the start symbol in time domain is a symbol 0, the terminal device may detect a PDCCH at a start position of each slot.

In the communications system, because a path loss of a high frequency band is relatively large, fading of a high carrier frequency signal in free space is relatively greater, a signal transmission mechanism that is based on a beamforming technology is used to resolve the foregoing problem. Beamforming is also referred to as beamforming or spatial filtering, and is a signal processing technology of using a sensor array to send and receive signals directionally. In the beamforming technology, a parameter of a basic unit of a phase array is adjusted, so that signals at some angles experience constructive interference while signals at the other angles experience destructive interference. Beamforming may be applied to both a signal transmit end and a signal receive end. At the transmit end, a beamformer controls a phase and a signal amplitude of each transmitting apparatus, to obtain required constructive and destructive interference modes in a transmitted signal wave array. At the receive end, signals received by different receivers are combined in a proper manner, to obtain an expected signal radiation pattern. Specifically, to meet a signal coverage requirement, the network device in the communications system may send a plurality of directional beams at different time points, to ensure that the plurality of beams can cover an entire sector. A terminal device in the sector may detect a signal (information) that is sent by the network device by using a beam. Therefore, handovers between different beamformed beams are more dynamic and frequent than cell handovers.

The beam is a communication resource. The beam may be a wide beam, a narrow beam, or a beam of another type. A technology for forming a beam may be the beamforming technology or may be another technology. The beamforming technology may be specifically a digital beamforming technology, an analog beamforming technology, or a hybrid digital/analog beamforming technology. Same information or different information may be sent by using different beams. Optionally, a plurality of beams having a same or similar communication feature may be considered as one beam. One beam may include one or more antenna ports, configured to transmit a data channel, a control channel, a sounding signal, and the like. For example, a transmit beam may be signal strength distribution formed in different directions in space after a signal is transmitted by an antenna, and a receive beam may be signal strength distribution in different directions in space of a radio signal received from an antenna. It may be understood that, one or more antenna ports forming one beam may also be considered as one antenna port set.

The antenna port may also be referred to as a port for short. The port is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

The beam may be used to describe beamforming information. Beams may be classified into a transmit beam and a receive beam of the network device, and a transmit beam and a receive beam of the terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal is used to describe receive-side beamforming information of the terminal device.

The beam may correspond to a time resource, a space resource, and/or a frequency domain resource. Optionally, the beam may further correspond to a reference signal resource (for example, a reference signal resource for beamforming). Specifically, the beam may correspond to information associated with a reference signal resource of the network device. A reference signal may be a channel state information reference signal (CSI-RS), a synchronization signal and physical broadcast channel block (synchronization signal/PBCH block, SSB), a demodulation reference signal (DMRS), a phase tracking reference signal (PTRS), a tracking reference signal (TRS), or the like. The information associated with the reference signal resource may be a reference signal resource identifier, quasi-colocation (QCL) information, especially QCL-Type D, or the like. The QCL information may be used to assist in describing receiving beamforming information by the terminal device and a receiving procedure. The reference signal resource identifier corresponds to a transmit-receive beam pair that is previously established during measurement performed based on the reference signal resource. The terminal may infer beam information by using the reference signal resource index.

The SSB indicates a synchronization signal and physical broadcast channel block (synchronization signal/PBCH block, SS/PBCH block). The PBCH is an abbreviation of a physical broadcast channel. The SSB includes at least one of a primary synchronization signal (PSS), a secondary synchronization signal (SSS), and the PBCH. The SSB is mainly used for cell searching, cell synchronization, and carrying broadcast information.

Optionally, the beam may further correspond to a spatial domain filter (spatial filter or spatial domain filter), or a spatial domain transmission filter.

The receive beam may be equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. Information about a spatial correlation parameter is equivalent to the spatial filter (spatial domain transmission/receive filter). Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. A receive beam on a terminal device side and a transmit beam on a network device side each may be a downlink spatial filter, and a transmit beam on the terminal device side and a receive beam on the network device side each may be an uplink spatial filter.

To track a change of the beamformed beam in the signal transmission process, channel quality measurement and result reporting that are based on the beamforming technology are introduced. The channel quality measurement may be based on a beamformed synchronization signal or cell-specific reference signal. A user performs handovers between different beamformed beams more dynamically and frequently. Therefore, a dynamic measurement and reporting mechanism is required. Optionally, similar to CSI information reporting, the beamformed channel quality result may be sent by the terminal device to the network device by using a PUCCH or PUSCH.

Specifically, the terminal device may measure a plurality of beams sent by the network device, to select N better beams of the network device, and report measurement information of the N better beams to the network device. The beam measurement information is beam state information (BSI), and content thereof mainly includes a beam index and reference signal received power (RSRP) of the beam.

It should be noted that, in some possible scenarios, the beam on the network device side may be represented by using a "reference signal resource". For example, a beam index 1 may be described as a reference signal resource index 1. The receive beam on the terminal side may be indicated by using a spatial Rx parameter in the QCL, and the beam state information may be described as L1-RSRP related information.

The following describes a beam training process in the communications system. FIG. 3(a) to FIG. 3(f) are a related schematic diagram of beam training. In the figure, the network device is represented by a transmission reception point (TRP), and the terminal device is represented by UE. The beam training process may include the following steps.

(1) Determine N Best Beam Pairs (Beam Pair Links, BPLs).

Figures 3A, 3B, 3C:
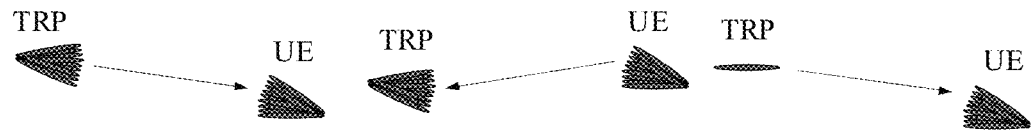
FIG. 3(a) to FIG. 3(f) are a related schematic diagram of beam training according to an embodiment of the present invention.

As shown in FIG. 3(a), the terminal device selects a transmit beam of the network device and/or a receive beam of the terminal device based on transmit beam sweeping performed by the network device, and as shown in FIG. 3(b), the network device selects a transmit beam of the terminal device and/or a receive beam of the network device based on transmit beam sweeping performed by the terminal device. Therefore, the N best beam pairs are determined based on the foregoing process. One BPL includes one transmit beam of the network device and one receive beam of the terminal device, or one BPL includes one transmit beam of the terminal device and one receive beam of the network device.

(2) Update the Transmit Beam.

Figures 3D, 3E, 3F:

As shown in FIG. 3(d), when the transmit beam is the transmit beam of the terminal, the terminal device sends reference signals to the network device by using different transmit beams, and the network device receives, by using a same receive beam, the reference signals that are sent by the terminal device by using the different transmit beams, determines a best transmit beam of the terminal device based on the received signals, and then feeds back the best transmit beam of the terminal device to the terminal device, so that the terminal device updates the transmit beam.

As shown in FIG. 3(e), when the transmit beam is the transmit beam of the network device, the network device sends reference signals to the terminal device by using different transmit beams, and the terminal device receives, by using a same receive beam, the reference signals sent by the network device by using the different transmit beams, determines a best transmit beam of the network device based on the received signals, and then feeds back the best transmit beam of the network device to the network device, so that the network device updates the transmit beams.

A process of sending the reference signals by using the different transmit beams may be referred to as beam sweeping, and a process of determining the best transmit beam based on the received signals may be referred to as beam matching.

(3) Update the Receive Beam.

As shown in FIG. 3(c), when the receive beam is the receive beam of the terminal device, the network device sends reference signals to the terminal device by using a same transmit beam, and the terminal device receives, by using different receive beams, the reference signals sent by the network device, and then determines a best receive beam of the terminal device based on the received signals, to update the receive beam of the terminal device.

As shown in FIG. 3(f), when the receive beam is the receive beam of the network device, the terminal device sends reference signals to the network device by using a same transmit beam, and the network device receives, by using different receive beams, the reference signals sent by the terminal device, and then determines a best receive beam of the network device based on the received signals, to update the receive beam of the network device.

During downlink signal transmission, both the transmit beam of the network device and the receive beam of the terminal device may dynamically change, and there may be a plurality of best receive beams determined by the terminal device based on the received signals. To enable the terminal device to determine the receive beam of the terminal device, the terminal device may feed back information about the plurality of receive beams to the network device, and the network device may indicate the receive beam of the terminal device to the terminal device by sending beam indication information to the terminal device. When analog domain beamforming is used for the terminal device, the terminal device may accurately determine the receive beam of the terminal device based on the beam indication information sent by the network device, thereby reducing beam sweeping time of the terminal device, and saving power.

In the beam training process, the network device obtains N better beam pairs (BPLs) for communication between the network device and the terminal device. Any one of the BPLs may be denoted as <Bx, B'x> or <By, B'y>, where Bx represents a transmit beam of the network device, B'x represents a receive beam of the terminal device, By represents a transmit beam of the terminal device, and B'y represents a receive beam of the network device. In a subsequent process of communication with the terminal device, the network device uses the N BPLs for data transmission.

However, because of blocking or a severe environment in a communication process and a poor diffraction capability in a high frequency channel, a current serving beam is interfered with or blocked, and signal transmission is affected. Therefore, on the one hand, a corresponding mechanism needs to be introduced to detect and report beam quality; on the other hand, when a link fault occurs due to blocking or a severe environment, a corresponding mechanism needs to be introduced to quickly recover a communications link.

In the embodiments of the present invention, to detect a link fault, the network device may configure, for the terminal device, a reference signal resource set (for example, a beam failure detection RS resourceconfig, a beam failure detection RS, or failure detection resources) used for beam failure detection. The reference signal resource set may also be referred to as a link failure detection reference signal resource set. In addition, a reference signal used to detect a link failure may alternatively be implicitly indicated, and a reference signal associated with a transmission configuration indicator (TCI) indicating a PDCCH is used as the reference signal used to detect the link failure. The reference signal is a reference signal that satisfies a QCL relationship with a DMRS on the PDCCH and that is periodically sent. An RS in a beam failure detection RS set and the demodulation reference signal on the physical downlink control channel PDCCH satisfy the QCL relationship or use a same TCI state as the PDCCH. When channel quality information, for example, reference signal received power (RSRP), a channel quality indicator (CQI), a block error rate (BLER), a signal to interference plus noise ratio (SINR), and a signal-to-noise ratio (SNR) of some or all reference signals in the set is lower than a predetermined threshold, it may be determined that a communications link is faulty.

Being lower than the predetermined threshold may be being lower than the predetermined threshold for W consecutive times or being lower than the predetermined threshold for W times in a time period. Optionally, the predetermined threshold may be the same as a radio link failure out-of-synchronization (radio link failure OOS (out of sync)) threshold. The predetermined threshold may be referred to as a link failure detection threshold, or may be referred to as a link failure threshold. It should be understood that, any threshold used for link failure detection may be the predetermined threshold, and a name of the predetermined threshold is not limited in the present invention. Herein, a beam failure detection RS is used by the terminal to detect channel quality of a transmit beam of the network device, and the transmit beam is a beam used when the network device communicates with the terminal.

The TCI is used to indicate QCL information of a signal or a channel. The channel may be a PDCCH/CORESET or a PDSCH. The signal may be a CSI-RS, a DMRS, a TRS, sounding reference information (SRS), or the like. TCI information indicates that a reference signal included in a TCI and the channel or the signal satisfy a QCL relationship, and is mainly used to indicate that during reception of the signal or the channel, information such as a spatial characteristic parameter of the signal or the channel is the same as, similar to, or approximate to information such as a spatial characteristic parameter of the reference signal included in the TCI.

It should be understood that, "detection" in the embodiments of the present invention may be understood as "receiving", or may be understood as "decoding". It may be understood that detection does not mean successful reception or successful decoding.

In the embodiments of the present invention, for link fault recovery, the network device may further configure, for the terminal device, a reference signal resource set (a candidate beam RS list, a candidate beam RS identification resource, a beam failure candidate beam resource, a candidate beam identification RS, or a candidate beam list) used to recover a link between the terminal device and the network device. The reference signal resource set may also be referred to as a candidate reference signal resource set or a link failure recovery reference signal resource set. After the link is faulty, the terminal device needs to select, from the candidate reference signal resource set, a reference signal resource (including a new identified beam and/or a new beam) whose channel quality information (such as RSRP, RSRQ), a CQI, or a SINR) is higher than the predetermined threshold, to recover the communications link. It may also be understood that, the candidate beam identification RS is a reference signal set used by the terminal device to initiate link reconfiguration after the terminal device determines that the communications link fault occurs on the transmit beam of the network device. Then, the terminal device sends beam failure recovery request (BFRQ) information to the network device, where the BFRQ information is associated with the selected reference signal resource whose channel quality is higher than the predetermined threshold. The terminal device may notify the network device of the reference signal resource or the new identified beam in an explicit or implicit manner. The terminal device may further report, by using one or more pieces of beam failure recovery request information, at least one piece of content such as new beam information or identification information of a cell in which a link failure occurs. Alternatively, it may be understood that the BFRQ is used to indicate one or more of new beam information, identification information of a cell in which a link failure occurs, or a link failure event. The network device sends a beam failure recovery response (BFRR) to the terminal device, and the terminal device detects a control resource set (CORESET) and a search space set, and receives the BFRR. It should be understood that, optionally, the CORESET and/or the search space set are/is a dedicated CORESET and a dedicated search space set configured by the network device for the terminal device, and are/is used by the network device to send link failure response information on a downlink control resource after the terminal device sends a link failure request.

Optionally, the predetermined threshold may be configured by the network device, or may be a predefined threshold. For example, when the network device does not configure the threshold, a threshold used for mobility measurement is used by default. The predetermined threshold may be referred to as a link failure recovery threshold, or may be referred to as a link recovery threshold. It should be understood that, any threshold used for link failure recovery may be the predetermined threshold, and a name of the predetermined threshold is not limited in the present invention.

It should be understood that, during specific implementation, the two sets, namely, the beam failure detection reference signal resource set and the reference signal resource set used to recover the link between the terminal device and the network device may alternatively have other names. This is not specifically limited in the embodiments of this application.

In the embodiments of the present invention, a communication fault may also be referred to as a communication failure, a communications link failure, a communications link fault, a link fault, a link failure, a communication fault, a beam failure, a beam fault, or the like. In the embodiments of the present invention, these concepts have a same meaning. For example, the link fault may specifically mean that signal quality of a reference signal used for PDCCH beam failure detection is less than or equal to a preset threshold.

In the embodiments of the present invention, link fault recovery may also be referred to as recovery of communication between the network device and the terminal device, communication fault recovery, link failure recovery, link fault recovery, beam failure recovery, beam fault recovery, communications link failure recovery, communications link fault recovery, communication failure recovery, link reconfiguration, or the like.

In the embodiments of the present invention, the beam failure recovery request (BFRQ) information may also be referred to as communication failure recovery request information, communication fault recovery request information, link failure recovery request information, link fault recovery request information, beam fault recovery request information, communication beam failure recovery request information, communications link fault recovery request information, link reconfiguration request information, reconfiguration request information, or the like. Optionally, sending the beam failure recovery request (BFRQ) may specifically mean that a signal (information) is sent on a time-frequency resource used to carry the beam failure recovery request (BFRQ).

In the embodiments of the present invention, beam failure recovery response (BFRR) information may also be referred to as communication failure recovery response information, communication failure response information, beam failure response information, communications link fault recovery response information, communications link fault response information, communication beam failure recovery response information, communications link failure response information, beam fault recovery response information, beam fault response information, link reconfiguration response information, link fault recovery response information, link fault response information, link failure response information, communication fault recovery response information, communication fault response information, reconfiguration response information, or the like. It should be understood that, in the present invention, the beam failure recovery response information may be referred to as response information for short.

In the embodiments of the present invention, the beam failure recovery response (BFRR) information may specifically mean that downlink control information (DCI) whose cyclic redundancy check (CRC) is scrambled by using a cell radio network temporary identifier (C-RNTI) is received on a control resource set and/or a search space set used to send a beam failure recovery response (BFRR).

The beam failure recovery response (BFRR) information may alternatively be DCI scrambled by using other information (for example, DCI scrambled by using a BFR-RNTI).

The beam failure recovery response (BFRR) information may alternatively include data scheduled by using the DCI.

The beam failure recovery response (BFRR) information may alternatively be an ACK of the data scheduled by using the DCI.

The beam failure recovery response (BFRR) information may alternatively be one of the following information: DCI scrambled by using a cell radio network temporary identifier C-RNTI, DCI scrambled by using a modulation and coding scheme cell radio network temporary identifier (MCS-C-RNTI), downlink control information DCI in a dedicated search space, DCI scrambled by using a dedicated radio network temporary identifier RNTI, DCI scrambled by using a random access radio network temporary identifier (RA-RNTI), DCI including a preset state value, DCI including transmission configuration indicator TCI information, quasi-colocation QCL indication information of a cell in which a link failure occurs, or DCI in a preset format, where the DCI in the preset format indicates newly transmitted data. This is not limited in the embodiments of the present invention.

It should be understood that, in the embodiments of the present invention, the link failure, the link failure recovery, the beam failure recovery request information, and the beam failure recovery response information may alternatively have other names. This is not specifically limited in the present invention.

It should be understood that, in the present invention, the link recovery failure may be understood as that the terminal device no longer sends beam failure recovery request information, or may be understood as stopping timing of a link failure recovery clock, or may be understood as stopping counting of a link failure recovery counter, or the like, or may be understood as that a quantity of times that the terminal device sends beam failure recovery request information reaches a specific threshold.

It should be understood that, in the embodiments of this application, the link failure indication information may be used to indicate whether there is a cell in which a link failure occurs. The identification information of the cell in which the link failure occurs is used to indicate an identifier of the cell in which the link failure occurs, and the identification information of the cell in which the link failure occurs may be an index of the cell in which the link failure occurs, or indication information indicating, by using a bitmap, the identifier of the cell in which the link failure occurs. The reference signal information for link recovery is used to indicate an index of a reference signal resource for recovering the cell in which the link failure occurs or information indicating that no reference signal for recovering the cell in which the link failure occurs is identified. The reference signal information for link recovery may include a resource index of a reference signal used to recover the cell in which the link failure occurs and/or channel quality of the reference signal, or the reference signal information for link recovery may be state information indicating that no reference signal for recovering the cell in which the link failure occurs is identified (for example, the terminal device identifies, from the candidate reference signal resource set, no reference signal that is greater than the link failure recovery threshold).

To meet a service requirement corresponding to each service, each deployment scenario, each spectrum, or the like in 5G NR, a requirement for reporting uplink control information (UCI) is further proposed in 5G NR. Currently, types of uplink control information in 5G NR standards include channel state information (CSI), a hybrid automatic repeat request (HARQ), a scheduling request (SR), and the like.

The terminal device may measure channel quality of a channel state information reference signal (CSI-RS) to obtain channel state information (CSI). The CSI may include at least one of a CSI-RS resource identifier (CRI), a rank indicator (RI), an SSB-index, a precoding matrix indicator (PMI), a channel quality indicator (CQI), reference signal received power (RSRP), or the like. After obtaining the CSI, the terminal device sends the CSI to the network device based on a reporting occasion of the CSI by using a physical uplink control channel (PUCCH) or a physical uplink shared channel (PUSCH).

In addition, the terminal device may further introduce reporting of a signal to interference plus noise ratio (SINR) into a beam management (BM) process. The SINR can objectively reflect network signal purity and link quality of a current channel, and is an important indicator for measuring a performance parameter of the terminal device. The SINR may also be referred to as a layer 1-SINR (L1-SINR).

It should be noted that although the foregoing descriptions are mainly provided from a perspective of a high frequency band, this does not mean that the embodiments of the present invention are limited thereto. In the embodiments of the present invention, the BFRQ, the BFRR, the L1-SINR, and the like may be applied to a high frequency (for example, frequency range 2, FR2) scenario, or may be applied to a low frequency (for example, frequency range 1, FR1) scenario, for example, a frequency band below 6 GHz.

It can be learned from the foregoing descriptions that all pieces of UCI information such as the BFRQ, the L1-SINR, the HARQ, the SR, and the CSI have respective reporting rules and reporting occasions. Therefore, when the BFRQ and/or the L1-SINR are/is reported, a part or all of the UCI information such as the HARQ (where the HARQ is also sometimes referred to as a HARQ-ACK), the SR, and the CSI also needs to be reported. In this case, a reporting conflict (or referred to as a collision) between the BFRQ and/or the L1-SINR and other UCI may be caused. The embodiments of the present invention may be used to resolve the foregoing conflict problem.

For ease of understanding of the solutions, a reporting conflict in the embodiments of the present invention is first explained.

In the embodiments of the present invention, a reporting conflict (or a collision) between at least two pieces of information means that when the terminal device reports the at least two pieces of information to the network device, if at least two resources for carrying the at least two pieces of information overlap in at least one time unit and are on one carrier, it is considered that there is a reporting conflict (or a collision) between the at least two pieces of information. It should be understood that, each of the at least two pieces of information corresponds to one resource. The carrier may be a single carrier above, or may be a same component carrier in a CA or DC scenario, or may be a same bandwidth part (BWP).

In an embodiment, if time domain resources preconfigured to carry the at least two pieces of information overlap in at least one time unit and are sent on a same carrier, it may be referred to as that there is a reporting conflict between the at least two pieces of information. Each of the at least two pieces of information is preconfigured to be carried on one resource (for example, a resource occupied by a physical channel), and different information may be carried on different resources.

In another embodiment, if resources preconfigured to carry the at least two pieces of information overlap in at least one time unit, it may be referred to as that there is a reporting conflict between the at least two pieces of information. Each of the at least two pieces of information is preconfigured to be carried on one resource (for example, a resource occupied by a physical channel), and different information may be carried on different resources.

The time unit may be one or more radio frames, one or more subframes, one or more slots, one or more mini-slots, or one or more symbols such as an orthogonal frequency division multiplexing (OFDM) symbol defined in an LTE or 5G NR system. Alternatively, the time unit may be a time window including a plurality of frames or subframes, for example, a system information (SI) window.

It may be understood that the reporting conflict (or the collision) between the at least two pieces of information may be understood as that time-frequency resources of physical channels for carrying the at least two pieces of information overlap.

For example, in a possible implementation, when the terminal device needs to report the at least two pieces of information to the network device, if resources configured to carry the at least two pieces of information overlap in at least one OFDM symbol, it is considered that there is a reporting conflict (or a collision) between the at least two pieces of information.

For example, in another possible implementation, if the terminal device needs to report the at least two pieces of information to the network device, if time domain resources occupied by physical channels that separately carry the at least two pieces of information overlap in a slot and the physical channels are transmitted on one carrier, it is considered that there is a reporting conflict (or collision) between the at least two pieces of information.

The network device may configure one or more downlink/uplink bandwidth parts (BWPs) for the terminal device. The BWP may include consecutive physical resource blocks (PRBs) in frequency domain. One PRB may include, for example, 12 consecutive subcarriers in frequency domain. The BWP is a subset of a bandwidth of the terminal device. A minimum granularity of the BWP in frequency domain is one PRB. The network device may configure one or more BWPs for the terminal device, and the plurality of BWPs may overlap in frequency domain.

In a single-carrier scenario, one terminal device may have one active BWP at a same moment, and on the active BWP, the terminal device may receive data/control information/reference signals or send data/control information/reference signals.

In a case in which the embodiments of the present invention are applicable to a BWP scenario, a specific BWP may alternatively be a bandwidth set on a specific frequency, or a set including a plurality of RBs.

In a downlink, one or more carrier BWPs may be configured for the terminal device. Specifically, the terminal device may receive a PDSCH or a PDCCH in a frequency band in these BWPs.

In an uplink, one or more carrier BWPs may be configured for the terminal device. Specifically, the terminal device may send a PUSCH or a PUCCH in a frequency band in these BWPs.

Lengths of resources occupied by UCI information such as a BFRQ, an L1-SINR, a HARQ, an SR, and CSI in time domain may be the same or different. For example, different subcarrier spacings cause different symbol lengths. A high/low frequency subcarrier spacing may be 15 kHz to 120 kHz. The high frequency subcarrier spacing may be relatively large, and may be generally 120 kHz or 240 kHz, and the low frequency subcarrier spacing is relatively small, and generally has several configurations of 15 kHz, 30 kHz, and 60 kHz. For another example, quantities of symbols occupied by the resources may be different. Therefore, resources occupied by at least two of the UCI information such as the BFRQ, the L1-SINR, the HARQ, the SR, and the CSI may partially overlap or may completely overlap in at least one time unit.

Figures 1, 4:
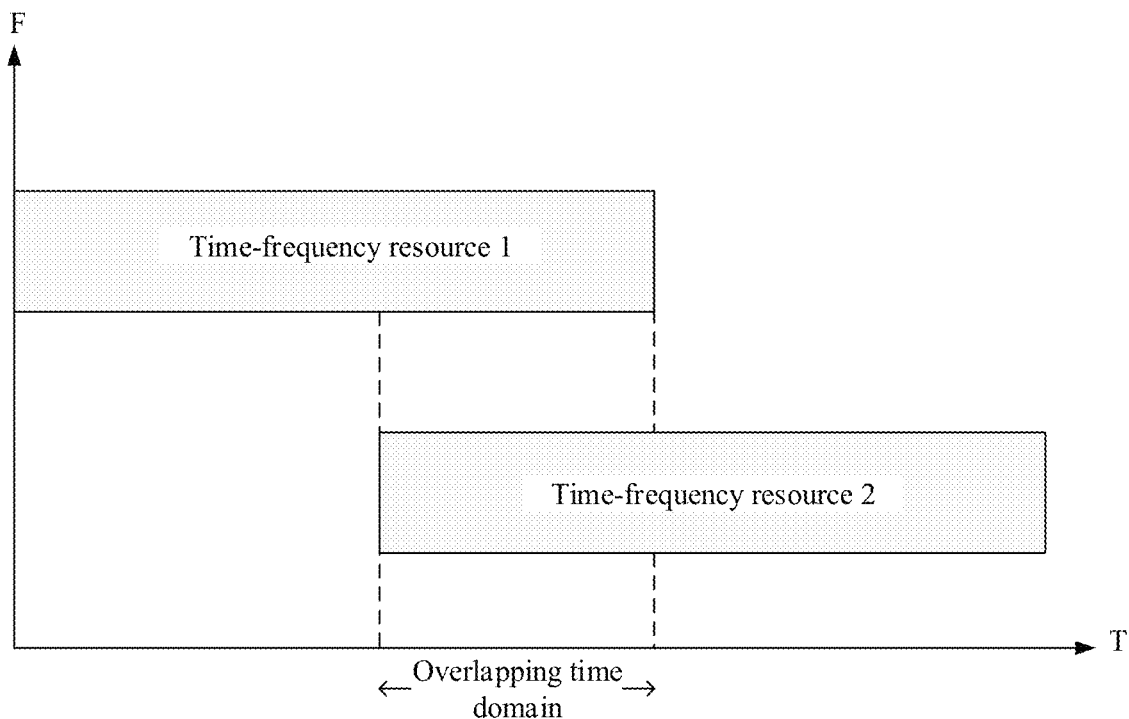
Figures 2, 4:
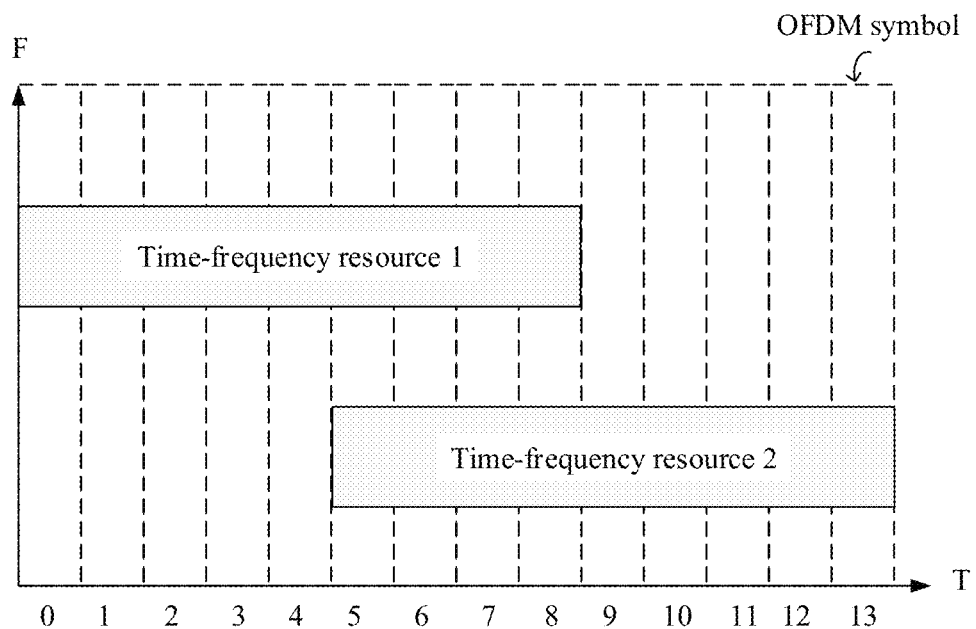

For example, FIG. 4-1 is a schematic diagram of a scenario in which there is a reporting conflict between at least two pieces of information according to an embodiment of the present invention. The at least two pieces of information include a BFRQ or an L1-SINR, and at least one other piece of information. For example, the BFRQ or the L1-SINR may be configured to be carried on a time-frequency resource 1, and the at least one piece of information is configured to be carried on a time-frequency resource 2. It can be learned from the figure that the time-frequency resource 1 and the time-frequency resource 2 partially overlap in time domain. A position at which the two resources overlap in time domain may be referred to as an overlapping time domain. The overlapping time domain includes at least one time unit, that is, there is a reporting conflict between the BFRQ or the L1-SINR and the at least one piece of information.

For example, the time unit is an OFDM symbol. In a high/low frequency scenario, one subframe may be 1 ms, and one slot may include 14 OFDM symbols. In the low frequency scenario, in the case of 15 kHz, one subframe may include one slot. In the high frequency scenario, in the case of 120 kHz, one subframe may include eight slots. In addition, for a mini-slot, one mini-slot may include seven OFDM symbols or another quantity of OFDM symbols.

Further, using a scenario in which a slot includes 14 OFDM symbols, FIG. 4-2 is a schematic diagram of another scenario in which there is a reporting conflict between at least two pieces of information according to an embodiment of the present invention. The at least two pieces of information include a BFRQ or an L1-SINR, and at least one other piece of information. For example, the BFRQ or the L1-SINR is configured to be carried on a time-frequency resource 1, and the at least one piece of information is configured to be carried on a time-frequency resource 2.

Both the time-frequency resource 1 and the time-frequency resource 2 may be, for example, PUCCH resources. For example, the time-frequency resource 1 occupies symbols 0 to 8 in the slot, and the time-frequency resource 2 occupies symbols 5 to 13 in the slot. It may be understood that the time-frequency resource 1 and the time-frequency resource 2 partially overlap in time domain, and the overlapping time domain includes four OFDM symbols (that is, the symbols 5 to 8).

It should be noted that the embodiments in FIG. 4-1 and FIG. 4-2 are merely used to explain but are not intended to limit the present invention. For example, in another embodiment, quantities of symbols occupied by the time-frequency resource 1 and the time-frequency resource 2 may be other values; in another embodiment, time domain lengths of the time-frequency resource 1 and the time-frequency resource 2 may be different; in another embodiment, the time-frequency resource 1 and the time-frequency resource 2 may completely overlap in time domain.

The following describes a specific implementation solution for resolving a problem of a reporting conflict in the embodiments of the present invention.

In a first implementation solution, when there is a reporting conflict between a BFRQ and at least one piece of information, the terminal device determines a priority of each piece of information based on a priority rule, and determines reporting content based on the priority of each piece of information. The at least one piece of information includes first information, the first information includes at least one of an L1-SINR, CSI, a HARQ, an SR, or the like, and the CSI includes at least one of a CRI, an SSB-index, an RI, a PMI, a CQI, or RSRP. The reporting content may include one item with a highest priority in the at least two pieces of information; in this case, other information may not be reported.

Similarly, alternatively, when there is a reporting conflict between an L1-SINR and at least one piece of information, the terminal device determines a priority of each piece of information based on a priority rule, and determines reporting content based on the priority of each piece of information. The at least one piece of information includes first information, the first information includes at least one of CSI, a HARQ, an SR, a BFRQ, or the like, and the CSI includes at least one of a CRI, an SSB-index, an RI, a PMI, a CQI, or RSRP. The reporting content may include one item with a highest priority in the at least two pieces of information; in this case, other information may not be reported.

The priority rule described in the embodiments of the present invention indicates a rule/algorithm/method used to determine a priority of specific information, and/or a rule/algorithm/method/standard used to compare priorities of different information when there is a reporting conflict.

Figure 5:
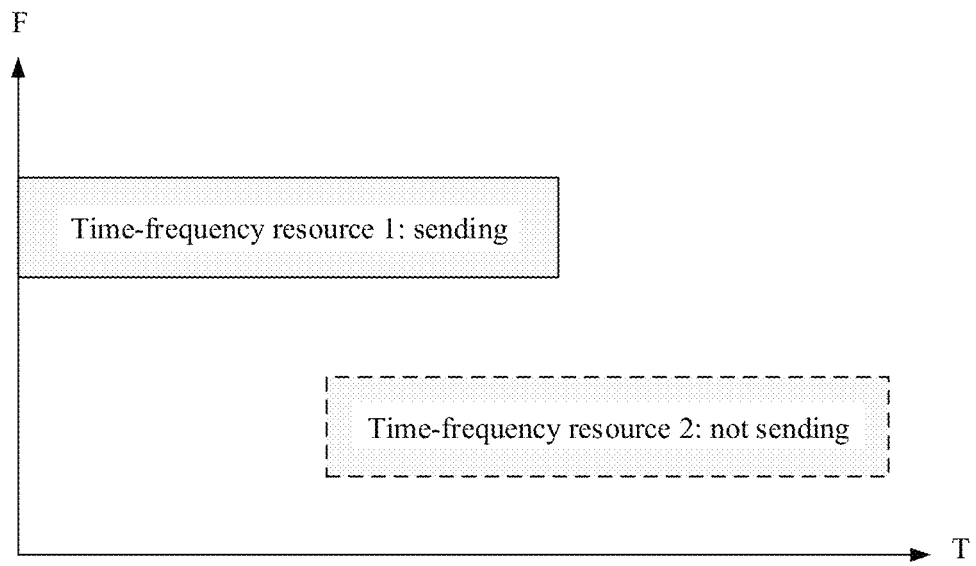
FIG. 5 is a schematic diagram of a scenario of a solution for reporting conflict resolution according to an embodiment of the present invention.

For example, FIG. 5 is a schematic diagram of a scenario of a solution for reporting conflict resolution according to an embodiment of the present invention. In this scenario, the BFRQ or the L1-SINR is configured to be carried on a time-frequency resource 1, other information is configured to be carried on a time-frequency resource 2, and the time-frequency resource 1 collides with the time-frequency resource 2. When determining, based on the priority rule, that the BFRQ or the L1-SINR has a highest priority in the colliding information, the terminal device reports the BFRQ or the L1-SINR to the network device on the time-frequency resource 1, but does not perform reporting on the time-frequency resource 2, for example, may further discard the other information, or delay an attempt to report the information in a next reporting periodicity of the other information (assuming that the information is periodically reported).

It should be understood that, in another scenario, if determining, based on the priority rule, that the information configured to be carried on the time-frequency resource 2 has a highest priority, the terminal device may report the information to the network device on the time-frequency resource 2, and does not perform reporting on the time-frequency resource 1 (which, for example, carries the L1-SINR).

Optionally, the foregoing priority rule may also be understood as a priority rule of the time-frequency resource 1 and the time-frequency resource 2.

Because information with a higher priority is usually more important information, information that needs to be reported more urgently, or information that has greater impact on the communications system, according to the first implementation solution, it helps ensure that the important, urgent, and consequence-prone information is reported preferentially, thereby ensuring normal running of a service corresponding to the information, avoiding impact caused by the reporting conflict, ensuring stability of the communications system, and saving communication resources.

It should be noted that "reporting" in this specification may be understood as a meaning of "sending", and "not reporting" may be understood as a meaning of "not sending". Generally, the BFRQ may have a positive state (or referred to as a positive state) or a negative state (or referred to as a negative state). When the BFRQ is in the positive state, it indicates that a link fault occurs in at least one cell. When the BFRQ is in the negative state, it indicates that no link fault occurs in any cell.

In a second implementation solution, when there is a reporting conflict between a BFRQ and at least one piece of information, the terminal device multiplexes the BFRQ and the at least one piece of information on a first time-frequency resource based on a multiplexing rule. The multiplexing in the embodiments of the present invention may be time division multiplexing, frequency division multiplexing, or another type of multiplexing manner. Then the terminal device reports the BFRQ and the at least one piece of information to the network device on the first time-frequency resource. The at least one piece of information includes first information, the first information includes at least one of an L1-SINR, CSI, a HARQ, an SR, or the like, and the CSI includes at least one of a CRI, an SSB-index, an RI, a PMI, a CQI, or RSRP.

The first time-frequency resource may be a time-frequency resource configured for the BFRQ, or may be a time-frequency resource configured for any one of the at least one piece of information, or may be a time-frequency resource of a third party (that is, a time-frequency resource not configured for the BFRQ/at least one piece of information).

Similarly, optionally, when there is a reporting conflict between an L1-SINR and at least one piece of information, the terminal device multiplexes the L1-SINR and the at least one piece of information on a first time-frequency resource based on a multiplexing rule. The multiplexing may be time division multiplexing, frequency division multiplexing, or another type of multiplexing manner. Then the terminal device reports the L1-SINR and the at least one piece of information to the network device on the first time-frequency resource. The at least one piece of information includes first information, the first information includes at least one of CSI, a HARQ, an SR, a BFRQ, or the like, and the CSI includes at least one of a CRI, an SSB-index, an RI, a PMI, a CQI, or RSRP.

The first time-frequency resource may be a time-frequency resource configured for the L1-SINR, or may be a time-frequency resource configured for any one of the at least one piece of information, or may be a time-frequency resource of a third party (that is, a time-frequency resource not configured for the L1-SINR/at least one piece of information).

The multiplexing rule described in this specification indicates a rule/algorithm/method/standard used to multiplex some specific information/time-frequency resources when there is a reporting conflict.

Figure 6:
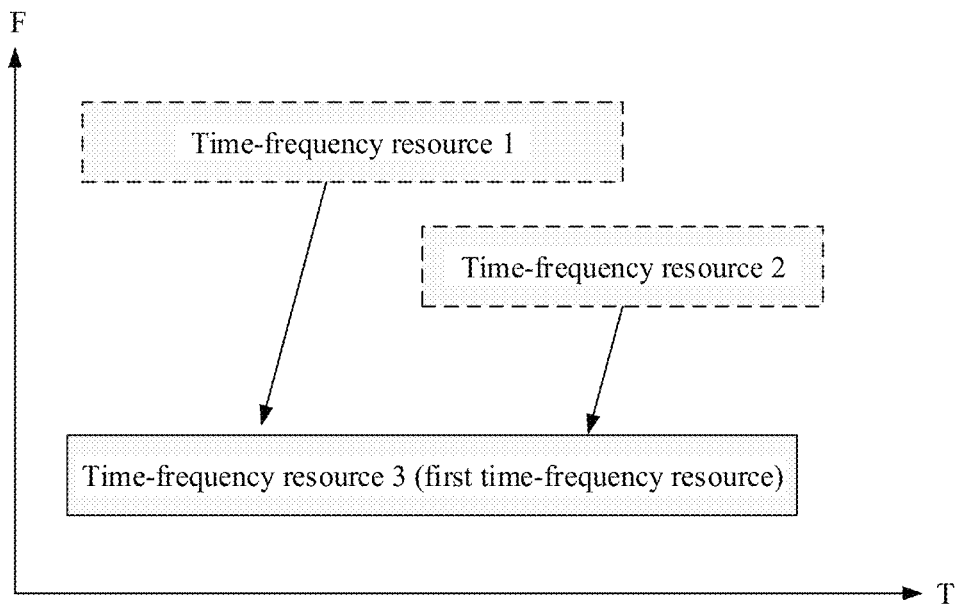
FIG. 6 is a schematic diagram of a scenario of another solution for reporting conflict resolution according to an embodiment of the present invention.

For example, FIG. 6 is a schematic diagram of a scenario of another solution for reporting conflict resolution according to an embodiment of the present invention. In this scenario, the BFRQ or the L1-SINR is configured to be carried on a time-frequency resource 1, the at least one piece of information is configured to be carried on a time-frequency resource 2, and the time-frequency resource 1 collides with the time-frequency resource 2. In this case, the BFRQ or the L1-SINR may be multiplexed with the at least one piece of information. The multiplexing rule shown in FIG. 6 is: separately mapping the BFRQ or the L1-SINR and the at least one piece of information to a time-frequency resource 3 (that is, the time-frequency resource 3 herein is a first time-frequency resource), so that the BFRQ or the L1-SINR is multiplexed with the at least one piece of information. The terminal device reports the BFRQ or the L1-SINR and the at least one piece of information to the network device on the time-frequency resource 3. It may be understood that reporting does not need to be performed on the time-frequency resource 1 and the time-frequency resource 2.

Figure 7:
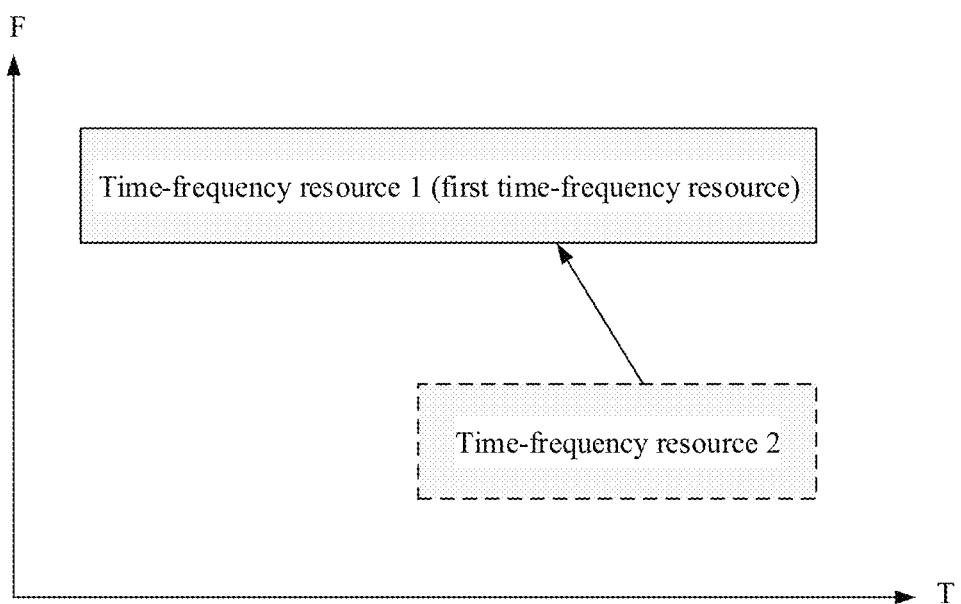
FIG. 7 is a schematic diagram of a scenario of another solution for reporting conflict resolution according to an embodiment of the present invention.

For another example, FIG. 7 is a schematic diagram of a scenario of another solution for reporting conflict resolution according to an embodiment of the present invention. In this scenario, the BFRQ or the L1-SINR is configured to be carried on a time-frequency resource 1, the at least one piece of information is configured to be carried on a time-frequency resource 2, and the time-frequency resource 1 collides with the time-frequency resource 2. In this case, the BFRQ or the L1-SINR may be multiplexed with the at least one piece of information. The multiplexing rule shown in FIG. 7 is: mapping the at least one piece of information to the time-frequency resource 1 (that is, the time-frequency resource 1 herein is a first time-frequency resource), so that the BFRQ or the L1-SINR is multiplexed with the at least one piece of information. The terminal device reports the BFRQ or the L1-SINR and the at least one piece of information to the network device on the time-frequency resource 1. It may be understood that reporting does not need to be performed on the time-frequency resource 2.

According to the second implementation solution, various pieces of information are reported on the first time-frequency resource by using the multiplexing rule, so that not only a problem of a reporting conflict can be overcome, but also successful reporting of each piece of information and normal running of various reporting services can be ensured, thereby minimizing impact on the communications system.

In a third implementation solution, when there is a reporting conflict between a BFRQ and at least two pieces of information, the terminal device determines reporting content based on both a priority rule and a multiplexing rule. Specifically, the terminal device may determine a priority of the BFRQ and a priority of each of the at least two pieces of information based on the priority rule; select at least two items with highest priorities from at least three items including the BFRQ and the at least two pieces of information; and multiplex the at least two items with the highest priorities on a first time-frequency resource based on the multiplexing rule, where time division multiplexing, frequency division multiplexing, or another type of multiplexing manner may be used. Then the terminal device reports the at least two items with the highest priorities to the network device on the first time-frequency resource.

The at least two pieces of information include first information, the first information includes at least one of an L1-SINR, CSI, a HARQ, an SR, or the like, and the CSI includes at least one of a CRI, an SSB-index, an RI, a PMI, a CQI, or RSRP.

The first time-frequency resource may be a time-frequency resource configured for the BFRQ, or may be a time-frequency resource configured for any one of the at least two pieces of information, or may be a time-frequency resource of a third party (that is, a time-frequency resource not configured for the BFRQ/at least two pieces of information).

Similarly, optionally, when there is a reporting conflict between an L1-SINR and at least two pieces of information, the terminal device determines reporting content based on both a priority rule and a multiplexing rule. Specifically, the terminal device may determine a priority of the L1-SINR and a priority of each of the at least two pieces of information based on the priority rule; select at least two items with highest priorities from at least three items including the L1-SINR and the at least two pieces of information; and multiplex the at least two items with the highest priorities on a first time-frequency resource based on the multiplexing rule, where time division multiplexing, frequency division multiplexing, or another type of multiplexing manner may be used. Then the terminal device reports the at least two items with the highest priorities to the network device on the first time-frequency resource.

The at least two pieces of information include first information, the first information includes at least one of a BFRQ, CSI, a HARQ, an SR, or the like, and the CSI includes at least one of a CRI, an SSB-index, an RI, a PMI, a CQI, or RSRP.

The first time-frequency resource may be a time-frequency resource configured for the L1-SINR, or may be a time-frequency resource configured for any one of the at least two pieces of information, or may be a time-frequency resource of a third party (that is, a time-frequency resource not configured for the L1-SINR/at least two pieces of information).

Figure 8:
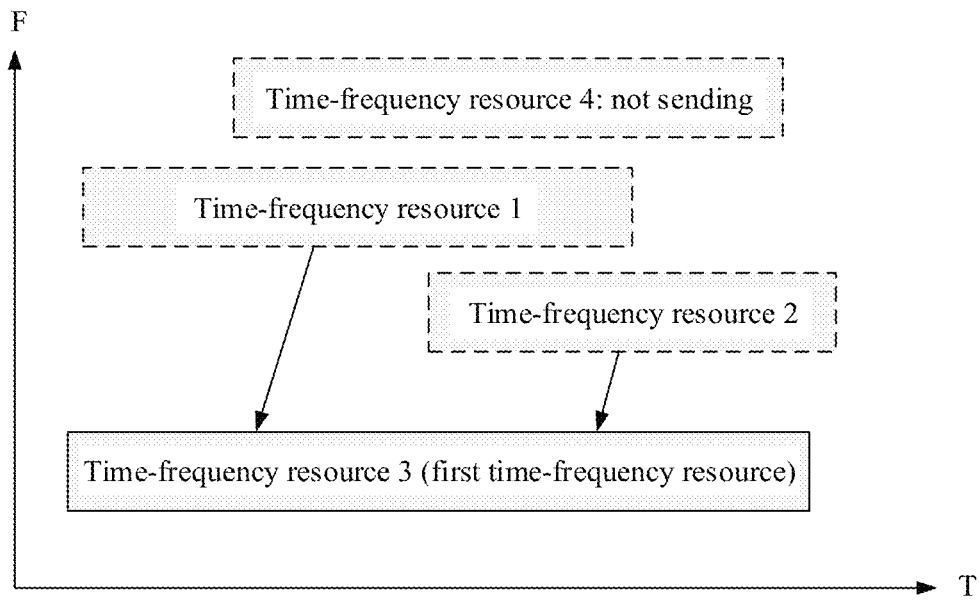
FIG. 8 is a schematic diagram of a scenario of another solution for reporting conflict resolution according to an embodiment of the present invention.

For example, FIG. 8 is a schematic diagram of a scenario of another solution for reporting conflict resolution according to an embodiment of the present invention. In this scenario, the BFRQ or the L1-SINR is configured to be carried on a time-frequency resource 1, the at least two pieces of information include the first information and fourth information, and the fourth information is information different from the first information. The first information is configured to be carried on a time-frequency resource 2, the fourth information is configured to be carried on a time-frequency resource 4, and the time-frequency resource 1, the time-frequency resource 2, and the time-frequency resource 4 collide. In this case, when the BFRQ or the L1-SINR and the first information are determined based on the priority rule, and are two items with highest priorities in the colliding information, the two items may be further multiplexed based on the multiplexing rule. The multiplexing rule shown in FIG. 8 is: separately mapping the BFRQ or the L1-SINR and the first information to a time-frequency resource 3 (that is, the time-frequency resource 3 herein is the first time-frequency resource), so that the BFRQ or the L1-SINR is multiplexed with the first information. The terminal device reports the BFRQ or the L1-SINR and the first information to the network device on the time-frequency resource 3. It may be understood that reporting does not need to be performed on the time-frequency resource 1, the time-frequency resource 2, and the time-frequency resource 4.

Figure 9:
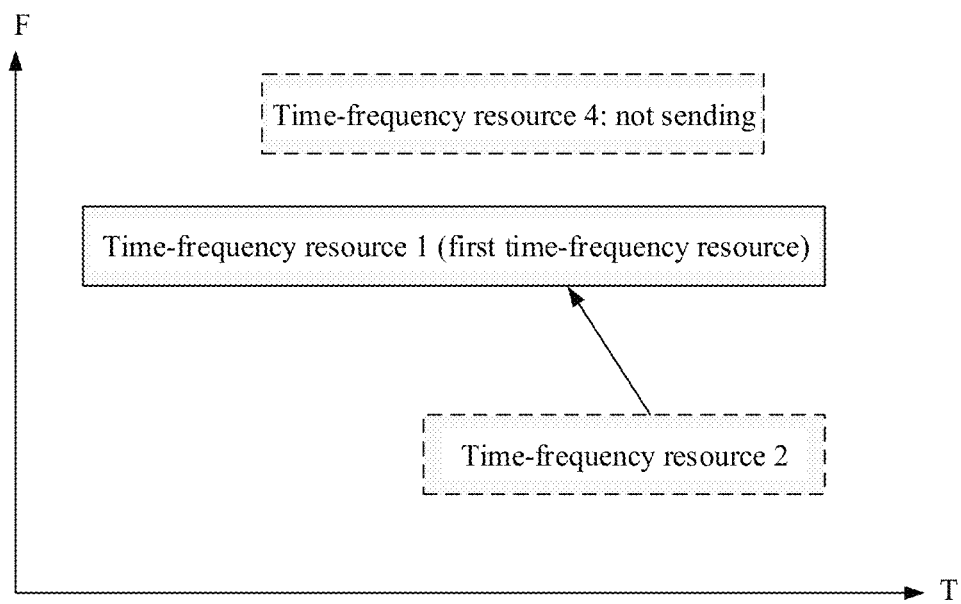
FIG. 9 is a schematic diagram of a scenario of another solution for reporting conflict resolution according to an embodiment of the present invention.

For another example, FIG. 9 is a schematic diagram of a scenario of another solution for reporting conflict resolution according to an embodiment of the present invention. In this scenario, the BFRQ or the L1-SINR is configured to be carried on a time-frequency resource 1, the at least two pieces of information include the first information and fourth information, and the fourth information is information different from the first information. The first information is configured to be carried on a time-frequency resource 2, the fourth information is configured to be carried on a time-frequency resource 4, and the time-frequency resource 1, the time-frequency resource 2, and the time-frequency resource 4 collide. In this case, when the BFRQ or the L1-SINR and the first information are determined based on the priority rule, and are two items with highest priorities in the colliding information, the two items may be further multiplexed based on the multiplexing rule. The multiplexing rule shown in FIG. 9 is: mapping the first information to the time-frequency resource 1 (that is, the time-frequency resource 1 herein is the first time-frequency resource), so that the BFRQ or the L1-SINR is multiplexed with the first information. The terminal device reports the BFRQ or the L1-SINR and the first information to the network device on the time-frequency resource 1. It may be understood that reporting does not need to be performed on the time-frequency resource 2 and the time-frequency resource 4.

It should be understood that, in another scenario of the foregoing embodiment in FIG. 8 or FIG. 9, there may be another case in which the at least two items with the highest priorities are determined based on the priority rule. For example, the at least two items with the highest priorities include the BFRQ or the L1-SINR and the fourth information; or the at least two items with the highest priorities include the first information and the fourth information. In this case, the terminal device further multiplexes and reports the at least two items.

According to the third implementation solution, it helps transmit as much information as possible on the first time-frequency resource, and preferentially transmit high-priority information. According to this solution, it helps overcome a problem of a reporting conflict, and further, important, urgent, and consequence-prone information can be transmitted while correct transmission is ensured, thereby improving stability of the communications system and saving some communication resources.

In a fourth implementation solution, when there is a reporting conflict between a BFRQ and at least two pieces of information in a same slot, the terminal device determines reporting content based on both a priority rule and a multiplexing rule, which specifically includes: The terminal device determines a priority of the BFRQ and a priority of each of the at least two pieces of information based on the priority rule; selects a maximum of two items with higher priorities from at least three items including the BFRQ and the at least two pieces of information; and separately includes the maximum of two items with the higher priorities on a maximum of two PUCCH resources based on the multiplexing rule, where at least one of the maximum of two PUCCH resources is in a PUCCH format 2, and the maximum of two PUCCH resources are time division multiplexed in the same slot; and then the terminal device separately reports the maximum of two items with the higher priorities to the network device on the maximum of two PUCCH resources.

The at least two pieces of information include first information, the first information includes at least one of an L1-SINR, CSI, a HARQ, an SR, or the like, and the CSI includes at least one of a CRI, an SSB-index, an RI, a PMI, a CQI, or RSRP.

Similarly, optionally, when there is a reporting conflict between an L1-SINR and at least two pieces of information, the terminal device determines a priority of the L1-SINR and a priority of each of the at least two pieces of information based on the priority rule; selects a maximum of two items with higher priorities from at least three items including the L1-SINR and the at least two pieces of information; and separately includes the maximum of two items with the higher priorities on a maximum of two PUCCH resources based on the multiplexing rule, where at least one of the maximum of two PUCCH resources is in a PUCCH format 2, and the maximum of two PUCCH resources are time division multiplexed in a same slot; and then the terminal device separately reports the maximum of two items with the higher priorities to the network device on the maximum of two PUCCH resources.

The at least two pieces of information include first information, the first information includes at least one of a BFRQ, CSI, a HARQ, an SR, or the like, and the CSI includes at least one of a CRI, an SSB-index, an RI, a PMI, a CQI, or RSRP.

Figure 10:
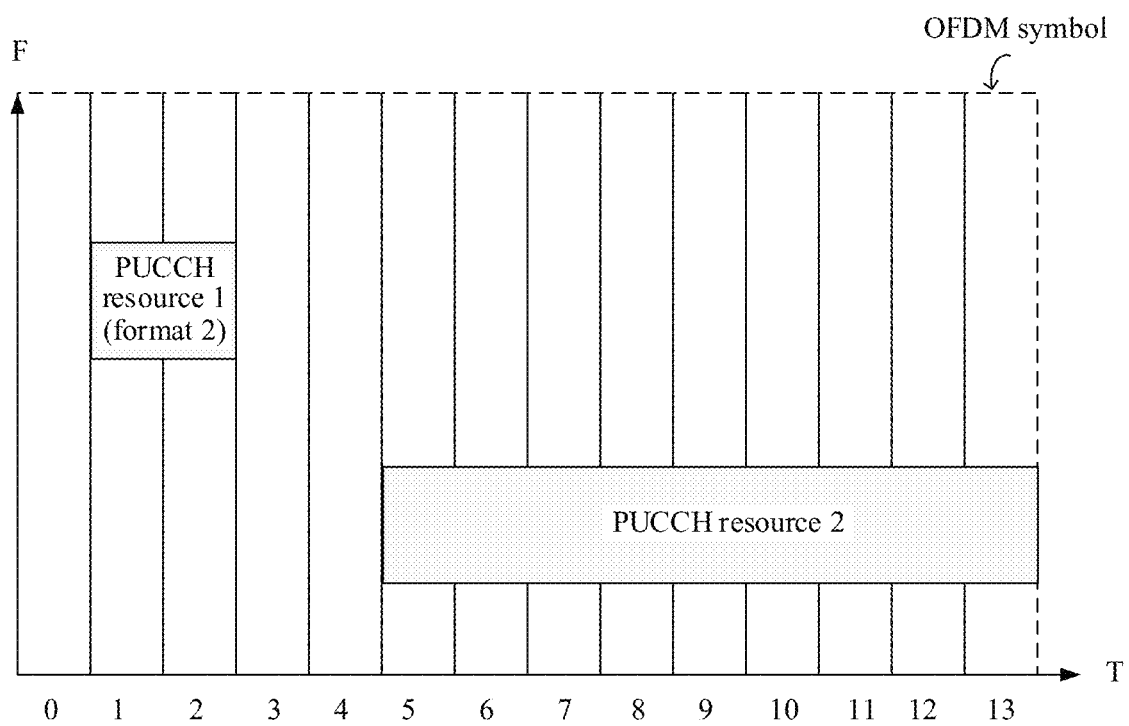
FIG. 10 is a schematic diagram of a scenario of another solution for reporting conflict resolution according to an embodiment of the present invention.

For example, FIG. 10 is a schematic diagram of a scenario of another solution for reporting conflict resolution according to an embodiment of the present invention. In this scenario, there is a reporting conflict between the BFRQ or the L1-SINR and the at least two pieces of information, and the at least two pieces of information include, for example, the first information and fourth information. The terminal device selects a maximum of two items with higher priorities based on the priority rule, and at least one of PUCCH resources on which the maximum of two items with the higher priorities are reported is in the PUCCH format 2. The maximum of two items are separately carried on a PUCCH resource 1 and a PUCCH resource 2, and a format of the PUCCH resource 1 is the PUCCH format 2. For example, when the maximum of two items include the BFRQ or the L1-SINR and the first information, the BFRQ or the L1-SINR is carried on the PUCCH resource 1, and the first information is carried on the PUCCH resource 2, or the BFRQ or the L1-SINR is carried on the PUCCH resource 2, and the first information is carried on the PUCCH resource 1. Certainly, there may be another case for the maximum of two items, for example, the maximum of two items include the BFRQ or the L1-SINR and the fourth information, or include the first information and the fourth information. This is not limited herein.

In addition, it should be noted that, FIG. 10 is merely used to explain but is not intended to limit the solution in the present invention. Symbols occupied by the PUCCH resource 1 are not limited to symbols 1 and 2 in FIG. 10, the PUCCH resource 1 may occupy other symbols, and a quantity of occupied symbols may be another quantity. Symbols occupied by the PUCCH resource 2 are not limited to symbols 5 to 13 in FIG. 10, the PUCCH resource 2 may occupy other symbols, and a quantity of occupied symbols may be another quantity.

The PUCCH resource 2 may be specifically in any one of a PUCCH format 0, a PUCCH format 1, the PUCCH format 2, a PUCCH format 3, or a PUCCH format 4. This is not limited herein.

Time domain duration of each of the PUCCH format 0 and the PUCCH format 2 supports one or two OFDM symbols, and the PUCCH format 0 and the PUCCH format 2 may be referred to as short PUCCHs. Time domain duration of each of the PUCCH format 1, the PUCCH format 3, and the PUCCH format 4 can support four to 14 OFDM symbols, and the PUCCH format 1, the PUCCH format 3, and the PUCCH format 4 may also be referred to as long PUCCHs. The PUCCH format 0 may carry 1-bit or 2-bit UCI information. The PUCCH format 1 may carry 1-bit or 2-bit UCI information. The PUCCH format 2 may carry UCI information of more than 2 bits. The PUCCH format 3 and the PUCCH format 4 may carry UCI information of more than 2 bits.

According to the fourth implementation solution, it helps preferentially transmit more high-priority information in a time division multiplexing manner on different PUCCH resources. According to this solution, it helps overcome a problem of a reporting conflict, and further, important, urgent, and consequence-prone information can be transmitted while correct transmission is ensured, thereby improving stability of the communications system and saving some communication resources.

In a fifth implementation solution, when there is a reporting conflict between a BFRQ and at least one piece of information in a same slot, and the BFRQ and the at least one piece of information are applicable to both a priority rule and a multiplexing rule, reporting content may be determined by preferentially using the multiplexing rule. In other words, if existing resources are sufficient, the terminal device may multiplex the BFRQ and the at least one piece of information on a first time-frequency resource based on the multiplexing rule, and send the BFRQ and the at least one piece of information on the first time-frequency resource. The first time-frequency resource may be a time-frequency resource configured for the BFRQ, or may be a time-frequency resource configured for any one of the at least one piece of information, or may be a time-frequency resource of a third party (that is, a time-frequency resource not configured for the BFRQ/at least one piece of information). For specific content of the multiplexing solution, refer to related descriptions in the foregoing second implementation solution. Details are not described herein again.

In addition, when multiplexing and normal reporting of the BFRQ and the at least one piece of information cannot be successfully implemented based on the multiplexing rule, for example, when the first time-frequency resource used to carry the information is insufficient, or when the BFRQ and the at least one piece of information are abnormally multiplexed, the priority rule may be further used to determine the reporting content, thereby ensuring normal running of a reporting service (important information) with a higher priority.

According to the fifth implementation solution, the multiplexing rule is preferentially used in the priority rule and the multiplexing rule, to transmit as much information as possible while overcoming a reporting conflict and ensuring successful transmission, thereby improving transmission efficiency, and ensuring normal running of various reporting services. In addition, when the multiplexing rule cannot be executed normally, the priority rule is further used to ensure normal reporting of high-priority information, thereby improving stability of the communications system.

Based on the implementation solutions described above, the following describes the technical solutions in the embodiments of the present invention by using specific examples.

Specifically, there are the following possible implementations for beam failure recovery request (BFRQ) information:

In an implementation of reporting the BFRQ information in one step, after the terminal device detects a link fault, the terminal device needs to send the BFRQ information to the network device. For example, the terminal device may send the BFRQ information in a primary cell (PCell). A resource for carrying the BFRQ information may be a PUCCH resource. The BFRQ information may include one or more of link failure indication information, identification information of a cell in which a link failure occurs, and reference signal information (a new beam) for link recovery. In a specific embodiment, the BFRQ information may include the identification information of the cell in which the link failure occurs, and/or the reference signal information (the new beam) for link recovery. Optionally, when the BFRQ information is used to indicate a link failure event (that is, the BFRQ information includes the link failure indication information), a format of the PUCCH resource for carrying the BFRQ information may be a PUCCH format 0 or a PUCCH format 1; when the BFRQ information is used to indicate information about the cell in which the link failure occurs (that is, the BFRQ information includes the identification information of the cell in which the link failure occurs and/or the reference signal information for link recovery), a format of the PUCCH resource for carrying the BFRQ information may be a PUCCH format 2/3/4.

When there is a reporting conflict between the PUCCH resource preconfigured to carry the BFRQ information and a PUCCH resource preconfigured to carry CSI information, for example, when one slot includes reporting of the BFRQ information and reporting of one or more pieces of CSI information, the CSI is carried on one or more PUCCH resources, and there is a reporting conflict between the PUCCH resource for carrying the BFRQ information and the PUCCH resources for carrying the CSI information, a reporting rule is as follows:

In a possible implementation, a priority rule includes: a priority of the PUCCH resource preconfigured to carry the BFRQ (or referred to as a priority of the BFRQ for short) is higher than a priority of the PUCCH resource preconfigured to carry the CSI (or referred to as a priority of the CSI for short). Specifically, the priority of the BFRQ is higher than a priority of any one of a CRI, an SSB-index, an RI, a PMI, a CQI, L1-RSRP, or an L1-SINR. Optionally, based on the priority rule, it may be determined, by using the foregoing first implementation solution, to send the BFRQ on the PUCCH resource for carrying the BFRQ. In this case, the CSI may not be sent.

It can be learned that, the BFRQ is used to request link fault recovery for one cell, the CSI is a feedback of a channel state, and a link fault of the cell has greater impact on performance of the entire system than the feedback of the channel state. Therefore, sending of the BFRQ information is more urgent than that of the CSI information. Therefore, in the embodiments of the present invention, the priority of the BFRQ is designed to be greater than the priority of the CSI. This helps ensure that the important, urgent, and consequence-prone BFRQ information is preferentially reported, thereby facilitating timely link fault recovery for the cell, ensuring stable running of the communications system, and saving communication resources.

In a possible implementation, a multiplexing rule includes: if the network device preconfigures, for the terminal device, a PUCCH resource used for multi-CSI reporting, the BFRQ and the CSI may be multiplexed on the PUCCH resource used for multi-CSI reporting. Optionally, based on the multiplexing rule, it may be determined, by using the foregoing second implementation solution, to send the BFRQ and the CSI on the PUCCH resource used for multi-CSI reporting.

In a possible implementation, applying both the priority rule and the multiplexing rule includes: If there is a reporting conflict between two or more pieces of CSI information, and the network device configures no PUCCH resource used for multi-CSI reporting, the terminal device selects, based on a priority of each piece of information, a maximum of two pieces of information with higher priorities for reporting. Because the priority of the BFRQ is higher than a priority of any CSI information, the maximum of two pieces of information with the higher priorities may include the BFRQ and another piece of CSI information, the BFRQ and the another piece of CSI information are separately carried on two PUCCH resources in a same slot, and at least one of the two PUCCH resources is in a PUCCH format 2. It may be determined, by using the foregoing fourth implementation solution, to separately send the BFRQ and the another piece of CSI information on the two PUCCH resources.

In a possible implementation, applying both the priority rule and the multiplexing rule includes: determining reporting content by preferentially using the multiplexing rule. That is, the PUCCH resource used for multi-CSI reporting that carries the BFRQ and the CSI is preferentially used as the reporting content. For specific implementation, refer to the descriptions of the foregoing fifth implementation solution.

When there is a reporting conflict between the PUCCH resource preconfigured to carry the BFRQ information and a PUCCH resource preconfigured to carry SR information, a reporting rule is as follows:

In a possible implementation, a priority rule includes: a priority of the PUCCH resource preconfigured to carry the BFRQ (or referred to as a priority of the BFRQ for short) is higher than a priority of the PUCCH resource preconfigured to carry the SR (or referred to as a priority of the SR for short). Optionally, based on the priority rule, it may be determined, by using the foregoing first implementation solution, to send the BFRQ on the PUCCH resource for carrying the BFRQ.

It can be learned that, the BFRQ is used to request link fault recovery for one cell, the SR is used to request an uplink scheduling resource, and a link fault of the cell has greater impact on performance of the entire system than data scheduling. Therefore, sending of the BFRQ information is more urgent than that of the SR information. Therefore, in the embodiments of the present invention, the priority of the BFRQ is designed to be greater than the priority of the SR. This helps ensure that the important, urgent, and consequence-prone BFRQ information is preferentially reported, thereby facilitating timely link fault recovery for the cell, ensuring stable running of the communications system, and saving communication resources.

In a possible implementation, a multiplexing rule includes: mapping the SR to the PUCCH resource preconfigured to carry the BFRQ, so that the BFRQ and the SR are multiplexed on the PUCCH resource preconfigured to carry the BFRQ. Optionally, based on the multiplexing rule, it may be determined, by using the foregoing second implementation solution, that reporting content includes the BFRQ and the SR that are sent on the PUCCH resource preconfigured to carry the BFRQ.

When there is a reporting conflict between the PUCCH resource preconfigured to carry the BFRQ information and a PUCCH resource preconfigured to carry HARQ information, a reporting rule is as follows:

In a possible implementation, a priority rule includes: a priority of the PUCCH resource preconfigured to carry the BFRQ (or referred to as a priority of the BFRQ for short) is higher than a priority of the PUCCH resource preconfigured to carry the HARQ (or referred to as a priority of the HARQ for short). Optionally, based on the priority rule, it may be determined, by using the foregoing first implementation solution, to send the BFRQ on the PUCCH resource for carrying the BFRQ.

Alternatively, a priority rule includes: a priority of the PUCCH resource preconfigured to carry the BFRQ is higher than a priority of the PUCCH resource that is preconfigured to carry the HARQ and that is in a PUCCH format 1. Optionally, based on the priority rule, it may be determined, by using the foregoing first implementation solution, to send the BFRQ on the PUCCH resource for carrying the BFRQ.

It can be learned that, the BFRQ is used to request link fault recovery for one cell, the HARQ is a feedback on whether a piece of data is correctly transmitted, and a link fault of the cell has greater impact on performance of the entire system than the feedback of the piece of data. Therefore, sending of the BFRQ information is more urgent than that of the HARQ information. Therefore, in the embodiments of the present invention, the priority of the BFRQ is designed to be greater than the priority of the HARQ. This helps ensure that the important, urgent, and consequence-prone BFRQ information is preferentially reported, thereby facilitating timely link fault recovery for the cell, ensuring stable running of the communications system, and saving communication resources.

In a possible implementation, a multiplexing rule includes: mapping the HARQ to the PUCCH resource preconfigured to carry the BFRQ, so that the BFRQ and the HARQ are multiplexed on the PUCCH resource preconfigured to carry the BFRQ. Optionally, based on the multiplexing rule, it may be determined, by using the foregoing second implementation solution, that reporting content includes the BFRQ and the HARQ that are sent on the PUCCH resource preconfigured to carry the BFRQ.

Alternatively, a multiplexing rule includes: multiplexing the BFRQ and the HARQ on a new PUCCH resource based on a total quantity of bits for the BFRQ and the HARQ. Optionally, based on the multiplexing rule, it may be determined, by using the foregoing second implementation solution, that reporting content includes the BFRQ and the HARQ that are sent on the new PUCCH resource.

Alternatively, a multiplexing rule includes: on a transmission occasion of the BFRQ, when the PUCCH resource preconfigured to carry the BFRQ information overlaps with the PUCCH resource that is preconfigured to carry the HARQ and that is in the PUCCH format 0, mapping the BFRQ to the PUCCH resource preconfigured to carry the HARQ, so that the BFRQ and the HARQ are multiplexed on the PUCCH resource. Optionally, based on the multiplexing rule, it may be determined, by using the foregoing second implementation solution, that reporting content includes the BFRQ and the HARQ that are sent on the PUCCH resource that is preconfigured to carry the HARQ and that is in the PUCCH format 0. It should be understood that, in this case, the BFRQ may be used to indicate only a link failure event (that is, the BFRQ includes the link failure indication information).

When there is a reporting conflict between the PUCCH resource preconfigured to carry the BFRQ information and a PUSCH resource preconfigured to carry second information, a reporting rule is as follows:

In a possible implementation, a priority rule includes: a priority of the PUCCH resource preconfigured to carry the BFRQ (or referred to as a priority of the BFRQ for short) is higher than a priority of the PUSCH resource preconfigured to carry the second information (or referred to as a priority of the second information for short). Optionally, based on the priority rule, it may be determined, by using the foregoing first implementation solution, to send the BFRQ on the PUCCH resource for carrying the BFRQ.

In a possible implementation, a multiplexing rule includes: mapping the BFRQ to the PUSCH resource preconfigured to carry the second information, so that the BFRQ and the second information are multiplexed on the PUSCH resource preconfigured to carry the second information. Optionally, if the second information includes UCI information, the BFRQ and the UCI information are independently encoded. For example, a bit rate of the BFRQ is less than or equal to a bit rate of the UCI information. Optionally, based on the multiplexing rule, it may be determined, by using the foregoing second implementation solution, that reporting content includes the BFRQ and the second information that are sent on the PUSCH resource preconfigured to carry the second information.

It should be noted that, in this specification, independent encoding means that two pieces of information are independently encoded before being sent, two bit sequences are generated after the encoding, and the two encoded bit sequences are separately mapped to different time-frequency-space resources (time domain resources, frequency domain resources, and/or space domain resources are different) and are sent by one device to another device. After receiving the two encoded bit sequences, the another device separately decodes the two bit sequences on the two resources to obtain the two pieces of information. For example, independent encoding of the BFRQ and the second information means that the BFRQ and the second information are obtained through separate encoding. For example, the BFRQ is represented by Q1 bits, and the second information is represented by Q2 bits. The terminal device encodes the Q1 bits to obtain information 1, and encodes the Q2 bits to obtain information 2, where reporting content includes the information 1 and the information 2. The network device decodes the Q1 bits for carrying the BFRQ in the information 1 or the information 2, to obtain the BFRQ; and the network device decodes the Q2 bits used to carry the second information in the reporting content, to obtain the second information.

In the foregoing examples, the BFRQ may include one or more of the link failure indication information, the identification information of the cell in which the link failure occurs, and the reference signal information (the new beam) for link recovery.

In the foregoing examples, the CSI may include one or more of the CRI, the SSB-index, the RI, the PMI, the CQI, the L1-RSRP, or the like. Alternatively, the CSI may include one or more of the CRI, the SSB-index, the RI, the PMI, the CQI, the L1-RSRP, the L1-SINR, or the like.

In addition, in a possible application scenario, the BFRQ may alternatively be considered as another type of CSI.

In an implementation of reporting the BFRQ information in two steps, after the terminal device detects a link fault, the terminal device sends first beam failure recovery request (or referred to as BFRQ 1 for short) information, where the BFRQ 1 may include link failure indication information and/or identification information of a cell in which a link failure occurs; and the terminal device sends second beam failure recovery request (or referred to as a BFRQ 2 for short) information, where the BFRQ 2 may include reference signal information (a new beam) for link recovery. Optionally, the BFRQ 1 may further indicate whether there is a new beam. A resource for carrying the BFRQ 1 information may be a PUCCH resource, and a resource for carrying the BFRQ 2 information may be a PUSCH resource. For example, the terminal device may send the BFRQ 1 in a primary cell (PCell), and send the BFRQ 2 in a secondary cell (SCell).

When there is a reporting conflict between the PUCCH resource preconfigured to carry the BFRQ 1 information and a PUCCH resource preconfigured to carry CSI information, for example, when one slot includes reporting of the BFRQ 1 information and reporting of one or more pieces of CSI information, the CSI is carried on one or more PUCCH resources, and there is a reporting conflict between the PUCCH resource for carrying the BFRQ 1 information and the PUCCH resources for carrying the CSI information, a reporting rule is as follows:

In a possible implementation, a priority rule includes: a priority of the PUCCH resource preconfigured to carry the BFRQ 1 (or referred to as a priority of the BFRQ 1 for short) is higher than a priority of the PUCCH resource preconfigured to carry the CSI (or referred to as a priority of the CSI for short). Specifically, the priority of the BFRQ 1 is higher than a priority of any one of a CRI, an SSB-index, an RI, a PMI, a CQI, L1-RSRP, or an L1-SINR. More specifically, the priority of the BFRQ 1>the priority of the L1-SINR>the priority of the L1-RSRP. Optionally, based on the priority rule, it may be determined, by using the foregoing first implementation solution, to send the BFRQ 1 on the PUCCH resource for carrying the BFRQ 1.

In a possible implementation, a multiplexing rule includes: if the network device preconfigures, for the terminal device, a PUCCH resource used for multi-CSI reporting, the BFRQ 1 and the CSI may be multiplexed on the PUCCH resource used for multi-CSI reporting. Optionally, based on the multiplexing rule, it may be determined, by using the foregoing second implementation solution, to send the BFRQ 1 and the CSI on the PUCCH resource used for multi-CSI reporting.

When there is a reporting conflict between the PUCCH resource preconfigured to carry the BFRQ 1 information and a PUCCH resource preconfigured to carry SR information, a reporting rule is as follows:

In a possible implementation, a priority rule includes: a priority of the BFRQ 1 is higher than a priority of the SR. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the SR to the PUCCH resource preconfigured to carry the BFRQ 1, so that the BFRQ 1 and the SR are multiplexed on the PUCCH resource preconfigured to carry the BFRQ 1. Optionally, based on the multiplexing rule, it may be determined, by using the foregoing second implementation solution, that reporting content includes the BFRQ 1 and the SR that are sent on the PUCCH resource preconfigured to carry the BFRQ 1.

The BFRQ 1 is used to indicate that a link fault occurs in at least one cell and/or indicate the identification information of the cell in which the link failure occurs. When the BFRQ 1 is request information that has a same format as the SR, the SR and the BFRQ 1 may be sent after a logical "OR" operation is performed on the SR and the BFRQ 1. In this case, the two pieces of information are both used to request uplink resources, and may be combined into one piece of information for sending.

When there is a reporting conflict between the PUCCH resource preconfigured to carry the BFRQ 1 information and a PUCCH resource preconfigured to carry HARQ information, a reporting rule is as follows:

In a possible implementation, a priority rule includes: a priority of the BFRQ 1 is higher than a priority of the HARQ. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the HARQ to the PUCCH resource preconfigured to carry the BFRQ 1, so that the BFRQ 1 and the HARQ are multiplexed on the PUCCH resource preconfigured to carry the BFRQ 1. Optionally, based on the multiplexing rule, it may be determined, by using the foregoing second implementation solution, that reporting content includes the BFRQ 1 and the HARQ that are sent on the PUCCH resource preconfigured to carry the HARQ.

Alternatively, a multiplexing rule includes: multiplexing the BFRQ 1 and the HARQ on a new PUCCH resource based on a total quantity of bits for the BFRQ 1 and the HARQ. Optionally, based on the multiplexing rule, it may be determined, by using the foregoing second implementation solution, that reporting content includes the BFRQ 1 and the HARQ that are sent on the new PUCCH resource.

When there is a reporting conflict between the PUCCH resource preconfigured to carry the BFRQ 1 information and a PUSCH resource preconfigured to carry second information, a reporting rule is as follows:

In a possible implementation, a priority rule includes: a priority of the BFRQ 1 is higher than a priority of the second information. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the BFRQ 1 to the PUSCH resource preconfigured to carry the second information, so that the BFRQ 1 and the second information are multiplexed on the PUSCH resource preconfigured to carry the second information.

Optionally, if the second information includes UCI information, the BFRQ 1 and the UCI information are independently encoded. For example, a bit rate of the BFRQ 1 is less than or equal to a bit rate of the UCI information. Optionally, based on the multiplexing rule, it may be determined, by using the foregoing second implementation solution, that reporting content includes the BFRQ 1 and the second information that are sent on the PUSCH resource preconfigured to carry the second information.

Optionally, if the second information includes the BFRQ 2, the BFRQ 1 and the BFRQ 2 are independently encoded. For example, a bit rate of the BFRQ 1 is less than or equal to a bit rate of the BFRQ 2.

When there is a reporting conflict between the PUSCH resource preconfigured to carry the BFRQ 2 information and a PUSCH resource preconfigured to carry CSI information, for example, when one slot includes reporting of the BFRQ 2 information and reporting of one or more pieces of CSI information, the CSI is carried on one or more PUSCH resources, and there is a reporting conflict between the PUSCH resource for carrying the BFRQ 2 information and the PUSCH resources for carrying the CSI information, a reporting rule is as follows:

In a possible implementation, a priority rule includes: a priority of the PUSCH resource preconfigured to carry the BFRQ 2 (or referred to as a priority of the BFRQ 2 for short) is higher than a priority of the PUSCH resource preconfigured to carry the CSI (or referred to as a priority of the CSI for short). Specifically, the priority of the BFRQ 2 is higher than a priority of any one of a CRI, an SSB-index, an RI, a PMI, a CQI, L1-RSRP, or an L1-SINR. More specifically, the priority of the BFRQ 2>the priority of the L1-SINR>the priority of the L1-RSRP. Optionally, based on the priority rule, it may be determined, by using the foregoing first implementation solution, to send the BFRQ 2 on the PUSCH resource for carrying the BFRQ 2.

When there is a reporting conflict between the PUSCH resource preconfigured to carry the BFRQ 2 information and a PUSCH resource preconfigured to carry second information, a reporting rule is as follows:

In a possible implementation, a priority rule includes: a priority of the BFRQ 2 is higher than a priority of the second information. Optionally, based on the priority rule, it may be determined, by using the foregoing first implementation solution, to send the BFRQ 2 on the PUSCH resource for carrying the BFRQ 2.

In a possible implementation, a multiplexing rule includes: mapping the BFRQ 2 to the PUSCH resource preconfigured to carry the second information, so that the BFRQ 2 and the second information are multiplexed on the PUSCH resource preconfigured to carry the second information.

Optionally, if the second information includes UCI information, the BFRQ 2 and the UCI information are independently encoded. For example, a bit rate of the BFRQ 2 is less than or equal to a bit rate of the UCI information.

Optionally, if the second information includes the BFRQ 1, the BFRQ 1 and the BFRQ 2 are independently encoded. For example, a bit rate of the BFRQ 1 is less than or equal to a bit rate of the BFRQ 2.

In another implementation of reporting the BFRQ information in two steps, after the terminal device detects a link fault, the terminal device sends BFRQ 1 information, where the BFRQ 1 may include link failure indication information and/or identification information of a cell in which a link failure occurs; and the terminal device sends BFRQ 2 information, where the BFRQ 2 may include reference signal information (a new beam) for link recovery. A resource for carrying the BFRQ 1 information may be a PRACH resource, and a resource for carrying the BFRQ 2 information may be a PUSCH resource. For example, the terminal device may send the BFRQ 1 in a primary cell (PCell), and send the BFRQ 2 in a secondary cell (SCell).

When there is a reporting conflict between the PUSCH resource preconfigured to carry the BFRQ 2 information and a PUSCH resource preconfigured to carry CSI information, for example, when one slot includes reporting of the BFRQ 2 information and reporting of one or more pieces of CSI information, the CSI is carried on one or more PUSCH resources, and there is a reporting conflict between the PUSCH resource for carrying the BFRQ 2 information and the PUSCH resources for carrying the CSI information, for specific content of a reporting rule, refer to the foregoing related descriptions. For brevity of the specification, details are not described herein again.

When there is a reporting conflict between the PUSCH resource preconfigured to carry the BFRQ 2 information and a PUSCH resource preconfigured to carry second information, for specific content of a reporting rule, refer to the foregoing related descriptions. For brevity of the specification, details are not described herein again.

In another implementation of reporting the BFRQ information in two steps, after the terminal device detects a link fault, the terminal device sends BFRQ 1 information, where the BFRQ 1 may include link failure indication information and/or identification information of a cell in which a link failure occurs; and the terminal device sends BFRQ 2 information, where the BFRQ 2 may include reference signal information (a new beam) for link recovery. A resource for carrying the BFRQ 1 information may be a PUCCH resource, and a resource for carrying the BFRQ 2 information may be a PRACH resource. For example, the terminal device may send the BFRQ 1 in a primary cell (PCell), and send the BFRQ 2 in a secondary cell (SCell).

When there is a reporting conflict between the PUCCH resource preconfigured to carry the BFRQ 1 information and a PUCCH resource preconfigured to carry CSI information, for example, when one slot includes reporting of the BFRQ 1 information and reporting of one or more pieces of CSI information, the CSI is carried on one or more PUCCH resources, and there is a reporting conflict between the PUCCH resource for carrying the BFRQ 1 information and the PUCCH resources for carrying the CSI information, for specific content of a reporting rule, refer to the foregoing related descriptions. For brevity of the specification, details are not described herein again.

When there is a reporting conflict between the PUCCH resource preconfigured to carry the BFRQ 1 information and a PUCCH resource preconfigured to carry SR information, for specific content of a reporting rule, refer to the foregoing related descriptions. For brevity of the specification, details are not described herein again.

When there is a reporting conflict between the PUCCH resource preconfigured to carry the BFRQ 1 information and a PUCCH resource preconfigured to carry HARQ information, for specific content of a reporting rule, refer to the foregoing related descriptions. For brevity of the specification, details are not described herein again.

When there is a reporting conflict between the PUCCH resource preconfigured to carry the BFRQ 1 information and a PUSCH resource preconfigured to carry second information, for specific content of a reporting rule, refer to the foregoing related descriptions. For brevity of the specification, details are not described herein again.

In another implementation of reporting the BFRQ information in two steps, after the terminal device detects a link fault, the terminal device sends BFRQ 1 information, where the BFRQ 1 may include link failure indication information; and the terminal device sends BFRQ 2 information, where the BFRQ 2 may include identification information of a cell in which a link failure occurs and/or reference signal information (a new beam) for link recovery. A resource for carrying the BFRQ 1 information may be a PUCCH resource, and a resource for carrying the BFRQ 2 information may be a PUSCH resource. For example, the terminal device may send the BFRQ 1 in a primary cell (PCell), and send the BFRQ 2 in a secondary cell (SCell).

When there is a reporting conflict between the PUCCH resource preconfigured to carry the BFRQ 1 information and a PUCCH resource preconfigured to carry CSI information, for example, when one slot includes reporting of the BFRQ 1 information and reporting of one or more pieces of CSI information, the CSI is carried on one or more PUCCH resources, and there is a reporting conflict between the PUCCH resource for carrying the BFRQ 1 information and the PUCCH resources for carrying the CSI information, a reporting rule is as follows:

In a possible implementation, a priority rule includes: a priority of the PUCCH resource preconfigured to carry the BFRQ 1 (or referred to as a priority of the BFRQ 1 for short) is higher than a priority of the PUCCH resource preconfigured to carry the CSI (or referred to as a priority of the CSI for short). Specifically, the priority of the BFRQ 1 is higher than a priority of any one of a CRI, an SSB-index, an RI, a PMI, a CQI, L1-RSRP, or an L1-SINR. More specifically, the priority of the BFRQ 1>the priority of the L1-SINR>the priority of the L1-RSRP. Optionally, based on the priority rule, it may be determined, by using the foregoing first implementation solution, to send the BFRQ 1 on the PUCCH resource for carrying the BFRQ 1.

In a possible implementation, a multiplexing rule includes: if the network device preconfigures, for the terminal device, a PUCCH resource used for multi-CSI reporting, the BFRQ 1 and the CSI may be multiplexed on the PUCCH resource used for multi-CSI reporting. Optionally, based on the multiplexing rule, it may be determined, by using the foregoing second implementation solution, to send the BFRQ 1 and the CSI on the PUCCH resource used for multi-CSI reporting.

Alternatively, a multiplexing rule includes: when the CSI information specifically includes the L1-SINR, mapping the BFRQ 1 to a PUCCH resource preconfigured to carry the L1-SINR, so that the BFRQ 1 and the L1-SINR are multiplexed on the PUCCH resource for the L1-SINR. Optionally, based on the multiplexing rule, it may be determined, by using the foregoing second implementation solution, to send the BFRQ 1 and the L1-SINR on the PUCCH resource preconfigured to carry the L1-SINR.

It can be learned that, the BFRQ 1 may be used to indicate that a link failure occurs in at least one cell, the BFRQ 1 may be transmitted by using 1 bit, and the SINR requires more than 1 bit for transmission. Therefore, the PUCCH resource preconfigured to carry the L1-SINR is larger, and the BFRQ 1 is multiplexed on the PUCCH resource for the L1-SINR for transmission, to ensure correct transmission of the two pieces of information and normal running of a link recovery service and a signal-to-interference ratio reporting service, thereby minimizing impact on the communications system.

When there is a reporting conflict between the PUCCH resource preconfigured to carry the BFRQ 1 information and a PUCCH resource preconfigured to carry SR information, a reporting rule is as follows:

In a possible implementation, a priority rule includes: a priority of the BFRQ 1 is higher than a priority of the SR. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the SR to the PUCCH resource preconfigured to carry the BFRQ 1, so that the BFRQ 1 and the SR are multiplexed on the PUCCH resource preconfigured to carry the BFRQ 1. Optionally, based on the multiplexing rule, it may be determined, by using the foregoing second implementation solution, that reporting content includes the BFRQ 1 and the SR that are sent on the PUCCH resource preconfigured to carry the BFRQ 1.

Optionally, the BFRQ 1 herein may also be understood as an SR dedicated to indicating a link failure. Alternatively, when the BFRQ 1 is request information that has a same format as the SR, the SR and the BFRQ 1 may be sent after a logical "OR" operation is performed on the SR and the BFRQ 1. In this case, the BFRQ 1 and the SR may be both used to request uplink resources, and may be combined into one piece of information for sending.

When there is a reporting conflict between the PUCCH resource preconfigured to carry the BFRQ 1 information and a PUCCH resource preconfigured to carry HARQ information, a reporting rule is as follows:

In a possible implementation, a priority rule includes: a priority of the BFRQ 1 is higher than a priority of the HARQ. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the BFRQ 1 to the PUCCH resource preconfigured to carry the HARQ, so that the BFRQ 1 and the HARQ are multiplexed on the PUCCH resource preconfigured to carry the HARQ. Optionally, based on the multiplexing rule, it may be determined, by using the foregoing second implementation solution, that reporting content includes the BFRQ 1 and the HARQ that are sent on the PUCCH resource preconfigured to carry the HARQ.

It can be learned that, the BFRQ 1 is used to indicate that a link failure occurs in at least one cell. In this case, the BFRQ 1 may require only 1 bit for transmission. However, a quantity of bits for the HARQ is usually greater than 1. Therefore, the PUCCH resource preconfigured to carry the HARQ information may carry more information, and the BFRQ 1 is multiplexed on the resource for the HARQ for transmission, to ensure correct transmission of the two pieces of information and normal running of a link recovery service and a data feedback service, thereby minimizing impact on the communications system.

Alternatively, a multiplexing rule includes: multiplexing the BFRQ 1 and the HARQ on a new PUCCH resource based on a total quantity of bits for the BFRQ 1 and the HARQ. Optionally, based on the multiplexing rule, it may be determined, by using the foregoing second implementation solution, that reporting content includes the BFRQ 1 and the HARQ that are sent on the new PUCCH resource.

When there is a reporting conflict between the PUCCH resource preconfigured to carry the BFRQ 1 information and a PUSCH resource preconfigured to carry second information, a reporting rule is as follows:

In a possible implementation, a priority rule includes: a priority of the BFRQ 1 is higher than a priority of the second information. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the BFRQ 1 to the PUSCH resource preconfigured to carry the second information, so that the BFRQ 1 and the second information are multiplexed on the PUSCH resource preconfigured to carry the second information.

Optionally, if the second information includes UCI information, the BFRQ 1 and the UCI information are independently encoded. For example, a bit rate of the BFRQ 1 is less than or equal to a bit rate of the UCI information. Optionally, based on the multiplexing rule, it may be determined, by using the foregoing second implementation solution, that reporting content includes the BFRQ 1 and the second information that are sent on the PUSCH resource preconfigured to carry the second information.

Optionally, if the second information includes the BFRQ 2, the BFRQ 1 and the BFRQ 2 are independently encoded. For example, a bit rate of the BFRQ 1 is less than or equal to a bit rate of the BFRQ 2.

When there is a reporting conflict between the PUSCH resource preconfigured to carry the BFRQ 2 information and a PUSCH resource preconfigured to carry CSI information, for example, when one slot includes reporting of the BFRQ 2 information and reporting of one or more pieces of CSI information, the CSI is carried on one or more PUSCH resources, and there is a reporting conflict between the PUSCH resource for carrying the BFRQ 2 information and the PUSCH resources for carrying the CSI information, a reporting rule is as follows:

In a possible implementation, a priority rule includes: a priority of the PUSCH resource preconfigured to carry the BFRQ 2 (or referred to as a priority of the BFRQ 2 for short) is higher than a priority of the PUSCH resource preconfigured to carry the CSI (or referred to as a priority of the CSI for short). Specifically, the priority of the BFRQ 2 is higher than a priority of any one of a CRI, an SSB-index, an RI, a PMI, a CQI, L1-RSRP, or an L1-SINR. More specifically, the priority of the BFRQ 2>the priority of the L1-SINR>the priority of the L1-RSRP. Optionally, based on the priority rule, it may be determined, by using the foregoing first implementation solution, to send the BFRQ 2 on the PUSCH resource for carrying the BFRQ 2.

When there is a reporting conflict between the PUSCH resource preconfigured to carry the BFRQ 2 information and a PUSCH resource preconfigured to carry second information, a reporting rule is as follows:

In a possible implementation, a priority rule includes: a priority of the BFRQ 2 is higher than a priority of the second information. Optionally, based on the priority rule, it may be determined, by using the foregoing first implementation solution, to send the BFRQ 2 on the PUSCH resource for carrying the BFRQ 2.

In a possible implementation, a multiplexing rule includes: mapping the BFRQ 2 to the PUSCH resource preconfigured to carry the second information, so that the BFRQ 2 and the second information are multiplexed on the PUSCH resource preconfigured to carry the second information.

When there is a reporting conflict between the PUSCH resource preconfigured to carry the BFRQ 2 information and a PUSCH resource preconfigured to carry the HARQ, a multiplexing rule includes: mapping the HARQ to the PUSCH resource preconfigured to carry the BFRQ 2, so that the BFRQ 2 and the HARQ are multiplexed on the PUSCH resource preconfigured to carry the BFRQ 2. Optionally, based on the multiplexing rule, it may be determined, by using the foregoing second implementation solution, that reporting content includes the BFRQ 2 and the HARQ that are sent on the PUSCH resource preconfigured to carry the BFRQ 2.

It can be learned that, a quantity of bits for the BFRQ 2 is usually greater than that for the HARQ. Therefore, the PUSCH resource preconfigured to carry the BFRQ 2 may carry more information, and the HARQ may be multiplexed on the PUSCH resource for the BFRQ 2 for transmission, to ensure correct transmission of the two pieces of information and normal running of a link recovery service and a data feedback service, thereby minimizing impact on the communications system.

In another implementation of reporting the BFRQ information in two steps, after the terminal device detects a link fault, the terminal device sends BFRQ 1 information, where the BFRQ 1 may include link failure indication information; and the terminal device sends BFRQ 2 information, where the BFRQ 2 may include identification information of a cell in which a link failure occurs and/or reference signal information for link recovery. A resource for carrying the BFRQ 1 information may be a PRACH resource, and a resource for carrying the BFRQ 2 information may be a PUSCH resource. For example, the terminal device may send the BFRQ 1 in a primary cell (PCell), and send the BFRQ 2 in a secondary cell (SCell).

When there is a reporting conflict between the PUSCH resource preconfigured to carry the BFRQ 2 information and a PUSCH resource preconfigured to carry CSI information, for example, when one slot includes reporting of the BFRQ 2 information and reporting of one or more pieces of CSI information, the CSI is carried on one or more PUSCH resources, and there is a reporting conflict between the PUSCH resource for carrying the BFRQ 2 information and the PUSCH resources for carrying the CSI information, a reporting rule is as follows:

In a possible implementation, a priority rule includes: a priority of the PUSCH resource preconfigured to carry the BFRQ 2 (or referred to as a priority of the BFRQ 2 for short) is higher than a priority of the PUSCH resource preconfigured to carry the CSI (or referred to as a priority of the CSI for short). Specifically, the priority of the BFRQ 2 is higher than a priority of any one of a CRI, an SSB-index, an RI, a PMI, a CQI, L1-RSRP, or an L1-SINR. More specifically, the priority of the BFRQ 2>the priority of the L1-SINR>the priority of the L1-RSRP. Optionally, based on the priority rule, it may be determined, by using the foregoing first implementation solution, to send the BFRQ 2 on the PUSCH resource for carrying the BFRQ 2.

When there is a reporting conflict between the PUSCH resource preconfigured to carry the BFRQ 2 information and a PUSCH resource preconfigured to carry second information, a reporting rule is as follows:

In a possible implementation, a priority rule includes: a priority of the BFRQ 2 is higher than a priority of the second information. Optionally, based on the priority rule, it may be determined, by using the foregoing first implementation solution, to send the BFRQ 2 on the PUSCH resource for carrying the BFRQ 2.

In a possible implementation, a multiplexing rule includes: mapping the BFRQ 2 to the PUSCH resource preconfigured to carry the second information, so that the BFRQ 2 and the second information are multiplexed on the PUSCH resource preconfigured to carry the second information.

Optionally, if the second information includes UCI information, the BFRQ 2 and the UCI information are independently encoded. For example, a bit rate of the BFRQ 2 is less than or equal to a bit rate of the UCI information.

Optionally, if the second information includes the BFRQ 1, the BFRQ 1 and the BFRQ 2 are independently encoded. For example, a bit rate of the BFRQ 1 is less than or equal to a bit rate of the BFRQ 2.

When there is a reporting conflict between the PUSCH resource preconfigured to carry the BFRQ 2 information and a PUSCH resource preconfigured to carry the HARQ, a multiplexing rule includes: mapping the HARQ to the PUSCH resource preconfigured to carry the BFRQ 2, so that the BFRQ 2 and the HARQ are multiplexed on the PUSCH resource preconfigured to carry the BFRQ 2. Optionally, based on the multiplexing rule, it may be determined, by using the foregoing second implementation solution, that reporting content includes the BFRQ 2 and the HARQ that are sent on the PUSCH resource preconfigured to carry the BFRQ 2.

It can be learned that, a quantity of bits for the BFRQ 2 is usually greater than that for the HARQ. Therefore, the PUSCH resource preconfigured to carry the BFRQ 2 may carry more information, and the HARQ may be multiplexed on the PUSCH resource for the BFRQ 2 for transmission, to ensure correct transmission of the two pieces of information and normal running of a link recovery service and a data feedback service, thereby minimizing impact on the communications system.

In another implementation of reporting the BFRQ information in two steps, after the terminal device detects a link fault, the terminal device sends BFRQ 1 information, where the BFRQ 1 may include link failure indication information; and the terminal device sends BFRQ 2 information, where the BFRQ 2 may include identification information of a cell in which a link failure occurs and/or reference signal information for link recovery. A resource for carrying the BFRQ 1 information may be a PUCCH resource, and a resource for carrying the BFRQ 2 information may be a PRACH resource. For example, the terminal device may send the BFRQ 1 in a primary cell (PCell), and send the BFRQ 2 in a secondary cell (SCell).

When there is a reporting conflict between the PUCCH resource preconfigured to carry the BFRQ 1 information and a PUCCH resource preconfigured to carry CSI information, for example, when one slot includes reporting of the BFRQ 1 information and reporting of one or more pieces of CSI information, the CSI is carried on one or more PUCCH resources, and there is a reporting conflict between the PUCCH resource for carrying the BFRQ 1 information and the PUCCH resources for carrying the CSI information, a reporting rule is as follows:

In a possible implementation, a priority rule includes: a priority of the PUCCH resource preconfigured to carry the BFRQ 1 (or referred to as a priority of the BFRQ 1 for short) is higher than a priority of the PUCCH resource preconfigured to carry the CSI (or referred to as a priority of the CSI for short). Specifically, the priority of the BFRQ 1 is higher than a priority of any one of a CRI, an SSB-index, an RI, a PMI, a CQI, L1-RSRP, or an L1-SINR. More specifically, the priority of the BFRQ 1>the priority of the L1-SINR>the priority of the L1-RSRP. Optionally, based on the priority rule, it may be determined, by using the foregoing first implementation solution, to send the BFRQ 1 on the PUCCH resource for carrying the BFRQ 1.

In a possible implementation, a multiplexing rule includes: if the network device preconfigures, for the terminal device, a PUCCH resource used for multi-CSI reporting, the BFRQ 1 and the CSI may be multiplexed on the PUCCH resource used for multi-CSI reporting. Optionally, based on the multiplexing rule, it may be determined, by using the foregoing second implementation solution, to send the BFRQ 1 and the CSI on the PUCCH resource used for multi-CSI reporting.

When there is a reporting conflict between the PUCCH resource preconfigured to carry the BFRQ 1 information and a PUCCH resource preconfigured to carry SR information, a reporting rule is as follows:

In a possible implementation, a priority rule includes: a priority of the BFRQ 1 is higher than a priority of the SR. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the SR to the PUCCH resource preconfigured to carry the BFRQ 1, so that the BFRQ 1 and the SR are multiplexed on the PUCCH resource preconfigured to carry the BFRQ 1. Optionally, based on the multiplexing rule, it may be determined, by using the foregoing second implementation solution, that reporting content includes the BFRQ 1 and the SR that are sent on the PUCCH resource preconfigured to carry the BFRQ 1.

It should be noted that, when the BFRQ 1 is request information that has a same format as the SR, the SR and the BFRQ 1 may be sent after a logical "OR" operation is performed on the SR and the BFRQ 1. In this case, the BFRQ 1 and the SR may be both used to request uplink resources, and may be combined into one piece of information for sending.

When there is a reporting conflict between the PUCCH resource preconfigured to carry the BFRQ 1 information and a PUCCH resource preconfigured to carry HARQ information, a reporting rule is as follows:

In a possible implementation, a priority rule includes: a priority of the BFRQ 1 is higher than a priority of the HARQ. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the HARQ to the PUCCH resource preconfigured to carry the BFRQ 1, so that the BFRQ 1 and the HARQ are multiplexed on the PUCCH resource preconfigured to carry the BFRQ 1. Optionally, based on the multiplexing rule, it may be determined, by using the foregoing second implementation solution, that reporting content includes the BFRQ 1 and the HARQ that are sent on the PUCCH resource preconfigured to carry the BFRQ 1 and the HARQ.

Alternatively, a multiplexing rule includes: multiplexing the BFRQ 1 and the HARQ on a new PUCCH resource based on a total quantity of bits for the BFRQ 1 and the HARQ. Optionally, based on the multiplexing rule, it may be determined, by using the foregoing second implementation solution, that reporting content includes the BFRQ 1 and the HARQ that are sent on the new PUCCH resource.

When there is a reporting conflict between the PUCCH resource preconfigured to carry the BFRQ 1 information and a PUSCH resource preconfigured to carry second information, in a possible implementation, a priority rule includes: a priority of the BFRQ 1 is higher than a priority of the second information. Optionally, based on the priority rule, it may be determined, by using the foregoing first implementation solution, to send the BFRQ 1 on the PUCCH resource for carrying the BFRQ 1.

In a possible implementation, a multiplexing rule includes: mapping the BFRQ 1 to the PUSCH resource preconfigured to carry the second information, so that the BFRQ 1 and the second information are multiplexed on the PUSCH resource preconfigured to carry the second information.

Optionally, if the second information includes UCI information, the BFRQ 1 and the UCI information are independently encoded. For example, a bit rate of the BFRQ 1 is less than or equal to a bit rate of the UCI information. Optionally, based on the multiplexing rule, it may be determined, by using the foregoing second implementation solution, that reporting content includes the BFRQ 1 and the second information that are sent on the PUSCH resource preconfigured to carry the second information.

Optionally, if the second information includes the BFRQ 2, the BFRQ 1 and the BFRQ 2 are independently encoded. For example, a bit rate of the BFRQ 1 is less than or equal to a bit rate of the BFRQ 2.

It should be understood that, in the embodiments of this application, if the BFRQ is sent by using two parts (the BFRQ 1 and the BFRQ 2), the BFRQ 1 and the BFRQ 2 may be carried on a resource of a primary cell or a primary secondary cell; or the BFRQ 1 may be carried on a resource of a primary cell or a primary secondary cell, and a specific cell with a resource for carrying the BFRQ 2 may depend on scheduling performed by the network device.

It should be understood that, with reference to the foregoing embodiments, when the BFRQ includes only the link failure indication information (for example, the BFRQ 1 in the foregoing embodiments), the following method for sending the BFRQ may further be available:

When a transmission moment of the BFRQ and a transmission moment of the HARQ for which a resource in the PUCCH format 0 is configured overlap in at least one time unit, the BFRQ is multiplexed on the resource in the PUCCH format 0, and a PUCCH (including the BFRQ and the HARQ information) is sent on the resource in the PUCCH format 0.

When a transmission moment of the BFRQ for which a resource in the PUCCH format 0 is configured and a transmission moment of the HARQ for which a resource in the PUCCH format 1 is configured overlap in at least one time unit, the BFRQ is sent only on the resource in the PUCCH format 0.

Specifically, there are the following possible implementations for L1-SINR information:

In an implementation, when the L1-SINR information needs to be reported, a resource for carrying the L1-SINR may be a PUCCH resource. Specifically, the L1-SINR may be reported together with a CRI, or may be reported together with an SSB-index.

When there is a reporting conflict between the PUCCH resource preconfigured to carry the L1-SINR information and a PUCCH resource preconfigured to carry CSI information, for example, when one slot includes reporting of the L1-SINR information and reporting of one or more pieces of CSI information, the CSI is carried on one or more PUCCH resources, and there is a reporting conflict between the PUCCH resource for carrying the L1-SINR information and the PUCCH resources for carrying the CSI information, a reporting rule is as follows:

In a possible implementation, a priority rule includes: a priority of the PUCCH resource preconfigured to carry the L1-SINR (or referred to as a priority of the L1-SINR for short) is higher than a priority of the PUCCH resource preconfigured to carry the CSI (or referred to as a priority of the CSI for short). Specifically, the priority of the L1-SINR is higher than a priority of any one of a CRI, an SSB-index, an RI, a PMI, a CQI, or L1-RSRP. Optionally, based on the priority rule, it may be determined, by using the foregoing first implementation solution, to send the L1-SINR on the PUCCH resource for carrying the L1-SINR.

It can be learned that, the L1-SINR may be obtained through measurement by using a channel measurement resource and an interference measurement resource, and indicates a ratio of a signal to interference, where both a signal factor (a non-interference factor) and an interference factor are considered. Therefore, reporting of the L1-SINR is more urgent and important than that of other CSI. For other CSI, for example, for the L1-RSRP, only a signal factor (a non-interference factor) is considered in the L1-RSRP, and the L1-RSRP may be obtained by using only a channel measurement resource. On the one hand, the L1-SINR includes more information than the L1-RSRP. On the other hand, if the L1-SINR is not sent first, and the L1-SINR is measured and reported at other time, more resources are wasted (for example, an interference measurement resource is used for the L1-SINR but is not used for the L1-RSRP). Therefore, in this embodiment of the present invention, the priority of the L1-SINR is designed to be greater than a priority of the other CSI (for example, the L1-RSRP). This helps ensure that the urgent and consequence-prone L1-SINR is preferentially reported, thereby ensuring stable running of the communications system, and saving communication resources.

In a possible implementation, a multiplexing rule includes: if the network device preconfigures, for the terminal device, a PUCCH resource used for multi-CSI reporting, the L1-SINR and the CSI may be multiplexed on the PUCCH resource used for multi-CSI reporting. Optionally, based on the multiplexing rule, it may be determined, by using the foregoing second implementation solution, to send the L1-SINR and the CSI on the PUCCH resource used for multi-CSI reporting.

In a possible implementation, applying both the priority rule and the multiplexing rule includes: If there is a reporting conflict between two or more pieces of CSI information, and the network device configures no PUCCH resource used for multi-CSI reporting, the terminal device selects, based on a priority of each piece of information, a maximum of two pieces of information with higher priorities for reporting. The maximum of two pieces of information with the higher priorities may include the L1-SINR and another piece of CSI information, the L1-SINR and the another piece of CSI information are separately carried on two PUCCH resources in a same slot, and at least one of the two PUCCH resources is in a PUCCH format 2. It may be determined, by using the foregoing fourth implementation solution, to separately send the L1-SINR and the another piece of CSI information on the two PUCCH resources.

In a possible implementation, applying both the priority rule and the multiplexing rule includes: determining reporting content by preferentially using the multiplexing rule. That is, the PUCCH resource used for multi-CSI reporting that carries the L1-SINR and the CSI is preferentially used as the reporting content. For specific implementation, refer to the descriptions of the foregoing fifth implementation solution.

When there is a reporting conflict between the PUCCH resource preconfigured to carry the L1-SINR information and a PUCCH resource preconfigured to carry SR information, a reporting rule is as follows:

In a possible implementation, a priority rule includes: a priority of the L1-SINR is lower than a priority of the SR. Optionally, based on the priority rule, it may be determined, by using the foregoing first implementation solution, to send the SR on the PUCCH resource for carrying the SR.

In a possible implementation, a multiplexing rule includes: mapping the SR to the PUCCH resource preconfigured to carry the L1-SINR, so that the L1-SINR and the SR are multiplexed on the PUCCH resource preconfigured to carry the L1-SINR. Optionally, based on the multiplexing rule, it may be determined, by using the foregoing second implementation solution, that reporting content includes the L1-SINR and the SR that are sent on the PUCCH resource preconfigured to carry the L1-SINR.

When there is a reporting conflict between the PUCCH resource preconfigured to carry the L1-SINR information and a PUCCH resource preconfigured to carry HARQ information, a reporting rule is as follows:

In a possible implementation, a priority rule includes: a priority of the L1-SINR is lower than a priority of the HARQ. Optionally, based on the priority rule, it may be determined, by using the foregoing first implementation solution, to send the HARQ on the PUCCH resource for carrying the HARQ.

In a possible implementation, a multiplexing rule includes: mapping the HARQ to the PUCCH resource preconfigured to carry the L1-SINR, so that the L1-SINR and the HARQ are multiplexed on the PUCCH resource preconfigured to carry the L1-SINR. Optionally, based on the multiplexing rule, it may be determined, by using the foregoing second implementation solution, that reporting content includes the L1-SINR and the HARQ that are sent on the PUCCH resource preconfigured to carry the L1-SINR.

Alternatively, a multiplexing rule includes: multiplexing the L1-SINR and the HARQ on a new PUCCH resource based on a total quantity of bits for the L1-SINR and the HARQ. Optionally, based on the multiplexing rule, it may be determined, by using the foregoing second implementation solution, that reporting content includes the L1-SINR and the HARQ that are sent on the new PUCCH resource.

In another implementation, when the L1-SINR information needs to be reported, a resource for carrying the L1-SINR may be a PUSCH resource.

When there is a reporting conflict between the PUSCH resource preconfigured to carry the L1-SINR information and a PUSCH resource preconfigured to carry CSI information, for example, when one slot includes reporting of the L1-SINR information and reporting of one or more pieces of CSI information, the CSI is carried on one or more PUSCH resources, and there is a reporting conflict between the PUSCH resource for carrying the L1-SINR information and the PUSCH resources for carrying the CSI information, a reporting rule is as follows:

In a possible implementation, a priority rule includes: a priority of the PUSCH resource preconfigured to carry the L1-SINR (or referred to as a priority of the L1-SINR for short) is higher than a priority of the PUSCH resource preconfigured to carry the CSI (or referred to as a priority of the CSI for short). Specifically, the priority of the L1-SINR is higher than a priority of any one of a CRI, an SSB-index, an RI, a PMI, a CQI, or L1-RSRP. Optionally, based on the priority rule, it may be determined, by using the foregoing first implementation solution, to send the L1-SINR on the PUSCH resource for carrying the L1-SINR.

In another implementation, when the L1-SINR information needs to be reported, in addition to reporting of a separate L1-SINR (where the L1-SINR may be referred to as a first SINR in this case), a reporting format of reporting both an L1-SINR and L1-RSRP (where the L1-SINR and the L1-RSRP may be collectively referred to as third information, and the L1-SINR may be referred to as a second SINR in this case) is further supported, and a resource for carrying the L1-SINR may be a PUSCH resource or a PUCCH resource.

When there is a reporting conflict between the PUCCH resource preconfigured to carry the first SINR and a PUCCH resource preconfigured to carry the third information, a reporting rule is as follows:

In a possible implementation, a priority rule includes: a priority of the PUCCH resource preconfigured to carry the first SINR (or referred to as a priority of the first SINR for short) is lower than a priority of the third information (that is, including the second SINR and the L1-RSRP) (or referred to as a priority of the third information for short). Optionally, based on the priority rule, it may be determined, by using the foregoing first implementation solution, to send the third information on the PUCCH resource for carrying the third information.

It can be learned that, because an information quantity of the third information (that is, including the second SINR and the L1-RSRP) is greater than an information quantity of the separate L1-SINR (the first SINR), especially when the L1-SINR is relatively small, the network device cannot determine whether the L1-SINR is relatively small because of a small signal or excessively high interference. The L1-RSRP is additionally reported by using the third information, so that the network device considers interference avoidance or updates, in time, a beam direction for sending a signal, to avoid impact on normal communication of the communications system. Therefore, in this embodiment of the present invention, the priority of the third information is designed to be greater than the priority of the first SINR. This helps ensure that the important and consequence-prone third information is preferentially reported, thereby ensuring stable running of the communications system, and saving communication resources.

In a possible implementation, a multiplexing rule includes: if the network device preconfigures, for the terminal device, a PUCCH resource used for multi-CSI reporting, the first SINR and the third information may be multiplexed on the PUCCH resource used for multi-CSI reporting. Optionally, based on the multiplexing rule, it may be determined, by using the foregoing second implementation solution, to send the first SINR and the third information on the PUCCH resource used for multi-CSI reporting.

It should be noted that, in some application scenarios, the foregoing specific examples of the BFRQ and the L1-SINR may be separately implemented, or several examples may be combined for comprehensive implementation.

It should be further noted that, the foregoing specific examples of the BFRQ and the L1-SINR are mainly described from a perspective of a reporting conflict between two pieces of information. It should be understood that there may be a reporting conflict among three or more pieces of information. In a related scenario, a person skilled in the art may comprehensively refer to related descriptions of the foregoing examples and the foregoing first implementation solution to fifth implementation solution for implementation, and details are not described herein.

It should be further noted that the foregoing specific examples about the BFRQ and the L1-SINR are mainly used to explain the technical solutions in the present invention. Based on related descriptions of the foregoing examples and the foregoing first implementation solution to fifth implementation solution, a person skilled in the art may design more examples for resolving a reporting conflict of the BFRQ or the L1-SINR. Details are not described herein.

Based on the specific examples described above, the following describes a specific rule for determining priorities of some information in a priority rule by using an example.

In some possible priority rules, a priority of AP CSI configured to be carried on a PUCCH>a priority of AP CSI configured to be carried on a PUSCH>a priority of SP CSI configured to be carried on a PUSCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (1):

$$Pri_{iCSI}(y, k, c, s) = 2 \cdot N_{cells} \cdot M_s \cdot y + N_{cells} \cdot M_s \cdot k + M_s \cdot c + s \quad (1)$$

$Pri_{iCSI}(y, k, c, s)$ represents a priority value of the specific CSI information, c represents a serving cell index, $N_{cells}$ represents a value of a higher layer configuration parameter maxNrofServingCells, s represents a reporting configuration identifier (reportConfigID), and $M_s$ represents a value of a higher layer configuration parameter maxNrofCSI-ReportConfigurations.

y is a specific value. In a possible embodiment, for reporting of the aperiodic CSI carried on the PUCCH, y=0; for reporting of the aperiodic CSI carried on the PUSCH, y=1; for reporting of the semi-periodic CSI carried on the PUSCH, y=2; for reporting of the semi-periodic CSI carried on the PUCCH, y=3; and for reporting of the periodic CSI carried on the PUCCH, y=4.

k is a specific value. In a possible embodiment, for reporting of CSI carrying the BFRQ, k=0; for reporting of CSI carrying the L1-SINR, k=1; for reporting of CSI carrying the L1-RSRP, k=2; and for reporting of CSI not carrying the BFRQ, the L1-SINR, or the L1-RSRP, k=3.

In a possible embodiment, if L1-SINR reporting is not supported in a protocol, a value of k above may be further defined as follows: For reporting of CSI carrying the BFRQ, k=0; for reporting of CSI carrying the L1-RSRP, k=1; and for reporting of the CSI not carrying the BFRQ or the L1-RSRP, k=2.

For example, based on the foregoing formula (1), when the BFRQ, the L1-RSRP, and the other CSI information are all configured to be carried on a same type of channel, it may be determined that a priority of the BFRQ>a priority of the L1-RSRP>a priority of the other CSI information.

In some other possible priority rules, a priority of AP CSI configured to be carried on a PUSCH>a priority of SP CSI configured to be carried on a PUSCH>a priority of AP CSI configured to be carried on a PUCCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (1):

$$Pri_{iCSI}(y, k, c, s) = 2 \cdot N_{cells} \cdot M_s \cdot y + N_{cells} \cdot M_s \cdot k + M_s \cdot c + s \quad (2)$$

$Pri_{iCSI}(y, k, c, s)$ represents a priority value of the specific CSI information, c represents a serving cell index, $N_{cells}$ represents a value of a higher layer configuration parameter maxNrofServingCells, s represents a reporting configuration identifier (reportConfigID), and $M_s$ represents a value of a higher layer configuration parameter maxNrofCSI-ReportConfigurations.

y is a specific value. In a possible embodiment, for reporting of the aperiodic CSI carried on the PUSCH, y=0; for reporting of the semi-periodic CSI carried on the PUSCH, y=1; for reporting of the aperiodic CSI carried on the PUCCH, y=2; for reporting of the semi-periodic CSI carried on the PUCCH, y=3; and for reporting of the periodic CSI carried on the PUCCH, y=4.

y is a specific value. In a possible embodiment, for reporting of CSI carrying the BFRQ, k=0; for reporting of CSI carrying the L1-SINR, k=1; for reporting of CSI carrying the L1-RSRP, k=2; and for reporting of CSI not carrying the BFRQ, the L1-SINR, or the L1-RSRP, k=3.

In a possible embodiment, if L1-SINR reporting is not supported in a protocol, a value of k above may be further defined as follows: For reporting of CSI carrying the BFRQ, k=0; for reporting of CSI carrying the L1-RSRP, k=1; and for reporting of the CSI not carrying the BFRQ or the L1-RSRP, k=2.

For example, based on the foregoing formula (2), when the BFRQ, the L1-RSRP, and the other CSI information are all configured to be carried on a same type of channel, it may be determined that a priority of the BFRQ>a priority of the L1-RSRP>a priority of the other CSI information.

In some other possible priority rules, a priority of AP CSI configured to be carried on a PUSCH>a priority of SP CSI configured to be carried on a PUSCH>a priority of AP CSI configured to be carried on a PUCCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (3):

$$Pri_{iCSI}(y, k, c, s) = \qquad (3)$$
$$3 \cdot N_{cells} \cdot M_s \cdot x + 2 \cdot N_{cells} \cdot M_s \cdot y + N_{cells} \cdot M_s \cdot k + M_s \cdot c + s$$

$Pri_{iCSI}(y, k, c, s)$ represents a priority value of the specific CSI information, c represents a serving cell index, $N_{cells}$ represents a value of a higher layer configuration parameter maxNrofServingCells, s represents a reporting configuration identifier (reportConfigID), and $M_s$ represents a value of a higher layer configuration parameter maxNrofCSI-ReportConfigurations.

x is a specific value. In a possible embodiment, for reporting of CSI carrying the BFRQ, x=0; and for reporting of CSI not carrying the BFRQ, x=1.

y is a specific value. In a possible embodiment, for reporting of the aperiodic CSI carried on the PUSCH, y=0; for reporting of the semi-periodic CSI carried on the PUSCH, y=1; for reporting of the aperiodic CSI carried on the PUCCH, y=2; for reporting of the semi-periodic CSI carried on the PUCCH, y=3; and for reporting of the periodic CSI carried on the PUCCH, y=4.

k is a specific value. In a possible embodiment, for reporting of CSI carrying the BFRQ, k=0; for reporting of CSI carrying the L1-SINR, k=1; for reporting of CSI carrying the L1-RSRP, k=2; and for reporting of CSI not carrying the BFRQ, the L1-SINR, or the L1-RSRP, k=3.

In a possible embodiment, if L1-SINR reporting is not supported in a protocol, a value of k above may be further defined as follows: For reporting of CSI carrying the BFRQ, k=0; for reporting of CSI carrying the L1-RSRP, k=1; and for reporting of the CSI not carrying the BFRQ or the L1-RSRP, k=2.

For example, based on the foregoing formula (3), when the BFRQ, the L1-RSRP, and the other CSI information are all configured to be carried on a same type of channel, it may be determined that a priority of the BFRQ>a priority of the other CSI information, and a priority of the L1-RSRP>the priority of the other CSI information.

In some other possible priority rules, a priority of AP CSI configured to be carried on a PUSCH>a priority of SP CSI configured to be carried on a PUSCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (4):

$$Pri_{iCSI}(y, k, c, s) = 2 \cdot N_{cells} \cdot M_s \cdot y + N_{cells} \cdot M_s \cdot k + M_s \cdot c + s \qquad (4)$$

Pri_iCSI (y,k,c,s) represents a priority value of the specific CSI information, c represents a serving cell index, N_cells represents a value of a higher layer configuration parameter maxNrofServingCells, s represents a reporting configuration identifier (reportConfigID), and M_s represents a value of a higher layer configuration parameter maxNrofCSI-ReportConfigurations.

y is a specific value. In a possible embodiment, for reporting of the aperiodic CSI carried on the PUSCH, y=0; for reporting of the semi-periodic CSI carried on the PUSCH, y=1; for reporting of the semi-periodic CSI carried on the PUCCH, y=2; and for reporting of the periodic CSI carried on the PUCCH, y=3.

k is a specific value. In a possible embodiment, for reporting of CSI carrying the BFRQ, k=0; for reporting of CSI carrying the L1-SINR, k=1; for reporting of CSI carrying the L1-RSRP, k=2; and for reporting of CSI not carrying the BFRQ, the L1-SINR, or the L1-RSRP, k=3.

In a possible embodiment, if L1-SINR reporting is not supported in a protocol, a value of k above may be further defined as follows: For reporting of CSI carrying the BFRQ, k=0; for reporting of CSI carrying the L1-RSRP, k=1; and for reporting of the CSI not carrying the BFRQ or the L1-RSRP, k=2.

In some other possible priority rules, a priority of AP CSI configured to be carried on a PUSCH>a priority of SP CSI configured to be carried on a PUSCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (5):

$$Pri_{iCSI}(y, k, c, s) = 2 \cdot N_{cells} \cdot M_s \cdot y + N_{cells} \cdot M_s \cdot k + M_s \cdot c + s \quad (5)$$

$Pri_{iCSI}(y, k, c, s)$ represents a priority value of the specific CSI information, c represents a serving cell index, $N_{cells}$ represents a value of a higher layer configuration parameter maxNrofServingCells, s represents a reporting configuration identifier (reportConfigID), and $M_s$ represents a value of a higher layer configuration parameter maxNrofCSI-Report-Configurations.

y is a specific value. In a possible embodiment, for reporting of the aperiodic CSI carried on the PUSCH, y=0; for reporting of the semi-periodic CSI carried on the PUSCH, y=1; for reporting of the semi-periodic CSI carried on the PUCCH, y=2; and for reporting of the periodic CSI carried on the PUCCH, y=3.

k is a specific value. In a possible embodiment, for reporting of CSI carrying the L1-SINR, k=0; for reporting of CSI carrying the L1-RSRP, k=1; and for reporting of CSI not carrying the L1-SINR or the L1-RSRP, k=2.

For example, based on the foregoing formula (5), when the L1-SINR, the L1-RSRP, and the other CSI information are all configured to be carried on a same type of channel, it may be determined that a priority of the L1-SINR>a priority of the L1-RSRP>a priority of the other CSI information.

In some other possible priority rules, a priority of AP CSI configured to be carried on a PUSCH>a priority of SP CSI configured to be carried on a PUSCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (6):

$$Pri_{iCSI}(y, k, c, s) = 2 \cdot N_{cells} \cdot M_s \cdot y + N_{cells} \cdot M_s \cdot k + M_s \cdot c + s \quad (6)$$

$Pri_{iCSI}(y, k, c, s)$ represents a priority value of the specific CSI information, c represents a serving cell index, $N_{cells}$ represents a value of a higher layer configuration parameter maxNrofServingCells, s represents a reporting configuration identifier (reportConfigID), and $M_s$ represents a value of a higher layer configuration parameter maxNrofCSI-Report-Configurations.

y is a specific value. In a possible embodiment, for reporting of the aperiodic CSI carried on the PUSCH, y=0; for reporting of the semi-periodic CSI carried on the PUSCH, y=1; for reporting of the semi-periodic CSI carried on the PUCCH, y=2; and for reporting of the periodic CSI carried on the PUCCH, y=3.

k is a specific value. In a possible embodiment, for reporting of CSI carrying third information (that is, including the L1-SINR and the L1-RSRP), k=0; for reporting of CSI carrying the L1-RSRP, k=1; and for reporting of CSI not carrying the L1-SINR or the L1-RSRP, k=2.

For example, based on the foregoing formula (6), when the third information (that is, including the L1-SINR and the L1-RSRP), the L1-RSRP, and the other CSI information are all configured to be carried on a same type of channel, it may be determined that a priority of the third information>a priority of the L1-RSRP>a priority of the other CSI information.

In some other possible priority rules, a priority of AP CSI configured to be carried on a PUSCH>a priority of SP CSI configured to be carried on a PUSCH>a priority of SP CSI configured to be carried on a PUCCH>a priority of P CSI configured to be carried on a PUCCH.

In this embodiment, a BFRQ, an L1-SINR, and other CSI such as a CRI, an SSB-index, an RI, a PMI, a CQI, and L1-RSRP may all be considered as CSI information.

The AP CSI indicates aperiodic CSI information, the SP CSI indicates semi-periodic CSI information, and the P CSI indicates periodic CSI information.

For example, a priority of specific CSI information may be determined by using the following formula (7):

$$Pri_{iCSI}(y, k, c, s) = 2 \cdot N_{cells} \cdot M_s \cdot y + N_{cells} \cdot M_s \cdot k + M_s \cdot c + s \quad (7)$$

$Pri_{iCSI}(y, k, c, s)$ represents a priority value of the specific CSI information, c represents a serving cell index, $N_{cells}$ represents a value of a higher layer configuration parameter maxNrofServingCells, s represents a reporting configuration identifier (reportConfigID), and $M_s$ represents a value of a higher layer configuration parameter maxNrofCSI-Report-Configurations.

y is a specific value. In a possible embodiment, for reporting of the aperiodic CSI carried on the PUSCH, y=0; for reporting of the semi-periodic CSI carried on the PUSCH, y=1; for reporting of the semi-periodic CSI carried on the PUCCH, y=2; and for reporting of the periodic CSI carried on the PUCCH, y=3.

k is a specific value. In a possible embodiment, for reporting of CSI carrying third information (that is, including the L1-SINR and the L1-RSRP), k=0; for reporting of CSI carrying the L1-SINR, k=1; for reporting of CSI carrying the L1-RSRP, k=2; and for reporting of CSI not carrying the L1-SINR or the L1-RSRP, k=3.

For example, based on the foregoing formula (7), when the third information (that is, including the L1-SINR and the L1-RSRP), a separate L1-SINR, the L1-RSRP, and the other CSI information are all configured to be carried on a same type of channel, it may be determined that a priority of the third information>a priority of the L1-SINR>a priority of the L1-RSRP>a priority of the other CSI information.

It should be noted that, in the foregoing formulas (1) to (7), a smaller value of $Pri_{iCSI}(y, k, c, s)$ indicates a higher priority. For example, content with a higher priority may be preferentially reported, for example, UCI with a lower value of $Pri_{iCSI}(y, k, c, s)$ in the priority rule is preferentially reported.

It should be noted that the foregoing specific priority determining rules are only used as some examples for explaining the technical solutions in the present invention. Based on the foregoing technical ideas, a person skilled in the art may further obtain an implementation of a priority relationship between the BFRQ and/or the L1-SINR and other UCI information (for example, the SR or the HARQ). Details are not provided in this specification.

The following continues to describe a related information reporting method provided in the embodiments of the present invention.

Figure 11:
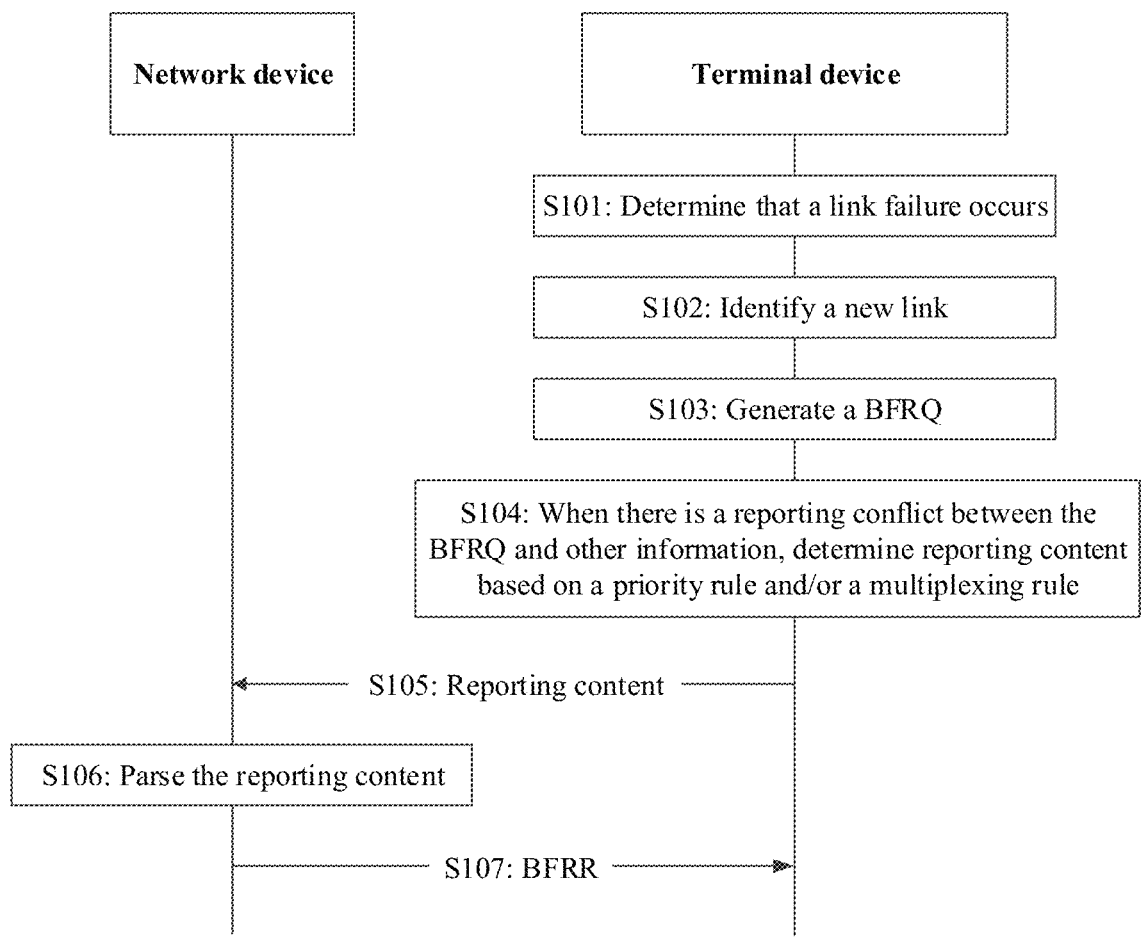
FIG. 11 is a schematic flowchart of an information reporting method according to an embodiment of the present invention.

FIG. 11 is a schematic flowchart of an information reporting method according to an embodiment of the present invention. The method procedure is described from a perspective of a plurality of sides (a terminal device side and a network device side), and includes but is not limited to the following steps.

S101: A terminal device determines that a link fault (a link failure) occurs between the terminal device and network device.

Specifically, the terminal device may measure a beam failure detection reference signal resource set (beam failure detection RS set), to determine that a link between the terminal device and the network device is faulty.

For example, when the terminal device determines that channel quality information of all or some reference signals in a beam failure detection RS or a beam failure detection RS set used to detect a cell is less than or equal to a preset threshold (a link failure threshold) for N consecutive times, the terminal device may determine that the link fault (the link failure) occurs between the terminal device and the network device.

It should be understood that, in this embodiment of the present invention, a manner in which the terminal device determines that the link failure occurs between the terminal device and the network device is not limited to the foregoing example, and the link failure may alternatively be determined in another determining manner. Related content about detection of a link fault by the terminal device has been described above, and details are not described herein again.

S102: The terminal device identifies a new link.

Specifically, the terminal device may determine, based on channel quality information of a candidate reference signal set (candidate beam identification RS), a reference signal (a new identified beam) whose channel quality is greater than or equal to a link failure recovery threshold, where the determining process may be determining performed by measuring the channel quality information of the candidate reference signal set. The reference signal in the candidate reference signal resource set that is identified by the terminal device is used as the new link.

There may be another method for identifying the new link by the terminal device. This is not limited in the present invention.

S103: The terminal device generates beam failure recovery request information.

Specifically, the terminal device may determine, based on the channel quality information of the candidate reference signal set (candidate beam identification RS), a reference signal resource (including a new identified beam and/or a new beam) whose channel quality is greater than or equal to the link failure recovery threshold, where the determining process may be determining performed by measuring the channel quality information of the candidate reference signal set. The terminal device generates one or more pieces of beam failure recovery request (BFRQ) information based on the new identified beam and/or the new beam, where the BFRQ information may include one or more of link failure indication information, identification information of a cell in which a link failure occurs, and reference signal information (a new beam) for link recovery. For example, in an implementation of reporting the BFRQ information in one step, the terminal device may generate one piece of BFRQ information, where the one piece of BFRQ information includes the identification information of the cell in which the link failure occurs and/or information about the new beam. For another example, in an implementation of reporting the BFRQ information in two steps, the terminal device may generate BFRQ 1 information and BFRQ 2 information, where the BFRQ 1 information includes the link failure indication information and/or the identification information of the cell in which the link failure occurs, and the BFRQ 2 information includes information about the new beam. Alternatively, the BFRQ 1 may include the link failure indication information, and the BFRQ 2 may include the identification information of the cell in which the link failure occurs and/or information about the new beam.

When the BFRQ information generated by the terminal device includes both the identification information of the cell in which the link failure occurs and the information about the new beam, the BFRQ information may be preconfigured to be carried on a PUCCH resource or a PUSCH resource. For example, the BFRQ may be preconfigured to be sent in a primary cell (PCell) or a secondary cell (SCell).

When the terminal device generates the BFRQ 1 information and the BFRQ 2 information, the BFRQ 1 may be preconfigured to be sent in, for example, a primary cell (PCell), and the BFRQ 2 may be preconfigured to be sent in, for example, a secondary cell (SCell). A resource for carrying the BFRQ 1 information may be a PUCCH resource, a PUSCH resource, or a PRACH resource, and a resource for carrying the BFRQ 2 information may be a PUCCH resource, a PUSCH resource, or a PRACH resource. In a possible implementation, the resource for carrying the BFRQ 1 information is a PUCCH resource or a PRACH resource, and the resource for carrying the BFRQ 2 information is a PUSCH resource. In this case, the PUCCH or PRACH resource may be a resource of the primary cell or a primary secondary cell, and the PUSCH resource may be a resource of the primary cell or a primary secondary cell, or a cell to which the PUSCH resource belongs depends on scheduling by the network device. In another possible implementation, the resource for carrying the BFRQ 1 information is a PUCCH resource, and the resource for carrying the BFRQ 2 information is a PRACH resource. In this case, the PUCCH resource may be a resource of the primary cell or a primary secondary cell, and the PRACH resources may be a resource of the cell in which the link failure occurs.

For example, optionally, the BFRQ information of the PCell in NR may be preconfigured to be carried on one or more PRACH resources, and each PRACH resource is configured to be associated with one reference signal, where the reference signal is a reference signal used for link fault recovery. The reference signal may be a corresponding reference signal in a candidate reference signal resource set configured by a base station. The PRACH resource is used to send the BFRQ information to the network device. Specifically, an uplink resource set that may be configured by the network device for a cell (for example, a first cell) and that is used to send a BFRQ of the first cell is referred to as a first uplink resource set. A quantity of PRACH resources included in the first uplink resource set may be equal to a quantity of downlink reference signals in a candidate reference signal resource set of the first cell. In other words, one PRACH resource is associated with one downlink reference signal. When there is an uplink and downlink reciprocity, a transmit beam used when the terminal device sends information on one PRACH resource is a transmit beam corresponding to a receive beam of a downlink reference signal associated with the PRACH resource. In other words, the terminal device may send the information on the PRACH resource by using the transmit beam corresponding to the receive beam. When there is no uplink and downlink reciprocity, in an optional implementation, one PRACH resource in the first uplink resource set is associated with one downlink reference signal and one uplink reference signal. The terminal device may determine, based on the determined PRACH resource associated with the downlink reference signal, the uplink reference signal associated with the PRACH resource, to send the BFRQ information on the PRACH resource by using a transmit beam of the uplink reference signal.

It should be understood that, the BFRQ information of the PCell in NR may be preconfigured to be carried on one or more PUSCH resources or PUCCH resources for reporting in one step. Details are not described herein.

It should be understood that, the BFRQ information of the SCell in the NR may alternatively be preconfigured to be carried on a PUSCH resource, a PUCCH resource, or a PRACH resource for reporting in one step. Details are not described herein.

For example, the beam failure recovery request information may be further reported in two steps by using the BFRQ 1 and the BFRQ 2.

It should be understood that, the beam failure recovery request information is carried on the PUSCH resource, and it may be understood that the BFRQ information is reported by using a MAC-CE, or it may be understood that the BFRQ information is reported through aperiodic CSI reporting, which is also referred to as layer 1 aperiodic reporting (L1 CSI report).

Optionally, a media access control (MAC) layer of the terminal device maintains a link failure recovery timer (beam failure recovery timer) and a link failure recovery counter (beam failure recovery counter). The link failure recovery timer is used to control an entire time length of link failure recovery. The link failure recovery counter is used to limit a quantity of times that the terminal device sends a link failure recovery request. When the link failure recovery counter reaches a maximum value, the terminal device considers that the link failure recovery fails, and stops a link failure recovery process. A time length of recovery of the recovery timer and a count value of the recovery counter may be configured by the network device, or may be preset values.

S104: When there is a reporting conflict (a collision) between the resource for sending the beam failure recovery request and a resource for sending at least one piece of other information, the terminal device determines reporting content based on at least one of a priority rule and a multiplexing rule.

As described above, UCI information such as the BFRQ, an L1-SINR, a HARQ, an SR, and other CSI (such as a CRI, an SSB-index, an RI, a PMI, a CQI, or L1-RSRP) has respective reporting rules and reporting occasions. Therefore, when the BFRQ needs to be reported, one or more pieces of other information may also need to be reported. To avoid a reporting conflict (a collision) between the BFRQ and other information, the terminal device determines reporting content based on the priority rule and/or the multiplexing rule.

For detailed content of determining, by the terminal device, the reporting content based on the priority rule and/or the multiplexing rule, refer to the descriptions of the foregoing first implementation solution to fifth implementation solution and descriptions related to the BFRQ in the specific examples. For brevity of the specification, details are not described herein again.

S105: The terminal device sends the reporting content to the network device by using a specific time-frequency resource; and correspondingly, the network device receives the reporting content. For detailed content related to the time-frequency resource used to transmit the reporting content, reference may also be made to the descriptions of the foregoing first implementation solution to fifth implementation solution and descriptions related to the BFRQ in the specific examples. For brevity of the specification, details are not described herein again.

S106: The network device may further parse (decode or demodulate) the reporting content based on the priority rule and/or the multiplexing rule. For detailed content of the priority rule and/or the multiplexing rule, reference may also be made to the descriptions of the foregoing first implementation solution to fifth implementation solution and descriptions related to the BFRQ in the specific examples. For brevity of the specification, details are not described herein again.

S107: Optionally, the network device sends beam failure recovery response (BFRR) information to the terminal device; and correspondingly, the terminal device receives the beam failure recovery response information.

The beam failure recovery response information may mean that DCI whose CRC is scrambled by using a C-RNTI is received on a control resource set and/or a search space set dedicated to sending the beam failure recovery response information, and the beam failure recovery response information may alternatively be DCI scrambled by using other information (for example, DCI scrambled by using a beam failure recovery radio network temporary identifier (BFR-RNTI)). The beam failure recovery response information may alternatively be one of the following information:

DCI scrambled by using a cell radio network temporary identifier C-RNTI, DCI scrambled by using an MCS-C-RNTI, downlink control information DCI in a dedicated search space, DCI scrambled by using a dedicated RNTI, DCI scrambled by using a random access radio network temporary identifier (RA-RNTI), DCI including a preset status value, DCI including TCI information, QCL indication information of a cell in which a link failure occurs, or DCI in a preset format, where the DCI in the preset format indicates newly transmitted data. This is not limited in this embodiment of this application.

It can be learned that, according to the method in this embodiment of the present invention, when the terminal device detects the link fault and needs to report the BFRQ to the network device, if there is a reporting conflict between the resource for carrying the BFRQ and a resource for carrying other information, reporting content to be sent to the network device may be determined based on a priority relationship between BFRQ information and other UCI information or a multiplexing relationship between BFRQ information and other UCI information in a link failure recovery process that is designed in this embodiment of the present invention, so that important, urgent, and consequence-prone content can be normally reported, thereby effectively avoiding impact caused by the reporting conflict, ensuring normal running of a related service, and ensuring stability of a communications system. Further, according to the foregoing method, the terminal device with a limited capability may be enabled to preferentially send important, urgent, and consequence-prone content, or according to the foregoing method, a single-carrier characteristic may be maintained for an uplink channel as much as possible.

Figure 12:
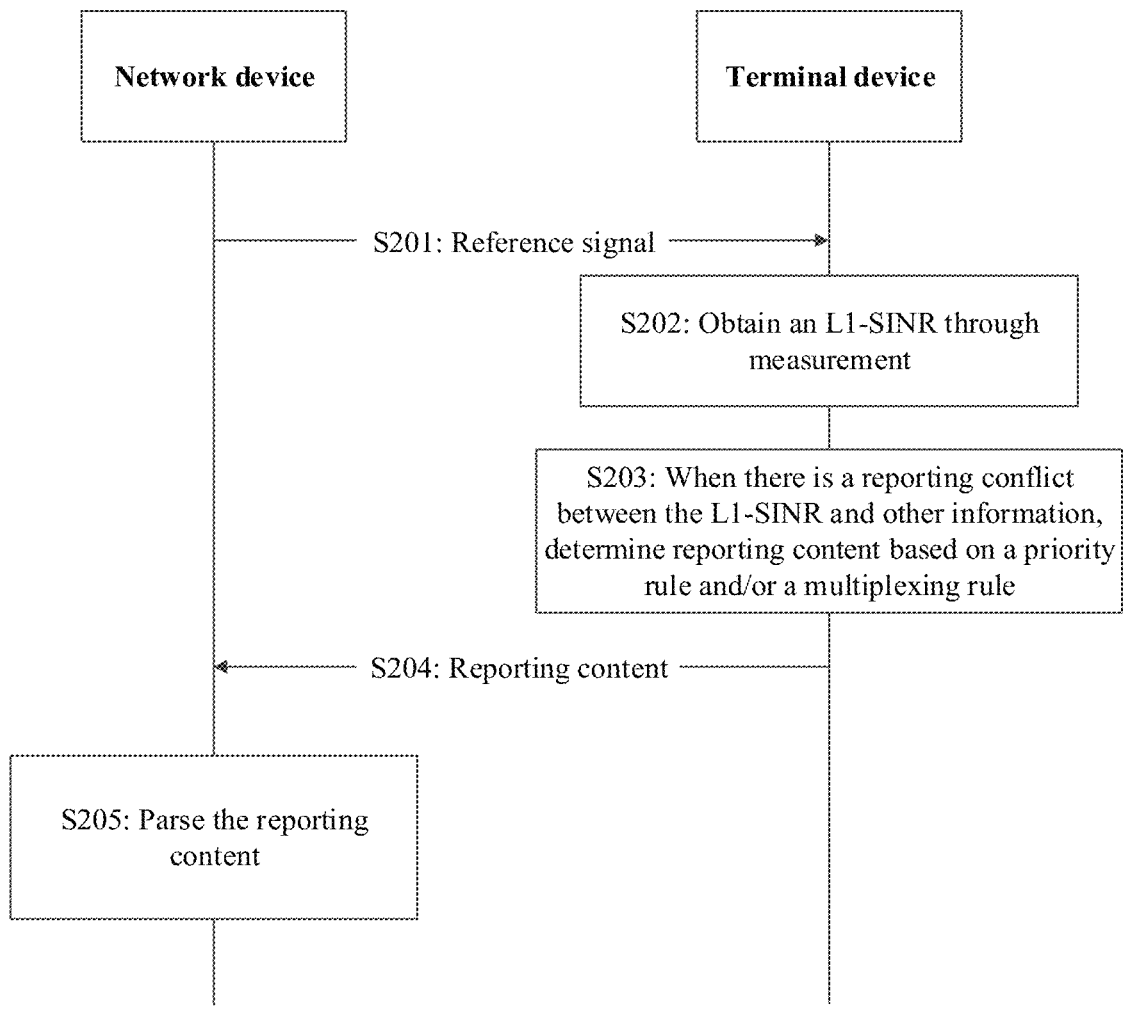
FIG. 12 is a schematic flowchart of another information reporting method according to an embodiment of the present invention.

FIG. 12 is a schematic flowchart of an information reporting method according to an embodiment of the present invention. The method procedure is described from a perspective of a plurality of sides (a terminal device side and a network device side), and includes but is not limited to the following steps.

S201: A network device sends a reference signal to a terminal device, and correspondingly, the terminal device receives the reference signal.

S202: The terminal device performs measurement based on the reference signal, to obtain signal to interference plus noise ratio (L1-SINR) information corresponding to some or all reference signals. For example, RSRQ or RSRP may be obtained by measuring the reference signal, and a corresponding L1-SINR may be obtained based on the RSRQ or RSRP.

For example, in an embodiment in which the L1-SINR may be configured to be periodically reported, the terminal device may obtain the L1-SINR through measurement based on a periodic reporting occasion, to facilitate subsequent reporting.

For another example, in an embodiment in which the L1-SINR may be configured to be aperiodically reported, the terminal device may obtain the L1-SINR through measurement based on an aperiodic resource indicated by the network device, to facilitate subsequent reporting.

For another example, in an embodiment in which L1-SINR reporting may be triggered based on an event, when it is detected that a predetermined event condition is met, the terminal device may be triggered to perform measurement to obtain the L1-SINR, to facilitate subsequent reporting. For example, the predetermined event condition may be that measured time to trigger of RSRQ or RSRP exceeds a predetermined threshold, and the terminal device is triggered to perform measurement to obtain the L1-SINR.

Certainly, in this embodiment of the present invention, the L1-SINR corresponding to the reference signal may be obtained through measurement in any other manner. This is not limited in the present invention.

S203: When there is a reporting conflict (a collision) between a resource for sending the L1-SINR information and a resource for sending at least one piece of other information, the terminal device determines reporting content based on at least one of a priority rule and a multiplexing rule.

As described above, UCI information such as the L1-SINR, a BFRQ, a HARQ, an SR, and other CSI (such as a CRI, an SSB-index, an RI, a PMI, a CQI, or L1-RSRP) has respective reporting rules and reporting occasions. Therefore, when the L1-SINR needs to be reported, one or more pieces of other information may also need to be reported. To avoid a reporting conflict (a collision) between the L1-SINR and the other information, the terminal device determines reporting content based on the priority rule and/or the multiplexing rule.

For detailed content of determining, by the terminal device, the reporting content based on the priority rule and/or the multiplexing rule, refer to the descriptions of the foregoing first implementation solution to fifth implementation solution and descriptions related to the L1-SINR in the specific examples. For brevity of the specification, details are not described herein again.

S204: The terminal device sends the reporting content to the network device by using a specific time-frequency resource; and correspondingly, the network device receives the reporting content. For detailed content related to the time-frequency resource used to transmit the reporting content, reference may also be made to the descriptions of the foregoing first implementation solution to fifth implementation solution and descriptions related to the L1-SINR in the specific examples. For brevity of the specification, details are not described herein again.

S205: The network device may further parse (decode or demodulate) the reporting content based on the priority rule and/or the multiplexing rule. For detailed content of the priority rule and/or the multiplexing rule, reference may also be made to the descriptions of the foregoing first implementation solution to fifth implementation solution and descriptions related to the L1-SINR in the specific examples. For brevity of the specification, details are not described herein again.

It can be learned that, according to the method in this embodiment of the present invention, when the terminal device determines, based on a downlink reference signal, that the L1-SINR needs to be reported to the network device, if there is a reporting conflict between the resource for carrying the L1-SINR and a resource for carrying other information, reporting content to be sent to the network device may be determined based on a priority relationship between L1-SINR information and other UCI information or a multiplexing relationship between L1-SINR information and other UCI information in an L1-SINR reporting process that is designed in this embodiment of the present invention, so that important, urgent, and consequence-prone content can be normally reported, thereby effectively avoiding impact caused by the reporting conflict, ensuring normal running of a related service, and ensuring stability of a communications system. Further, according to the foregoing method, the terminal device with a limited capability may be enabled to preferentially send important, urgent, and consequence-prone content, or according to the foregoing method, a single-carrier characteristic may be maintained for an uplink channel as much as possible.

The foregoing describes in detail the system and the method in the embodiments of the present invention. The following continues to provide related apparatuses in the embodiments of the present invention.

Figure 13:
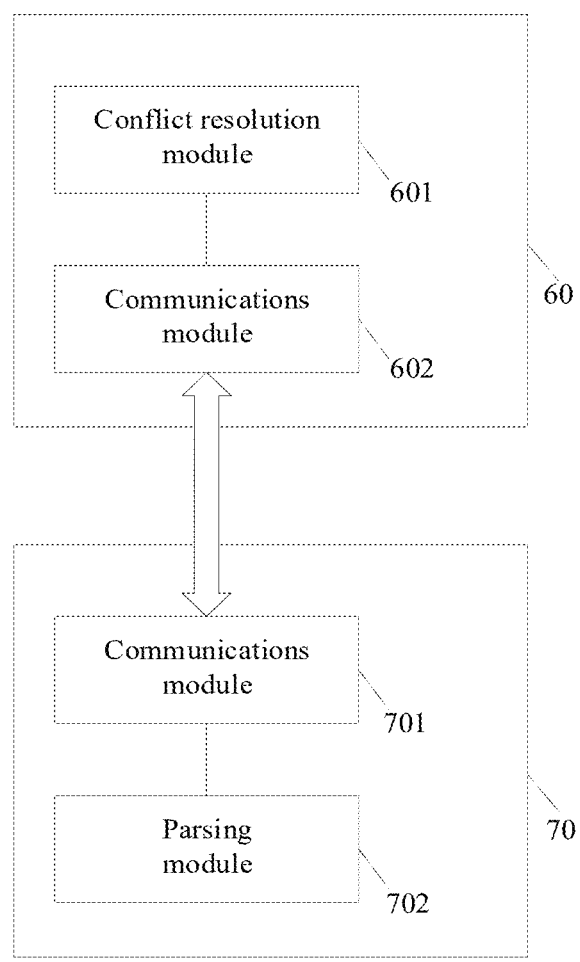
FIG. 13 is a schematic diagram of a structure of a terminal device, a schematic diagram of a structure of a network device, and a schematic diagram of a communications system including the terminal device and the network device according to an embodiment of the present invention.

FIG. 13 is a schematic diagram of a structure of a terminal device 60, a schematic diagram of a structure of a network device 70, and a schematic diagram of a communications system including the terminal device 60 and the network device 70 according to an embodiment of the present invention. The terminal device 60 includes a conflict resolution module 601 and a communications module 602. The network device 70 includes a communications module 701 and a parsing module 702. The communications module 602 of the terminal device 60 may communicate with the communications module 701 of the network device 70. In some embodiments, the conflict resolution module 601 or the parsing module 702 may run on a processor 811 in the following FIG. 14, and the communications module 602 or the communications module 701 may implement a communication function by using a communications interface 812 in the following FIG. 14.

In some embodiments, for the terminal device 60, the conflict resolution module 601 is configured to: when there is a reporting conflict between a beam failure recovery request (BFRQ) and at least one piece of information, determine reporting content based on at least one of a priority rule and a multiplexing rule, where the at least one piece of information includes first information, the first information includes any one of a signal to interference plus noise ratio (SINR), channel state information (CSI), hybrid automatic repeat request (HARQ) information, a scheduling request (SR), or second information, the CSI includes at least one of a CRI, an SSB-index, an RI, a PMI, a CQI, or RSRP, the second information is configured to be carried on a PUSCH resource, and the priority rule includes: a priority of the BFRQ is higher than a priority of at least one of the SINR, the CSI, the HARQ, the SR, or the second information.

The communications module 602 is configured to send the reporting content to the network device 70, where the reporting content includes one item with a highest priority in at least two items including the BFRQ and the at least one piece of information.

Optionally, the multiplexing rule includes: multiplexing the BFRQ and the first information on a first time-frequency resource; and when the first information includes the SINR, the first time-frequency resource is a PUCCH resource configured for multi-CSI reporting, or the first time-frequency resource is a resource configured to carry the SINR; when the first information includes the CSI, the first time-frequency resource is a PUCCH resource configured for multi-CSI reporting; when the first information includes the HARQ, the first time-frequency resource is a resource configured to carry the HARQ; when the first information includes the SR, the first time-frequency resource is a resource configured to carry the BFRQ; or when the first information includes the second information, the first time-frequency resource is the PUSCH resource, and the BFRQ and the second information are independently encoded.

Optionally, when the BFRQ and the at least one piece of information are both applicable to the priority rule and the multiplexing rule, determining the reporting content by preferentially using the multiplexing rule.

Optionally, the at least one piece of information specifically includes at least two pieces of information; the conflict resolution module 601 is specifically configured to: determine the priority of the BFRQ and a priority of each of the at least two pieces of information based on the priority rule; select at least two items with highest priorities from at least three items including the BFRQ and the at least two pieces of information; and multiplex the at least two items with the highest priorities on the first time-frequency resource based on the multiplexing rule, where the reporting content includes the at least two items with the highest priorities; and correspondingly, the communications module 602 sends the at least two items with the highest priorities to the network device 70 on the first time-frequency resource.

Optionally, the at least one piece of information specifically includes at least two pieces of information; the conflict resolution module 601 is specifically configured to: determine the priority of the BFRQ and a priority of each of the at least two pieces of information based on the priority rule; select a maximum of two items with higher priorities from at least three items including the BFRQ and the at least two pieces of information; and separately include the maximum of two items with the higher priorities on a maximum of two PUCCH resources based on the multiplexing rule, where at least one of the maximum of two PUCCH resources is in a PUCCH format 2, the maximum of two PUCCH resources are time division multiplexed in a same slot, and the reporting content includes the maximum of two items with the higher priorities; and correspondingly, the communications module 602 separately sends the maximum of two items with the higher priorities to the network device 70 on the maximum of two PUCCH resources.

Optionally, the BFRQ includes at least one of link failure indication information, identification information of a cell in which a link failure occurs, and reference signal information for link recovery. Optionally, the BFRQ is configured to be carried on a PUCCH resource, a PUSCH resource, or a PRACH resource.

In some other embodiments, for the terminal device 60, the conflict resolution module 601 is configured to: when there is a reporting conflict between a first SINR and at least one piece of information, determine reporting content based on at least one of a priority rule and a multiplexing rule, where the at least one piece of information includes first information, the first information includes any one of CSI, a HARQ, an SR, or third information, the CSI includes at least one of a CRI, an SSB-index, an RI, a PMI, a CQI, or RSRP, the third information includes a second SINR and RSRP, and the priority rule includes at least one of the following: a priority of the first SINR is higher than a priority of the CSI, a priority of the first SINR is lower than a priority of the HARQ, a priority of the first SINR is lower than a priority of the SR, or a priority of the first SINR is lower than a priority of the third information.

The communications module 602 is configured to send the reporting content to the network device 70, where the reporting content includes one item with a highest priority in at least two items including the first SINR and the at least one piece of information.

Optionally, the multiplexing rule includes: multiplexing the first SINR and the first information on a first time-frequency resource.

When the first information includes the CSI, the first time-frequency resource is a PUCCH resource configured for multi-CSI reporting, or the first time-frequency resource is a resource configured to carry the SINR; when the first information includes the HARQ, the first time-frequency resource is a resource configured to carry the SINR; or when the first information includes the SR, the first time-frequency resource is a resource configured to carry the SINR.

In some embodiments, for the network device 70, the communications module 701 is configured to receive reporting content of the terminal device 60, where the reporting content is determined based on at least one of a priority rule and a multiplexing rule when there is a reporting conflict between a BFRQ and at least one piece of information, the reporting content includes the BFRQ, the at least one piece of information includes first information, the first information includes any one of a signal to interference plus noise ratio (SINR), channel state information (CSI), a hybrid automatic repeat request (HARQ), a scheduling request (SR), or second information, the CSI includes at least one of a CRI, an SSB-index, an RI, a PMI, a CQI, or RSRP, the second information is configured to be carried on a PUSCH resource, and the priority rule includes: a priority of the BFRQ is higher than a priority of at least one of the SINR, the CSI, the HARQ, the SR, or the second information.

The parsing module 702 is configured to parse the reporting content, to obtain the BFRQ.

Optionally, the multiplexing rule includes: multiplexing the BFRQ and the first information on a first time-frequency resource; and when the first information includes the SINR, the first time-frequency resource is a PUCCH resource configured for multi-CSI reporting, or the first time-frequency resource is a resource configured to carry the SINR; when the first information includes the CSI, the first time-frequency resource is a PUCCH resource configured for multi-CSI reporting; when the first information includes the HARQ, the first time-frequency resource is a resource configured to carry the HARQ; when the first information includes the SR, the first time-frequency resource is a resource configured to carry the BFRQ; or when the first information includes the second information, the first time-frequency resource is the PUSCH resource, and the BFRQ and the second information are independently encoded. The communications module 701 is specifically configured to receive the reporting content on the first time-frequency resource.

Optionally, when the BFRQ and the at least one piece of information are both applicable to the priority rule and the multiplexing rule, the reporting content is determined by preferentially using the multiplexing rule.

Optionally, the at least one piece of information specifically includes at least two pieces of information, and when there is a reporting conflict between the BFRQ and the at least two pieces of information, the reporting content is determined based on both the priority rule and the multiplexing rule.

Optionally, the BFRQ includes at least one of link failure indication information, identification information of a cell in which a link failure occurs, and reference information for link recovery.

In some other embodiments, for the network device 70, the communications module 701 is configured to receive reporting content of the terminal device 60, where the reporting content is determined based on at least one of a priority rule and a multiplexing rule when there is a reporting conflict between a first SINR and at least one piece of information, the at least one piece of information includes first information, the first information includes any one of CSI, a HARQ, an SR, or third information, the CSI includes at least one of a CRI, an SSB-index, an RI, a PMI, a CQI, or RSRP, the third information includes a second SINR and RSRP, and the priority rule includes at least one of the following: a priority of the first SINR is higher than a priority of the CSI, a priority of the first SINR is lower than a priority of the HARQ, a priority of the first SINR is lower than a priority of the SR, or a priority of the first SINR is lower than a priority of the third information.

The parsing module 702 is configured to parse the reporting content.

Optionally, the multiplexing rule includes: multiplexing the first SINR and the first information on a first time-frequency resource.

When the first information includes the CSI, the first time-frequency resource is a PUCCH resource configured for multi-CSI reporting, or the first time-frequency resource is a resource configured to carry the SINR; when the first information includes the HARQ, the first time-frequency resource is a resource configured to carry the SINR; or when the first information includes the SR, the first time-frequency resource is a resource configured to carry the SINR. The communications module 701 is specifically configured to receive the reporting content on the first time-frequency resource.

The conflict resolution module 601 and the communications module 602 of the terminal device 60 may be specifically configured to implement related method steps of the terminal device shown in the embodiment in FIG. 11 or FIG. 12. For brevity of the specification, details are not described herein again.

The communications module 701 and the parsing module 702 of the network device 70 may be specifically configured to implement related method steps of the network device shown in the embodiment in FIG. 11 or FIG. 12. For brevity of the specification, details are not described herein again.

In the embodiments of the present invention, the terminal device or the network device includes a hardware layer, an operating system layer run above the hardware layer, and an application layer run above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in the embodiments of the present invention is not particularly limited in the embodiments of the present invention, provided that communication can be performed based on the method provided in the embodiments of the present invention by running a program of code recording the method provided in the embodiments of the present invention. For example, the execution body of the method provided in the embodiments of the present invention may be the terminal device or the network device, or a functional module that is in the terminal device or the network device and that can invoke a program and execute the program.

Figure 14:
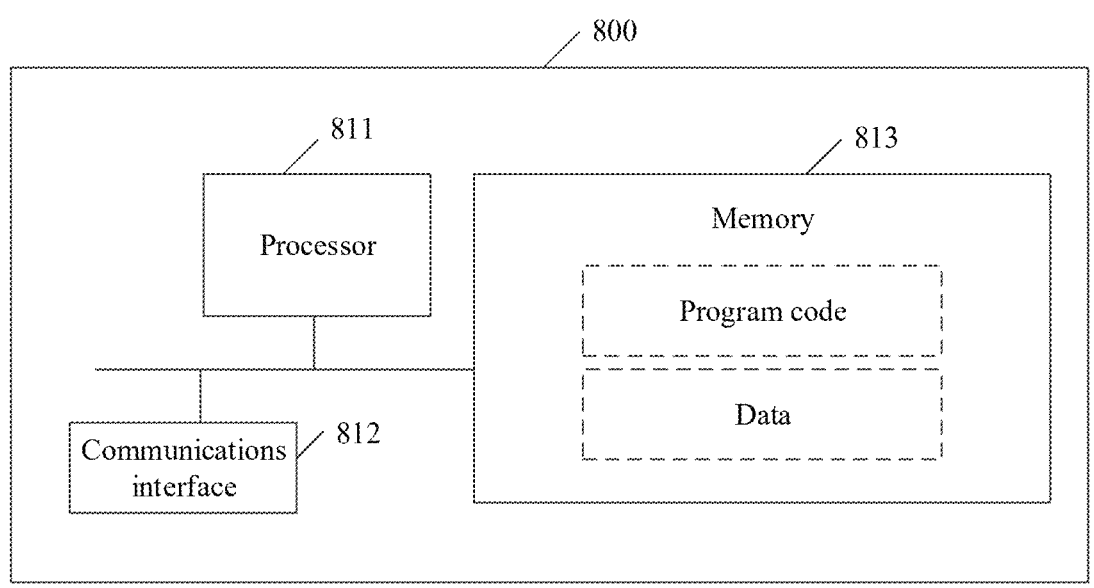
FIG. 14 is a schematic diagram of a structure of an apparatus according to an embodiment of the present invention.

Refer to FIG. 14. An embodiment of the present invention provides an apparatus 800. The apparatus 800 may be a terminal device or a network device. The apparatus 800 includes at least one processor 811, at least one memory 813, and at least one communications interface 812. The processor 811, the memory 813, and the communications interface 812 are connected and communicate with each other by using a communications bus, or some or all hardware of the processor 811, the memory 813, and the communications interface 812 are coupled and deployed together.

The processor 811 may be a general-purpose central processing unit (CPU), a microprocessor, an application-specific integrated circuit (ASIC), or one or more integrated circuits for controlling program execution of the foregoing solutions.

The communications interface 812 is configured to communicate with another device or a communications network such as the Ethernet, a radio access network (RAN), or a wireless local area network (WLAN).

The memory 813 may be a read-only memory (ROM) or another type of static storage device that can store static information and an instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), or a magnetic disk storage medium, another magnetic storage device, or any other medium that can be configured to carry or store expected program code in a form of an instruction or a data structure and that can be accessed by a computer. This is not limited herein. The memory 813 may exist independently, and is connected to the processor by using the bus. The memory may alternatively be integrated with the processor. The memory 813 may be configured to store data and program code.

The memory 813 is configured to store application program code for executing the foregoing solutions, and the processor 811 controls the execution. The processor 811 is configured to execute the application program code stored in the memory 813.

Specifically, when the apparatus 800 is the terminal device, the processor 811 may be configured to execute the application program code stored in the memory 813, to perform related method steps of the terminal device in the embodiment in FIG. 11 or FIG. 12.

Specifically, when the apparatus 800 is the network device, the processor 811 may be configured to execute the application program code stored in the memory 813, to perform related method steps of the network device in the embodiment in FIG. 11 or FIG. 12.

It should be noted that for ease of description, the foregoing method embodiments are all described as a series of action combinations. However, a person skilled in the art should understand that the present invention is not limited to the sequence of the described actions, because some steps may be performed in other sequences or performed at the same time according to the present invention. In addition, a person skilled in the art should also know that all the embodiments described in the specification are embodiments, and the related actions and modules are not necessarily mandatory to the present invention.

In the foregoing embodiments, descriptions of the embodiments have respective focuses. For a part that is not described in detail in an embodiment, refer to related descriptions in other embodiments.

In addition, aspects or features of the present invention may be implemented as a method, an apparatus, or a product that uses standard programming and/or engineering technologies. The term "product" used in the present invention covers a computer program that can be accessed from any computer-readable component, carrier, or medium. For example, the computer-readable medium may include but is not limited to: a magnetic storage device (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

The embodiments of the present invention are described in detail above. The principle and implementation of the present invention are described in this specification by using specific examples. The descriptions about the embodiments are merely provided to help understand the method and core ideas of the present invention. In addition, a person of ordinary skill in the art makes variations to the present invention in terms of the specific implementations and application scopes based on the ideas of the present invention. Therefore, the content of this specification shall not be construed as a limitation on the present invention.

What is claimed is:

1. A method, comprising:
   in response to a reporting conflict between a beam failure recovery request (BFRQ) and at least one piece of information, determining reporting content based on a priority rule, wherein the at least one piece of information comprises a scheduling request (SR), and the priority rule comprises: a priority of the BFRQ is higher than a priority of the SR; and
   sending the reporting content on a first time-frequency resource, wherein the reporting content comprises the BFRQ but not the SR.

2. The method according to claim 1, wherein the at least one piece of information further comprises channel state information (CSI), and in response to a reporting conflict between the BFRQ and the at least one piece of information, the reporting content comprises two items with the highest priorities among the BFRQ, the CSI, and the SR, and the first time-frequency resource is a physical uplink control channel (PUCCH) resource configured for transmission of the BFRQ or the CSI.

3. The method according to claim 2, wherein in response to the first time-frequency resource being a PUCCH resource configured for transmission of the CSI, a PUCCH format is PUCCH format 2, PUCCH format 3, or PUCCH format 4.

4. The method according to claim 1, wherein the at least one piece of information further comprises hybrid automatic repeat request (HARQ) information, and in response to a reporting conflict between the BFRQ and the at least one piece of information, the reporting content comprises two items with the highest priorities among the BFRQ, the HARQ information, and the SR, and the first time-frequency resource is a PUCCH resource configured for transmission of the BFRQ or the HARQ information.

5. The method according to claim 4, wherein in response to the first time-frequency resource being a PUCCH resource configured for transmission of the HARQ information, a PUCCH format is PUCCH format 2, PUCCH format 3, or PUCCH format 4.

6. The method according to claim 1, wherein in response to the first time-frequency resource being a PUCCH resource configured for transmission of the BFRQ, a PUCCH format is PUCCH format 0 or PUCCH format 1.

7. An apparatus, comprising:
   at least one processor; and
   at least one memory storing instructions that when executed by the at least one processor, cause the apparatus to perform operations comprising:
   in response to a reporting conflict between a beam failure recovery request (BFRQ) and at least one piece of information, determining reporting content based on a priority rule, wherein the at least one piece of information comprises a scheduling request (SR), and the priority rule comprises: a priority of the BFRQ is higher than a priority of the SR; and
   sending the reporting content on a first time-frequency resource, wherein the reporting content comprises the BFRQ but not the SR.

8. The apparatus according to claim 7, wherein the at least one piece of information further comprises channel state information (CSI), and in response to a reporting conflict between the BFRQ and the at least one piece of information, the reporting content comprises two items with the highest priorities among the BFRQ, the CSI, and the SR, and the first time-frequency resource is a physical uplink control channel (PUCCH) resource configured for transmission of the BFRQ or the CSI.

9. The apparatus according to claim 8, wherein in response to the first time-frequency resource being a PUCCH resource configured for transmission of the CSI, a PUCCH format is PUCCH format 2, PUCCH format 3, or PUCCH format 4.

10. The apparatus according to claim 7, wherein the at least one piece of information further comprises hybrid automatic repeat request (HARQ) information, and in response to a reporting conflict between the BFRQ and the at least one piece of information, the reporting content comprises two items with the highest priorities among the BFRQ, the HARQ information, and the SR, and the first time-frequency resource is a PUCCH resource configured for transmission of the BFRQ or the HARQ information.

11. The apparatus according to claim 10, wherein in response to the first time-frequency resource being a PUCCH resource configured for transmission of the HARQ information, a PUCCH format is PUCCH format 2, PUCCH format 3, or PUCCH format 4.

12. The apparatus according to claim 7, wherein in response to the first time-frequency resource being a PUCCH resource configured for transmission of the BFRQ, a PUCCH format is PUCCH format 0 or PUCCH format 1.

13. The apparatus according to claim 7, wherein the BFRQ comprises at least one of link failure indication information, identification information of a cell in which a link failure occurs, or reference signal information for link recovery.

14. An apparatus, comprising:
  at least one processor; and
  at least one memory storing instructions that when executed by the at least one processor, cause the apparatus to perform operations comprising:
  receiving reporting content on a first time-frequency resource, wherein the reporting content is determined based on a priority rule in response to a reporting conflict between a BFRQ and at least one piece of information, the reporting content comprises the BFRQ, the at least one piece of information comprises a scheduling request (SR), and the priority rule comprises: a priority of the BFRQ is higher than a priority of the SR; and
  parsing the reporting content to obtain the BFRQ.

15. The apparatus according to claim 14, wherein the at least one piece of information further comprises channel state information (CSI), and in response to a reporting conflict between the BFRQ and the at least one piece of information, the reporting content comprises two items with the highest priorities among the BFRQ, the CSI, and the SR, and the first time-frequency resource is a physical uplink control channel (PUCCH) resource configured for transmission of the BFRQ or the CSI.

16. The apparatus according to claim 15, wherein in response to the first time-frequency resource being a PUCCH resource configured for transmission of the CSI, a PUCCH format is PUCCH format 2, PUCCH format 3, or PUCCH format 4.

17. The apparatus according to claim 14, wherein the at least one piece of information further comprises hybrid automatic repeat request (HARQ) information, and in response to a reporting conflict between the BFRQ and the at least one piece of information, the reporting content comprises two items with the highest priorities among the BFRQ, the HARQ information, and the SR; and the first time-frequency resource is a PUCCH resource configured for transmission of the BFRQ or the HARQ information.

18. The apparatus according to claim 17, wherein in response to the first time-frequency resource being a PUCCH resource configured for transmission of the HARQ information, a PUCCH format is PUCCH format 2, PUCCH format 3, or PUCCH format 4.

19. The apparatus according to claim 14, wherein in response to the first time-frequency resource being a PUCCH resource configured for transmission of the BFRQ, a PUCCH format is PUCCH format 0 or PUCCH format 1.

20. The apparatus according to claim 14, wherein the BFRQ comprises at least one of link failure indication information, identification information of a cell in which a link failure occurs, or reference signal information for link recovery.

* * * * *